US012008066B2

(12) United States Patent
Ware et al.

(10) Patent No.: US 12,008,066 B2
(45) Date of Patent: Jun. 11, 2024

(54) MAC PROCESSING PIPELINE HAVING CONVERSION CIRCUITRY, AND METHODS OF OPERATING SAME

(71) Applicant: Flex Logix Technologies, Inc., Mountain View, CA (US)

(72) Inventors: Frederick A. Ware, Los Altos Hills, CA (US); Cheng C. Wang, San Jose, CA (US)

(73) Assignee: Flex Logix Technologies, Inc., Mountain View, CA (US)

( * ) Notice: Subject to any disclaimer, the term of this patent is extended or adjusted under 35 U.S.C. 154(b) by 0 days.

(21) Appl. No.: 17/816,487

(22) Filed: Aug. 1, 2022

(65) Prior Publication Data

US 2022/0374492 A1  Nov. 24, 2022

Related U.S. Application Data

(62) Division of application No. 17/031,631, filed on Sep. 24, 2020, now Pat. No. 11,455,368.

(Continued)

(51) Int. Cl.
*G06F 17/14* (2006.01)
*G06T 1/20* (2006.01)

(52) U.S. Cl.
CPC ............. *G06F 17/14* (2013.01); *G06T 1/20* (2013.01)

(58) Field of Classification Search
CPC ................................. G06G 17/14; G06F 1/20
See application file for complete search history.

(56) References Cited

U.S. PATENT DOCUMENTS 4,958,312 A  9/1990 Ang et al.
6,115,729 A  9/2000 Matheny et al.
(Continued)

FOREIGN PATENT DOCUMENTS

EP  0405726  3/1999
EP  2280341  6/2013
WO  WO 2018/126073  7/2018

OTHER PUBLICATIONS

Priyanka Nain, "Multiplier-Accumulator (MAC) Unit", IJDACR, vol. 5, Issue 3, Oct. 2016, 4 pages.
(Continued)

*Primary Examiner* — Sing-Wai Wu
*Assistant Examiner* — Khoa Vu
(74) *Attorney, Agent, or Firm* — Charles Shemwell

(57) ABSTRACT

An integrated circuit including a multiplier-accumulator execution pipeline including a plurality of multiplier-accumulator circuits to process the data, using filter weights, via a plurality of multiply and accumulate operations. The integrated circuit includes first conversion circuitry, coupled the pipeline, having inputs to receive a plurality of sets of data, wherein each set of data includes a plurality of data, Winograd conversion circuitry to convert each set of data to a corresponding Winograd set of data, floating point format conversion circuitry, coupled to the Winograd conversion circuitry, to convert the data of each Winograd set of data to a floating point data format. In operation, the multiplier-accumulator circuits are configured to perform the plurality of multiply and accumulate operations using the data of the plurality of Winograd sets of data from the first conversion circuitry and the filter weights, and generate output data based on the multiply and accumulate operations.

21 Claims, 34 Drawing Sheets

Related U.S. Application Data

(60) Provisional application No. 62/909,293, filed on Oct. 2, 2019.

(56) References Cited

U.S. PATENT DOCUMENTS

| | | | |
|---|---|---|---|
| 6,148,101 | A | 11/2000 | Tanaka et al. |
| 6,298,366 | B1 | 10/2001 | Gatherer et al. |
| 6,538,470 | B1 | 3/2003 | Langhammer et al. |
| 7,107,305 | B2 | 9/2006 | Deng et al. |
| 7,299,342 | B2 | 11/2007 | Nilsson et al. |
| 7,346,644 | B1 | 3/2008 | Langhammer et al. |
| 7,698,358 | B1 | 4/2010 | Langhammer et al. |
| 8,051,124 | B2 | 11/2011 | Salama et al. |
| 8,266,199 | B2 | 9/2012 | Langhammer et al. |
| 8,645,450 | B1 | 2/2014 | Choe et al. |
| 8,751,551 | B2 | 6/2014 | Streicher et al. |
| 8,788,562 | B2 | 7/2014 | Langhammer et al. |
| 9,600,278 | B1 | 3/2017 | Langhammer |
| 2003/0172101 | A1 | 9/2003 | Liao et al. |
| 2005/0144215 | A1 | 6/2005 | Simkins et al. |
| 2007/0239967 | A1 | 10/2007 | Dally et al. |
| 2008/0211827 | A1* | 9/2008 | Donovan ............ G06T 15/04 345/582 |
| 2009/0094303 | A1 | 4/2009 | Katayama |
| 2010/0274990 | A1 | 10/2010 | Wilder et al. |
| 2014/0019727 | A1 | 1/2014 | Zhu et al. |
| 2014/0281370 | A1 | 9/2014 | Khan |
| 2017/0011288 | A1 | 1/2017 | Brothers et al. |
| 2017/0115958 | A1 | 4/2017 | Langhammer |
| 2017/0116693 | A1 | 4/2017 | Rae et al. |
| 2017/0214929 | A1 | 7/2017 | Susnow et al. |
| 2017/0315778 | A1 | 11/2017 | Sano |
| 2017/0322813 | A1 | 11/2017 | Langhammer |
| 2017/0344876 | A1 | 11/2017 | Brothers |
| 2018/0052661 | A1 | 2/2018 | Langhammer |
| 2018/0081632 | A1 | 3/2018 | Langhammer |
| 2018/0081633 | A1 | 3/2018 | Langhammer |
| 2018/0157961 | A1 | 6/2018 | Henry et al. |
| 2018/0173571 | A1* | 6/2018 | Huang ............... G06N 3/063 |
| 2018/0189651 | A1 | 7/2018 | Henry et al. |
| 2018/0300105 | A1 | 10/2018 | Langhammer |
| 2018/0314492 | A1 | 11/2018 | Fais et al. |
| 2018/0321909 | A1 | 11/2018 | Langhammer |
| 2018/0321910 | A1 | 11/2018 | Langhammer et al. |
| 2018/0341460 | A1 | 11/2018 | Langhammer |
| 2018/0341461 | A1 | 11/2018 | Langhammer |
| 2019/0042191 | A1 | 2/2019 | Langhammer |
| 2019/0042244 | A1 | 2/2019 | Henry et al. |
| 2019/0042544 | A1 | 2/2019 | Kashyap et al. |
| 2019/0042923 | A1* | 2/2019 | Janedula ............ G06N 3/044 |
| 2019/0079728 | A1 | 3/2019 | Langhammer et al. |
| 2019/0114536 | A1* | 4/2019 | Tsung ............... G06F 17/156 |
| 2019/0196786 | A1 | 6/2019 | Langhammer |
| 2019/0243610 | A1* | 8/2019 | Lin ..................... G06N 3/08 |
| 2019/0250886 | A1 | 8/2019 | Langhammer |
| 2019/0286417 | A1 | 9/2019 | Langhammer |
| 2019/0310828 | A1 | 10/2019 | Langhammer et al. |
| 2019/0324722 | A1 | 10/2019 | Langhammer |
| 2019/0340489 | A1 | 11/2019 | Mills |
| 2019/0392297 | A1 | 12/2019 | Lau et al. |
| 2020/0004506 | A1 | 1/2020 | Langhammer et al. |
| 2020/0026493 | A1 | 1/2020 | Streicher et al. |
| 2020/0026498 | A1 | 1/2020 | Sumbul et al. |
| 2020/0076435 | A1 | 3/2020 | Wang |
| 2020/0097799 | A1 | 3/2020 | Divakar et al. |
| 2020/0174750 | A1 | 6/2020 | Langhammer |
| 2020/0202198 | A1 | 6/2020 | Lee et al. |
| 2020/0234124 | A1* | 7/2020 | Park .................. G06N 3/048 |
| 2020/0310818 | A1 | 10/2020 | Ware et al. |
| 2020/0326939 | A1 | 10/2020 | Ware et al. |
| 2020/0326948 | A1 | 10/2020 | Langhammer |
| 2020/0401414 | A1 | 12/2020 | Ware et al. |
| 2021/0081211 | A1 | 3/2021 | Wang |

OTHER PUBLICATIONS

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

International Search Report and Written Opinion of International Searching Authority re: re: PCT/US2020/024808, dated Jan. 13, 2021, 10 pages.

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

Linley Gwennap, "IBM Demonstrates New AI Data Types", Microprocessor Report, Apr. 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

"NVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

Horowitz, "Computing Energy's Problem", IEEE International Solid-State Circuits Conference (ISSCC), pp. 10-14, Feb. 2014.

Zhao et al., "A Fast Algorithm for Reducing the Computation Complexity of Convolutional Neural Networks", Algorithms 2018, 11, 159; doi: 10.3390/a11100159; www. Mdpi.com/journal/algorithms, 11 pages, Oct. 2018.

Liang Yun, et al., "Evaluating Fast Algorithms for Convolutional Neural Networks on FPGAs", IEEE Transactions on Computer-Aided Design of Integrated Circuits and Systems, vol. 39, No. 4, Feb. 5, 2019, 14 pages (Note: The date identified on the article attached is Mar./Apr. 2020).

European Patent Office, supplementary European search report and European search opinion in European Patent Application No. 20870929. 5, dated Sep. 8, 2023, 10 pages.

Lian et al., "High-Performance FPGA-Based CNN Accelerator With Block-Floating-Point Arithmetic", IEEE Transactions on VLSI Systems, vol. 27, No. 8, Aug. 1, 2019, pp. 1874-1885.

\* cited by examiner

```
Pseudo-code
For i=0,Dw-1,2
  For j=0,Dh-1,2
    For l=0,Yd-1
      For m=0,M-1
        Zijlm ← 0
      For k=0,Dd-1
        Eijkm ← FunctionE(Dijkm)       ← D-to-E conversion and extraction operations
        Hklm  ← FunctionH(Fklm)
        Zijlm ← SumK(Eijkm * Hklm)
        Yijkm ← FunctionY(Zijkm)
```

FIG. 3B

*Pseudo-code*
```
For i=0,Dw-1,2
 For j=0,Dh-1,2
  For l=0,Yd-1
   For m=0,M-1
    Zijlm ← 0
    For k=0,Dd-1
     Eijkm ← FunctionE(Dijkm)
     Hklm  ← FunctionH(Fklm)
     Zijlm ← SumK(Eijkm * Hklm)
     Yijkm ← FunctionY(Zijkm)
```

F-to-H conversion and extraction operations

FIG. 6B

Pseudo-code
```
For i=0,Dw-1,2
  For j=0,Dh-1,2
    For l=0,Yd-1
      For m=0,M-1
        Zijlm ← 0
        For k=0,Dd-1
          Eijkm ← FunctionE(Dijkm)
          Hklm  ← FunctionH(Fklm)
          Zijlm ← SumK(Eijkm * Hklm)
          Yijkm ← FunctionY(Zijkm)  ← loading into the accumulation input port of the Z-to-Y (zij-to-yij) conversion circuitry
```

FIG. 9B

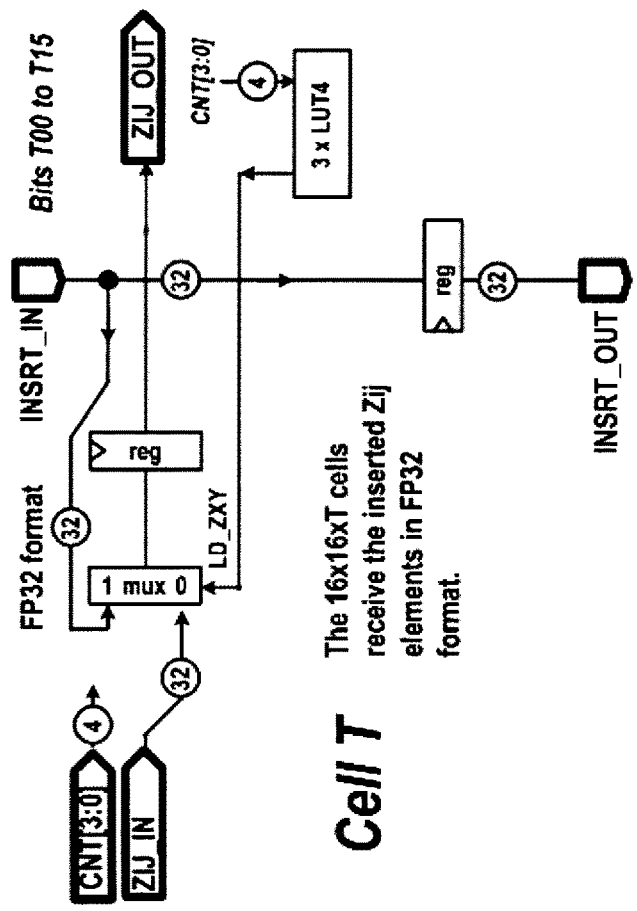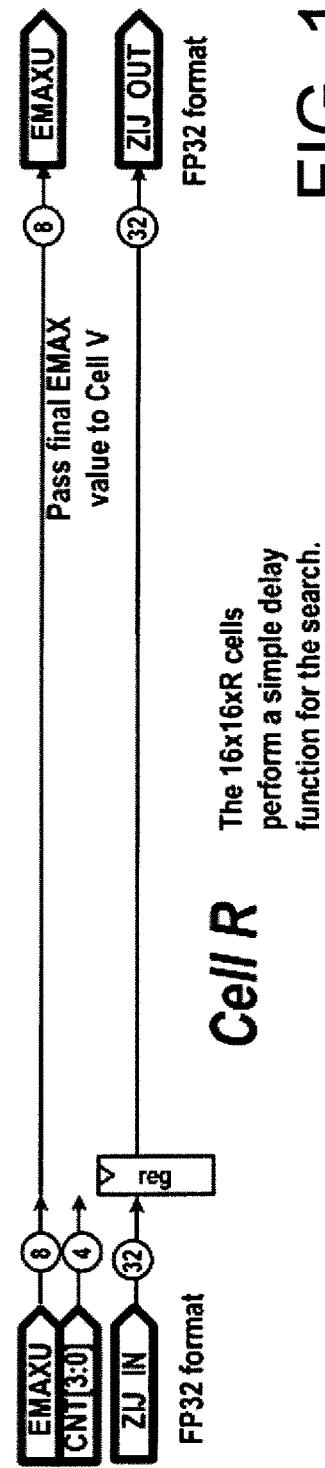

MAC PROCESSING PIPELINE HAVING CONVERSION CIRCUITRY, AND METHODS OF OPERATING SAME

RELATED APPLICATIONS

This application is a divisional of U.S. Non-Provisional application Ser. No. 17/031,631, filed Sep. 24, 2020 (still pending). This application and the '631 application claim priority to and the benefit of U.S. Provisional Application No. 62/909,293, entitled "Multiplier-Accumulator Circuitry Processing Pipeline and Methods of Operating Same", filed Oct. 2, 2019. The '293 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof.

In one aspect, the present inventions are directed to one or more integrated circuits having multiplier-accumulator circuitry (and methods of operating such circuitry) including one or more execution or processing pipelines, based on or using floating point data formats, that include circuitry to implement Winograd type processes to, for example, increase data throughput of the multiplier-accumulator circuitry and processing. For example, in one embodiment, one or more integrated circuits, having one or more multiplier-accumulator circuit (MAC) execution pipelines (e.g., for image filtering), may include conversion circuitry to convert or transform data (e.g., input data and/or filter weight or coefficient data) from a floating point data format to a data format that facilitates Winograd data processing. In this embodiment, the input data and associated filter weights or coefficients may be stored in memory wherein the data are provided to conversion circuitry to convert or transform the data from a floating point data format (at times, here and in the figures, identified as "FP" or "FPxx" where "xx" indicates/reflects an exemplary data width) to a data format that facilitates implementation in or is consistent with use of Winograd type processes (e.g., a fixed point format, such as, for example, block scaled fraction format (at times, here and in the figures, identified as "BSF" or "BSFxx" "xx" indicates/reflects an exemplary data width).

In one embodiment, the one or more integrated circuits include conversion circuitry or conversion circuitry (referred to, at times, as D/E, D-E or D-to-E conversion logic or conversion circuitry) to convert or process the input data from a floating point data format to, for example, a fixed point data format. Thereafter, the input data, in a fixed point data format, are input into circuitry to implement Winograd type processes to, for example, increase data throughput of the multiplier-accumulator circuitry and processing. The output of the Winograd processing circuitry is applied to or input into conversion circuitry to convert or transform the input data, after Winograd processing, from a fixed point data format to a floating point data format before such data is input into the multiplier-accumulator circuitry via extraction logic circuitry. In this way, the input data (e.g., image data) being processed by the multiplier circuit and the accumulate circuit of each of the one or more multiplier-accumulator pipelines are in a floating point format.

In another embodiment, the one or more integrated circuits include conversion circuitry (referred to, at times, as F/H, F-H or F-to-H conversion logic or circuitry) to convert or process filter weight or coefficient values or data to accommodate use in/with the Winograd type processes. For example, where the filter or weight values or data is in floating point format, the weight values or data may be converted or modified to a data format that facilitates implementation in or is consistent with use of Winograd type processes (e.g., a fixed point format, such as, for example, block scaled fraction (BSF) format). Here, the filter weight data, in a fixed point data format, are input into circuitry to implement Winograd type processes. Thereafter, the output of the Winograd processing circuitry is applied to or input into conversion circuitry to convert or transform the filter weight data, after Winograd processing, from a fixed point data format to a floating point data format before the filter weight data is input into the multiplier-accumulator circuitry via extraction logic circuitry. Such weight values or data, having a floating point data format, are employed, together with the input data which is also in a floating point data format, by the multiplier circuits of the multiplier-accumulator circuitry of the multiplier-accumulator execution pipeline(s). In this way, the multiply operations of the multiplier-accumulate operations are performed in a floating point data format regime.

The multiplier-accumulator circuitry (and methods of operating such circuitry) of the execution or processing pipeline (e.g., for image filtering) may include floating point execution circuitry (e.g., multiplier circuits and accumulate/adder circuits) implementing floating point addition and multiplication based on data having one or more floating point data formats. The floating point data formats may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation of the integrated circuit or multiplier-accumulator circuitry of the processing pipeline). In one embodiment, the circuitry of the multiplier-accumulator execution pipelines include adjustable precision of the data format (e.g., the floating point data format). In addition thereto, or in lieu thereof, the circuitry of the execution pipelines may concurrently process data to increase throughput of the pipeline. For example, in one implementation, the present inventions may include a plurality of separate multiplier-accumulator circuits (referred to herein, at times, as "MAC") and a plurality of registers (including, in one embodiment, a plurality of shadow registers) that facilitate pipelining of the multiply and accumulate operations wherein the circuitry of the execution pipelines concurrently process data to increase throughput of the pipeline.

After the data processing by the multiplier-accumulator execution or processing pipelines, the present inventions, in one embodiment, employ conversion circuitry (referred to, at times, as Z/Y, Z-Y or Z-to-Y conversion logic or circuitry), consistent with Winograd type processes, to process the output data (e.g., output image data). In this regard, in one embodiment, after the multiplier-accumulator circuitry of the multiplier-accumulator execution pipeline(s) output the output data (e.g., image/pixel data), such data are applied to or input into data format conversion circuitry and processes which convert or transform the output data, which is in a floating point data format, to data having a data format that facilitates implementation in or is consistent with use of Winograd type processes (e.g., a fixed point data format, such as, for example, BSF). Thereafter, the output data, in a fixed point data format, is applied to or input into Winograd conversion circuitry of the Z-Y conversion circuitry wherein the output data is processed consistent with Winograd type processes to convert the output data from a Winograd format to a non-Winograd format. Notably, in one embodiment, the Z-Y conversion circuitry is incorporated or integrated directly into the multiplier-accumulator execution pipeline (s). That is, the operations of the Z-Y conversion of the processed data are performed in the MAC execution or processing pipeline.

Thereafter, the present inventions may employ circuitry and techniques to convert or transform the output data (e.g., in a fixed data point format) to a floating point data format. That is, in one embodiment, after the output data is processed by the Winograd conversion circuitry (e.g., a fixed point data format, such as, for example, BSF format), the present inventions may employ conversion circuitry and techniques to convert or transform the output data (e.g., image/pixel data) to a floating point data format before output to, for example, memory (e.g., L2 memory such as SRAM). In one embodiment, the output data is written to and stored in memory in a floating point data format.

The present inventions may employ or implement aspects of the circuitry and techniques multiplier-accumulator execution or processing pipelines (and methods of operating such circuitry) having circuitry to implement Winograd type processes—for example, as described and/or illustrated in U.S. Non-Provisional patent application Ser. No. 16/796,111, entitled "Multiplier-Accumulator Circuitry having Processing Pipelines and Methods of Operating Same", filed Feb. 20, 2020) and/or U.S. Provisional Patent Application No. 62/823,161, entitled "Multiplier-Accumulator Circuitry having Processing Pipeline and Methods of Operating and Using Same", filed Mar. 25, 2019). Here, the circuitry and methods of the pipeline and processes implemented therein described and illustrated in '111 and '161 applications may be supplemented or modified to further include conversion circuitry and techniques to convert or translate floating point data to a data format (e.g., a fixed point format such as block-scaled data format) that facilitates a certain implementation of Winograd type processes, and vice versa (i.e., conversion circuitry and techniques to convert or translate data having a data format that facilitates implementation of Winograd type processes (e.g., a fixed point format) to floating point data format, which may then be processed via or in conjunction with the multiplier-accumulator execution or processing pipelines). Notably, the '111 and '161 applications are hereby incorporated by reference in their entirety. Moreover, although the '111 and '161 applications are incorporated by reference in their entirety, the applications will be specifically referenced from time-to-time during the discussion below.

In addition, the present inventions may employ or implement aspects of the circuitry and techniques floating point multiplier-accumulator execution or processing pipelines (and methods of operating such circuitry) having floating point execution circuitry (e.g., adder circuitry) implementing one or more floating point data formats—for example, as described and/or illustrated in U.S. Non-Provisional patent application Ser. No. 16/900,319, entitled "Multiplier-Accumulator Circuitry and Pipeline using Floating Point Data, and Methods of Using Same", filed Jun. 12, 2020) and U.S. Provisional Patent Application No. 62/865,113, entitled "Processing Pipeline having Floating Point Circuitry and Methods of Operating and Using Same", filed Jun. 21, 2019). Here, the circuitry and methods of the pipeline and processes implemented therein described and illustrated in '319 and '113 applications may be employed in the circuitry and techniques described and/or illustrated herein in connection with the one or more execution or processing pipelines, based on or using floating point data formats, that include circuitry to implement Winograd type processes to increase data throughput of the multiplier-accumulator circuitry and processing. Notably, the '319 and '113 applications are hereby incorporated by reference in their entirety.

In one embodiment, the processing circuitry (which includes a plurality of multiplier-accumulator circuits) of the execution pipelines may concurrently process data to increase throughput of the pipeline. For example, in one implementation, the present inventions may include a plurality of separate multiplier-accumulator circuits (referred to herein, at times, as "MAC" or "MAC circuits") and a plurality of registers (including, in one embodiment, a plurality of shadow registers) that facilitate pipelining of the multiply and accumulate operations wherein the circuitry of the execution pipelines concurrently process data to increase throughput of the pipeline—see, for example, the multiplier-accumulator circuitry, architectures and integrated circuits described and/or illustrated in U.S. patent application Ser. No. 16/545,345, filed on Aug. 20, 2019 and U.S. Provisional Patent Application No. 62/725,306, filed on Aug. 31, 2018. The multiplier-accumulator circuitry described and/or illustrated in the '345 and '306 applications facilitate concatenating the multiply and accumulate operations thereby allowing a plurality of multiplier-accumulator circuitry to perform such operations more quickly (see, e.g., the exemplary embodiments illustrated in FIGS. 1A-1C of U.S. patent application Ser. No. 16/545,345). The '345 and '306 applications are hereby incorporated by reference in their entirety.

In addition thereto, or in lieu thereof, the present inventions may be employed and/or be implemented in conjunction with the circuitry and techniques multiplier-accumulator execution or processing pipelines (and methods of operating such circuitry) having circuitry and/or architectures to process data, concurrently or in parallel, to increase throughput of the pipeline—for example, as described and/or illustrated in U.S. patent application Ser. No. 16/816,164 and U.S. Provisional Patent Application No. 62/831,413; the '164 and '413 applications are hereby incorporated by reference in their entirety. Here, a plurality of processing or execution pipelines may concurrently process data to increase throughput of the data processing and overall pipeline.

Notably, the integrated circuit(s) may be, for example, a processor, controller, state machine, gate array, system-on-chip ("SOC"), programmable gate array ("PGA") and/or field programmable gate array ("FPGA") and/or a processor, controller, state machine and SOC including an embedded FPGA. An FPGA means both a discrete FPGA and an embedded FPGA.

BRIEF DESCRIPTION OF THE DRAWINGS

The present inventions may be implemented in connection with embodiments illustrated in the drawings hereof. These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment (s).

Notably, the configurations, block/data width, data path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams.

Moreover, although the illustrative/exemplary embodiments include a plurality of memories (e.g., L3 memory, L2 memory, L1 memory, L0 memory) which are assigned, allocated and/or used to store certain data and/or in certain organizations, one or more of memories may be added, and/or one or more memories may be omitted and/or combined/consolidated—for example, the L3 memory or L2 memory, and/or the organizations may be changed, supplemented and/or modified. The inventions are not limited to the illustrative/exemplary embodiments of the memory organization and/or allocation set forth in the application. Again, the inventions are not limited to the illustrative/exemplary embodiments set forth herein.

Figure 1:
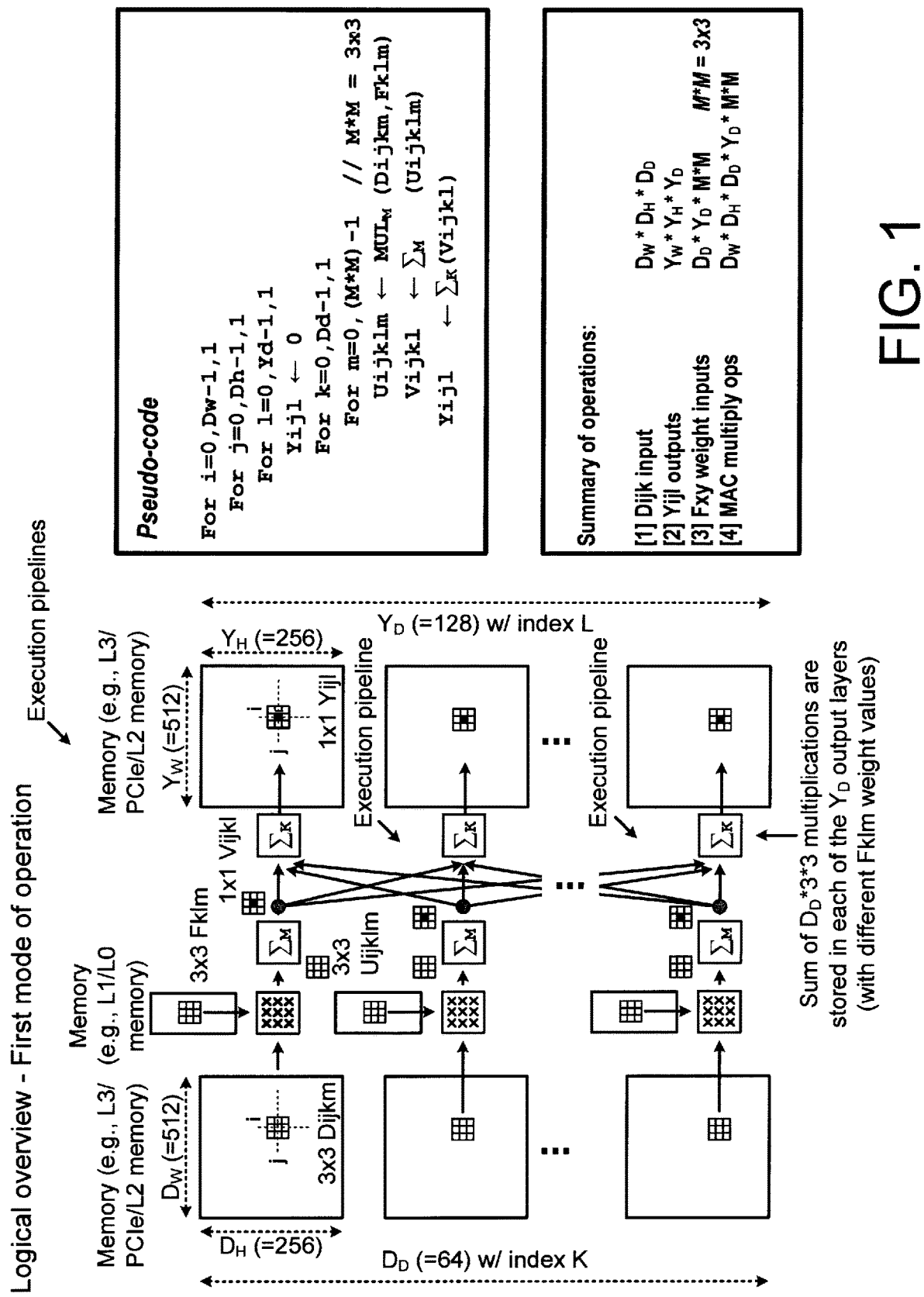
Figure 2A:
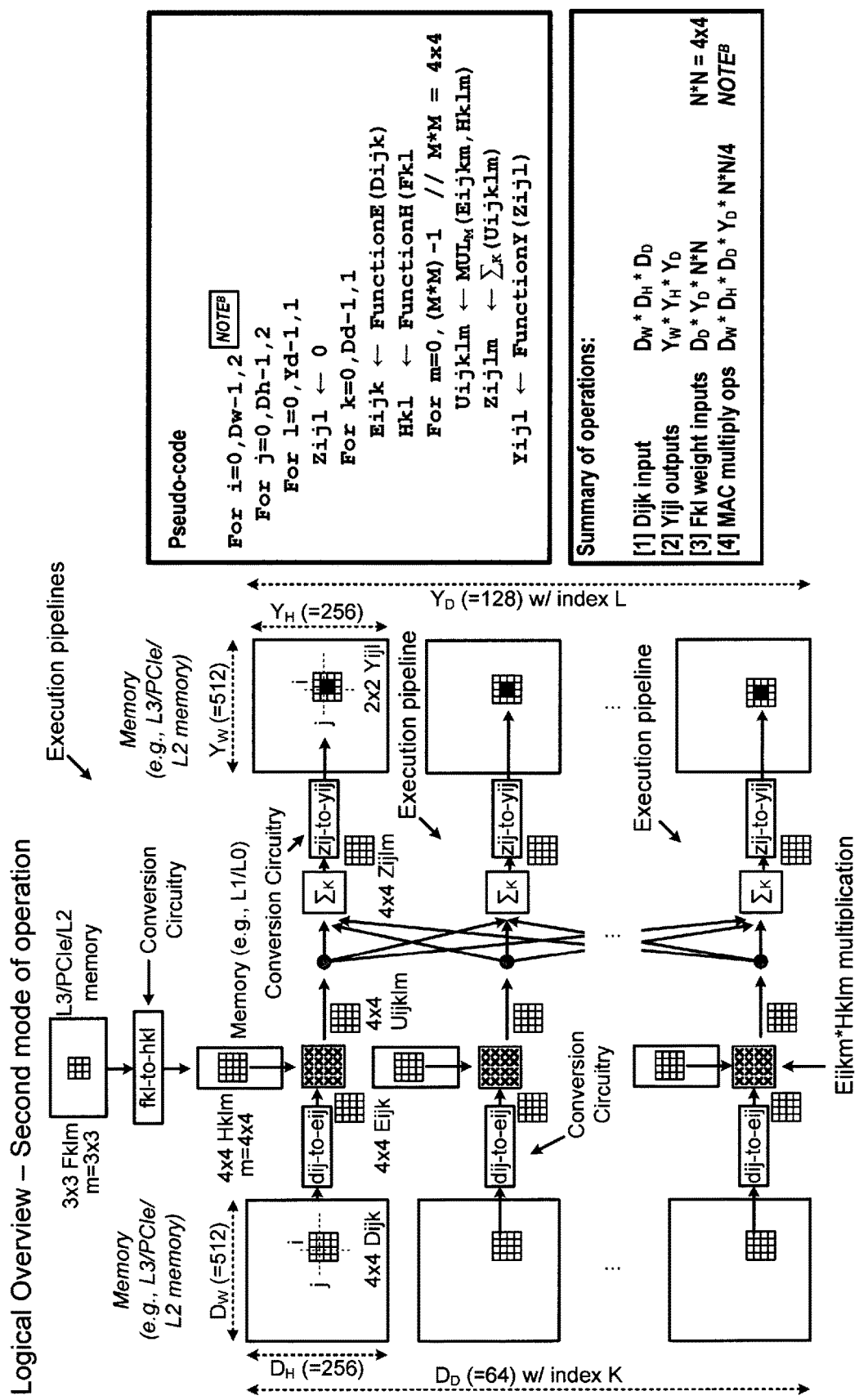
Figure 2B:
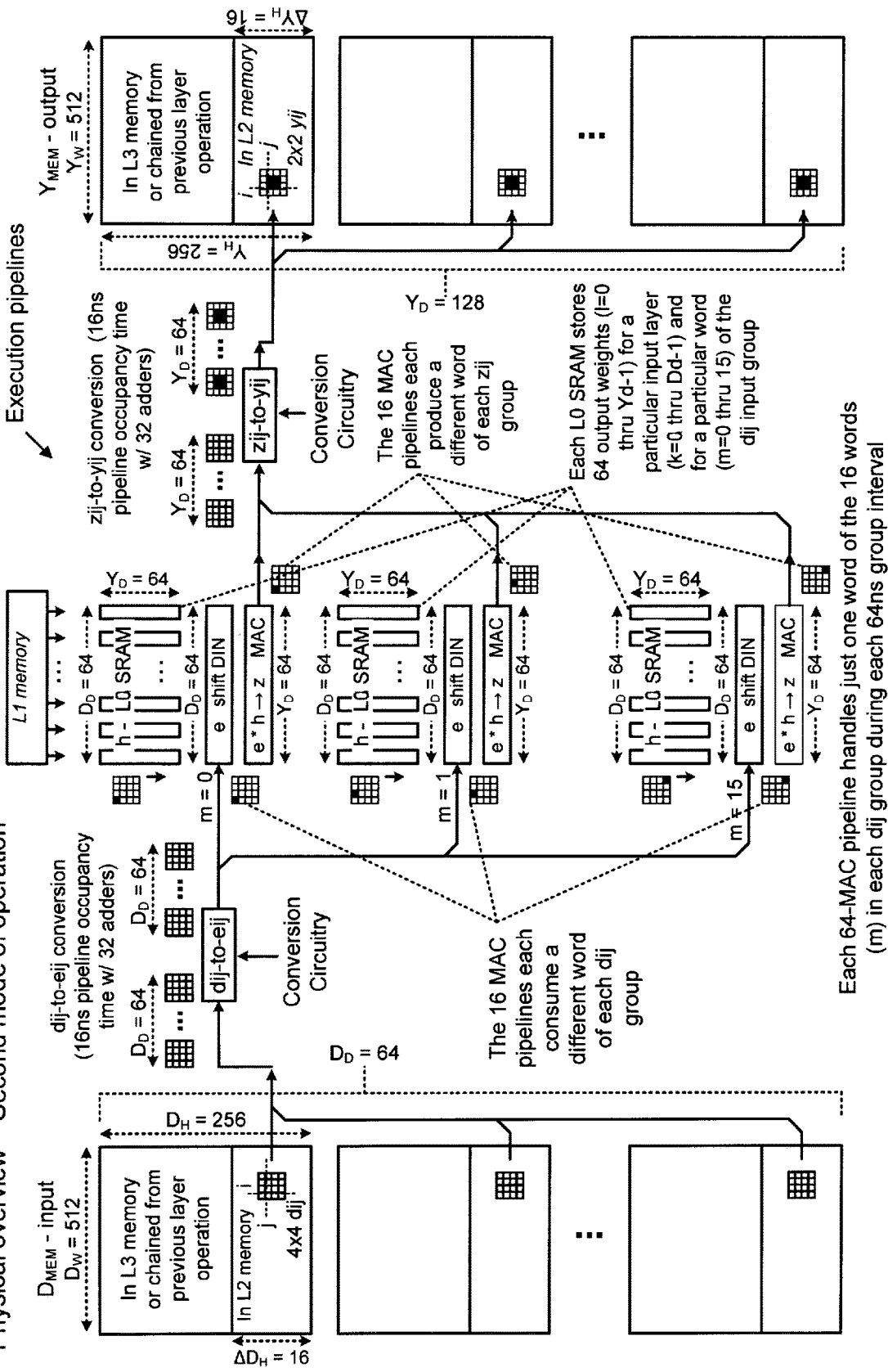
Figure 2C:
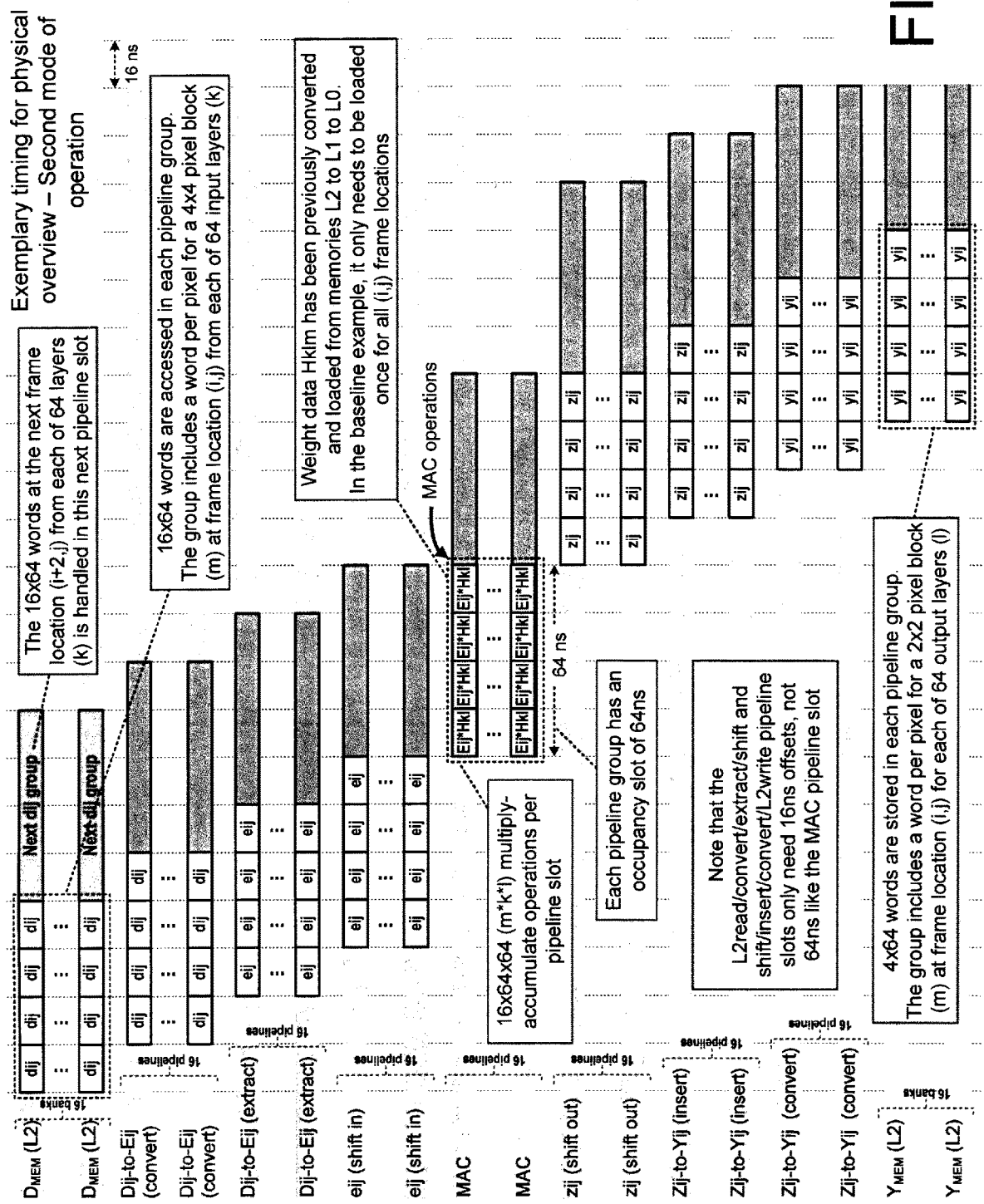
Figure 3A:
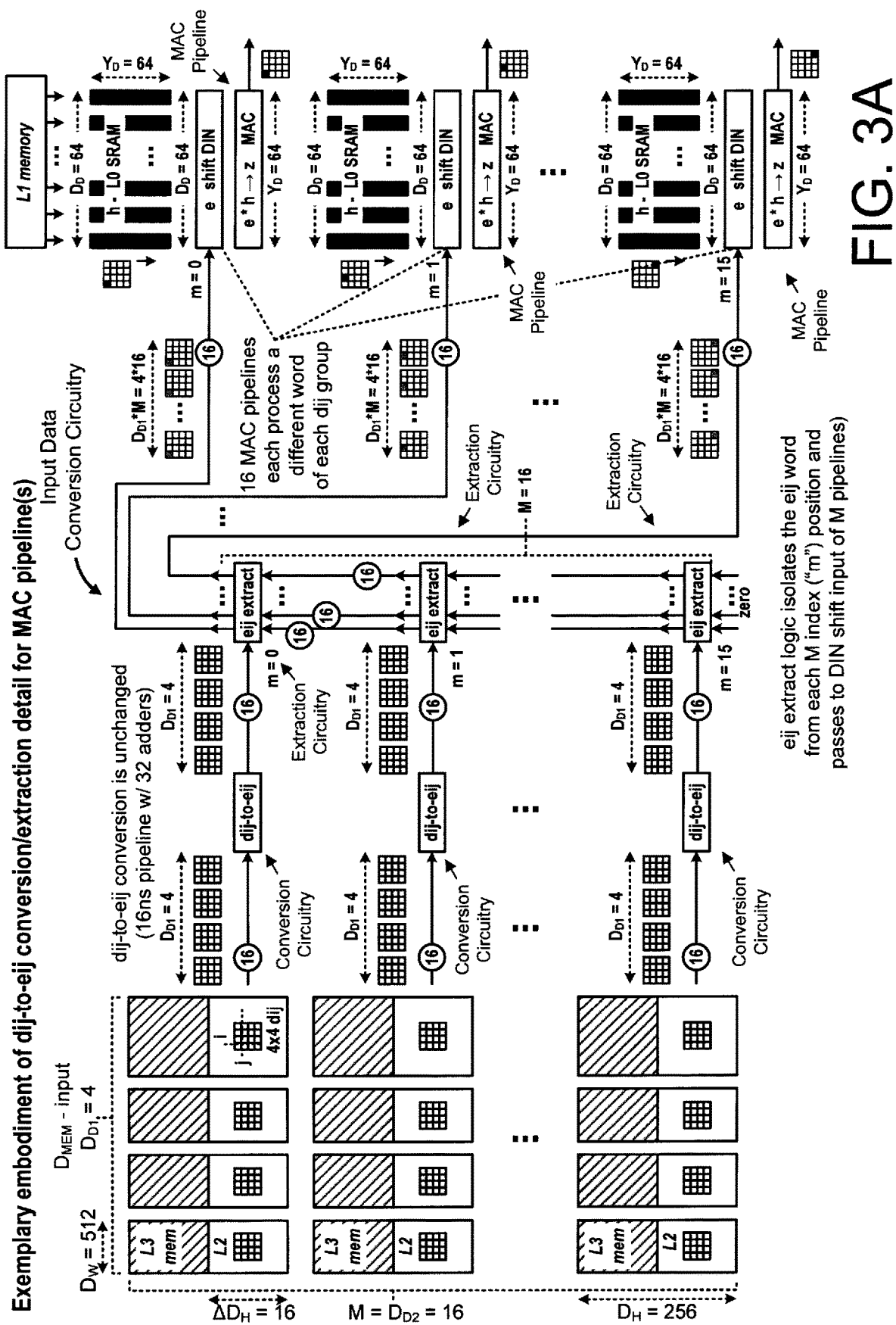
Figure 3C:
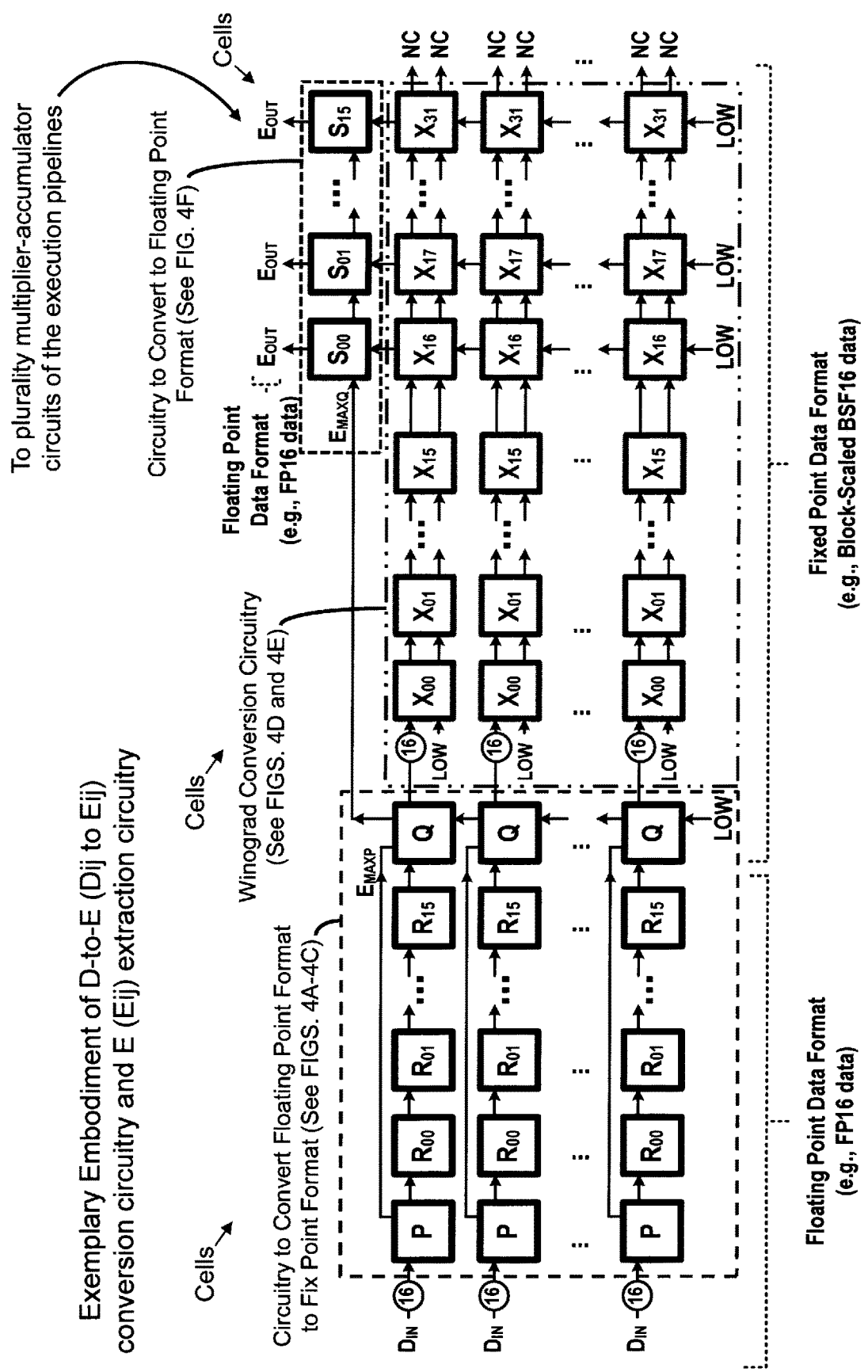
Figure 3D:
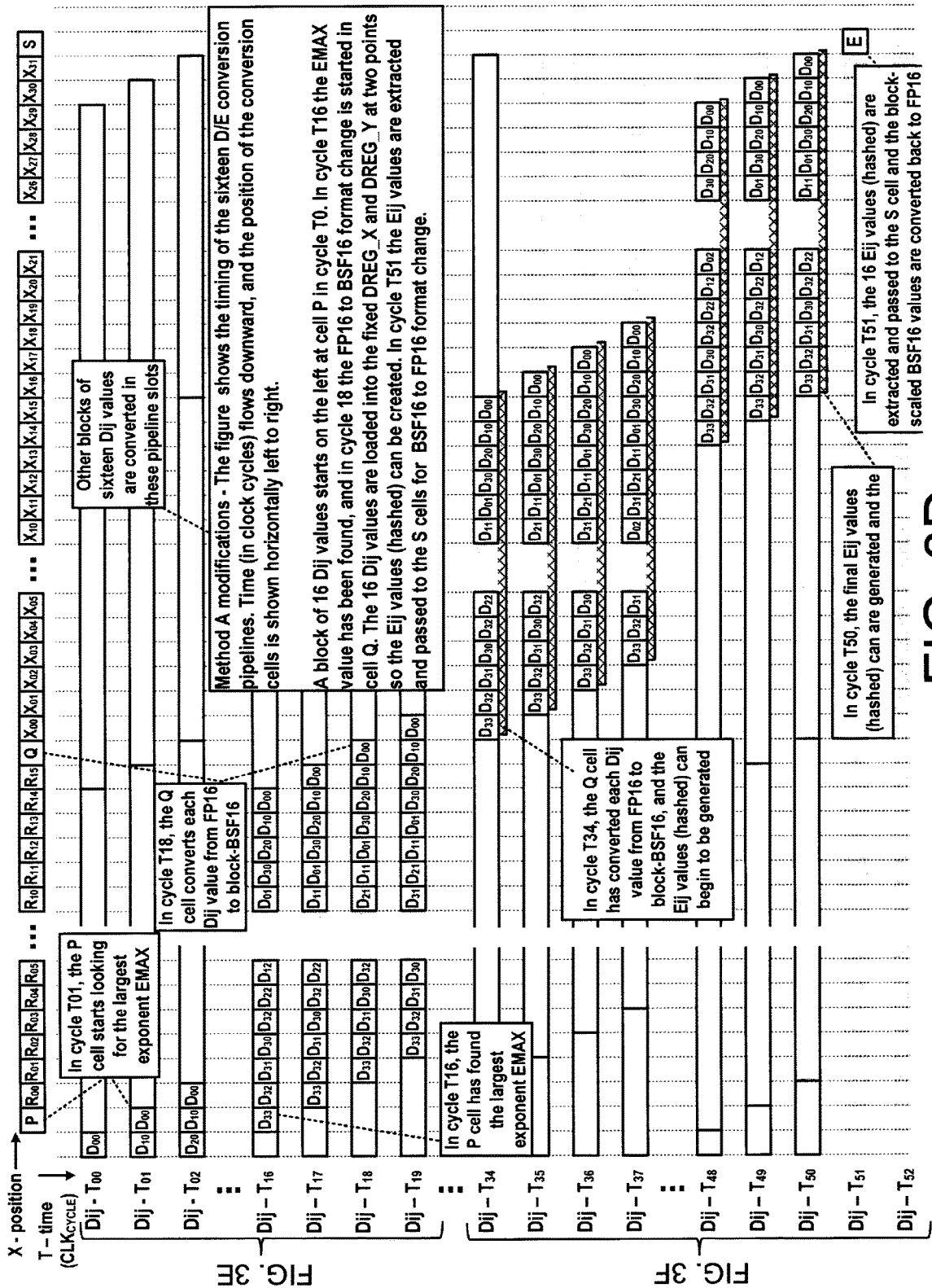
Figure 3E:
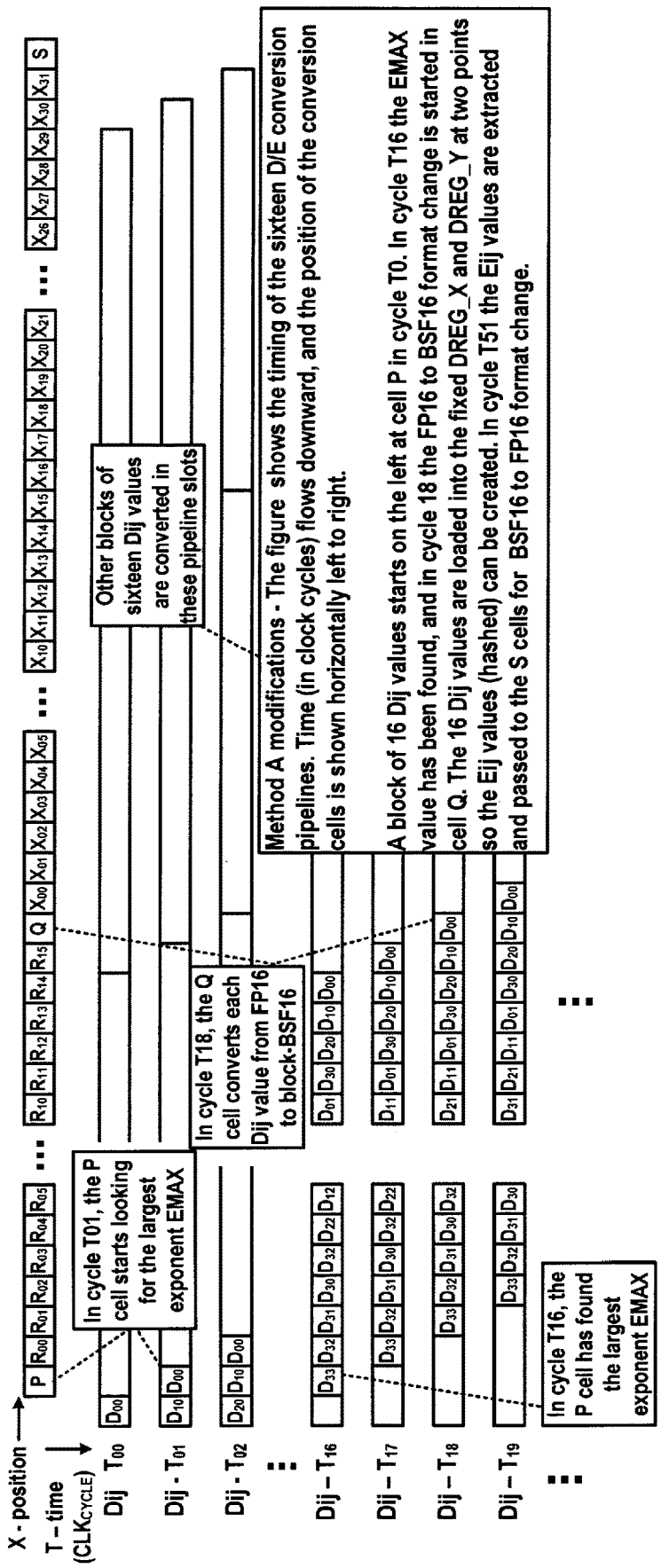
Figure 3F:
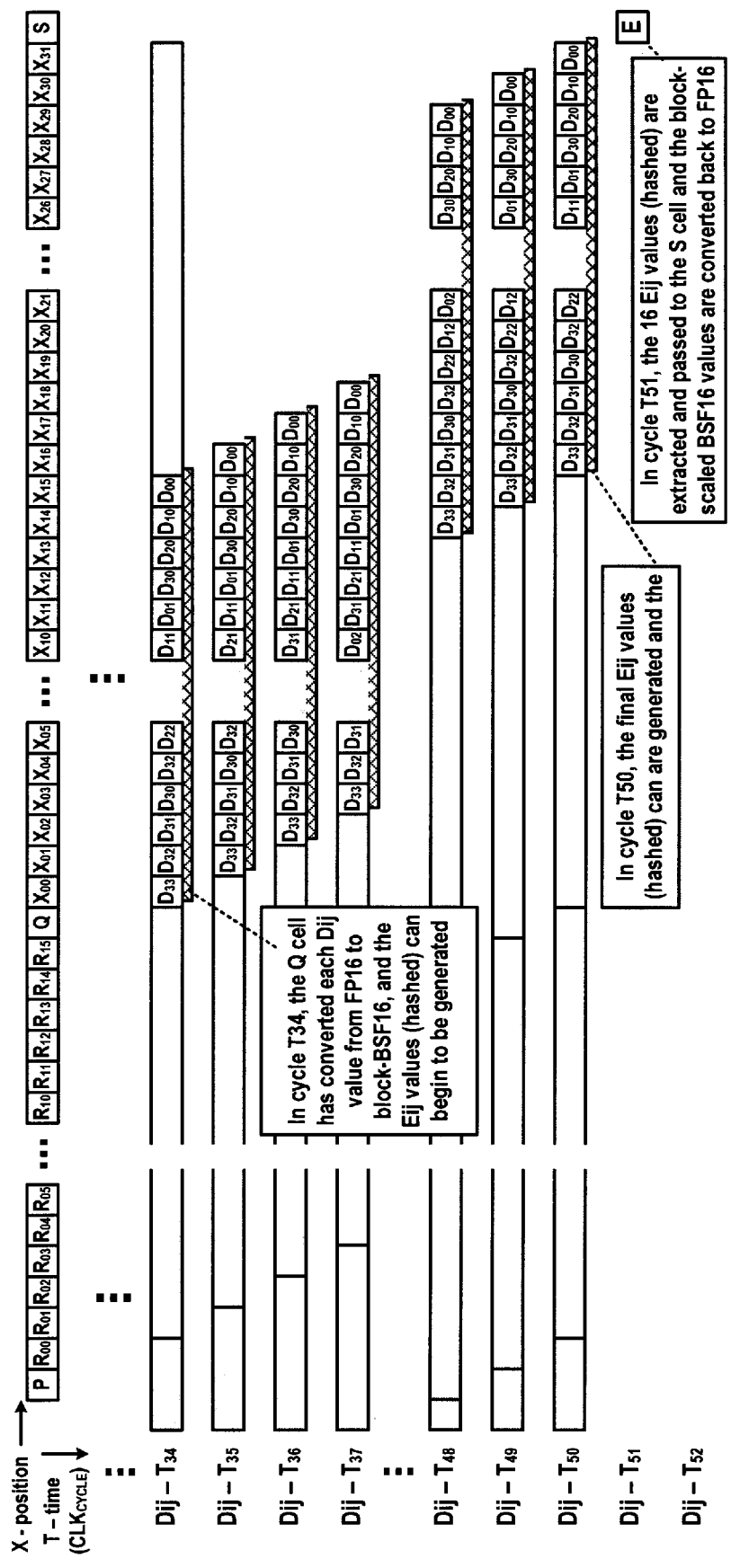
Figure 4A:
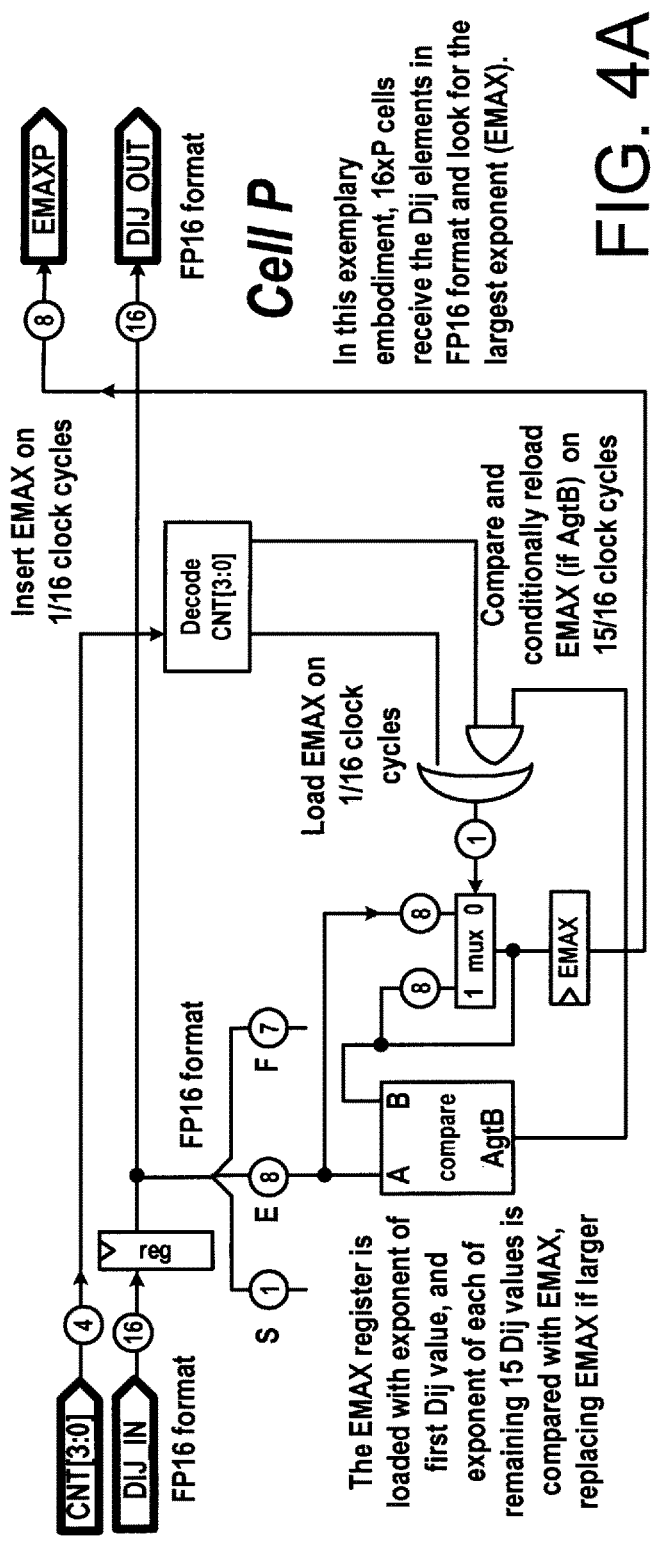
Figure 4B:
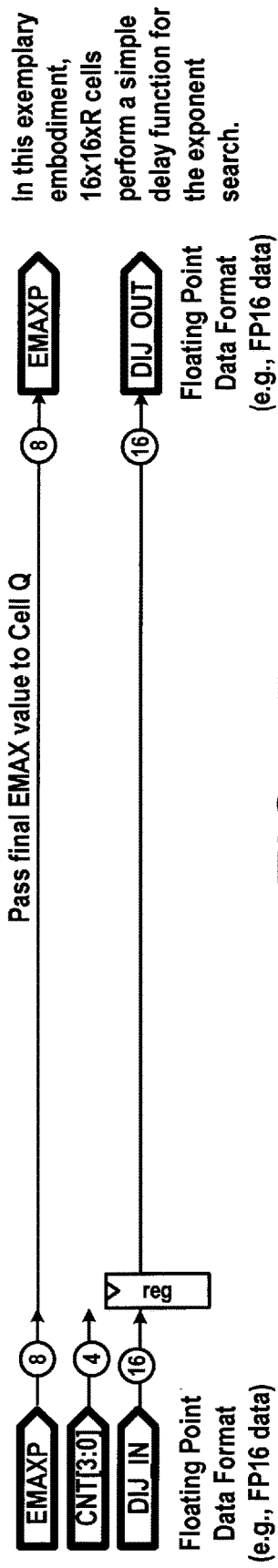
Figure 4C:
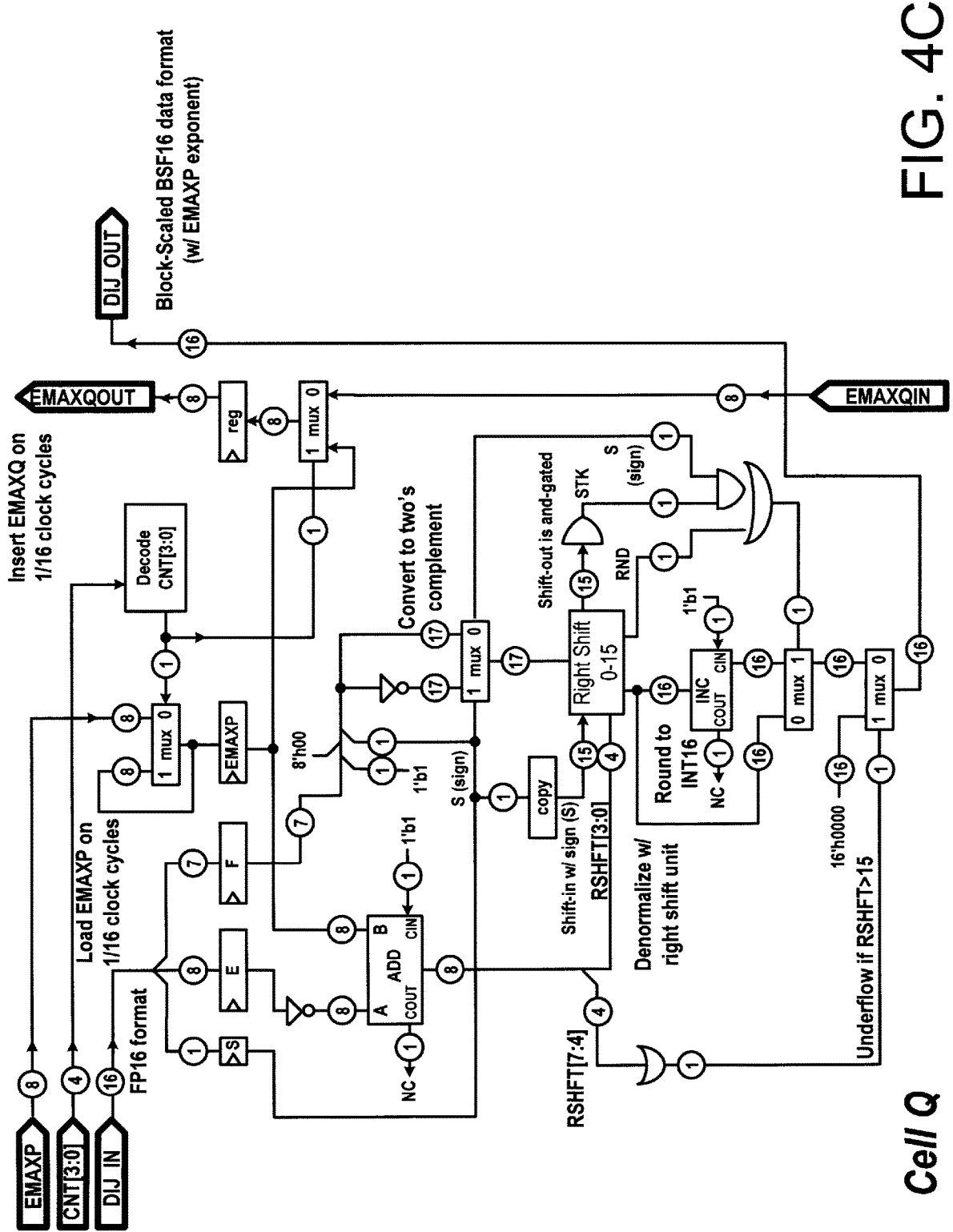
Figure 4D:
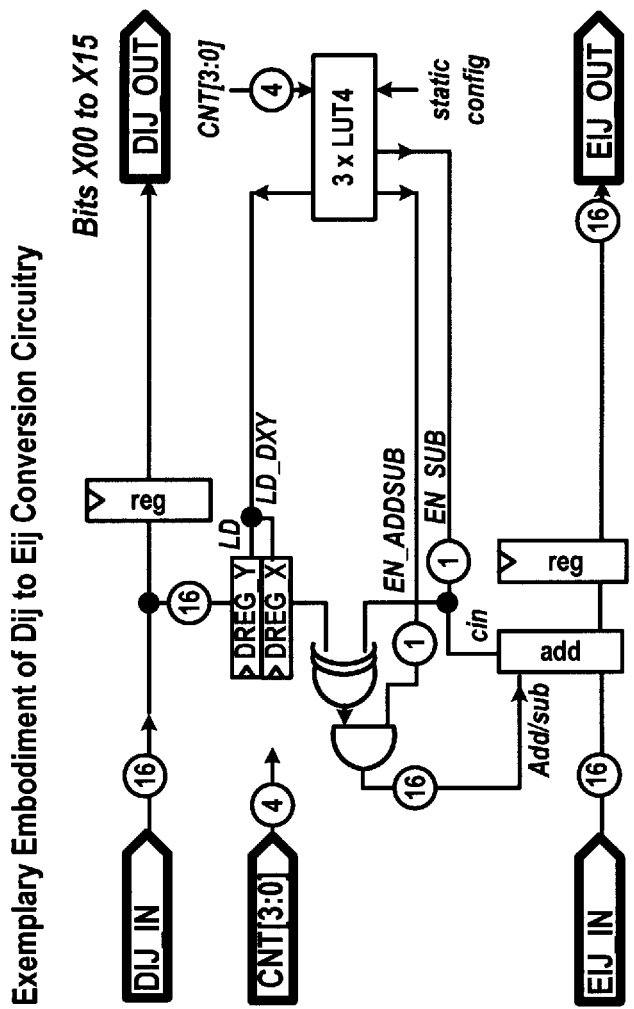
Figure 4E:
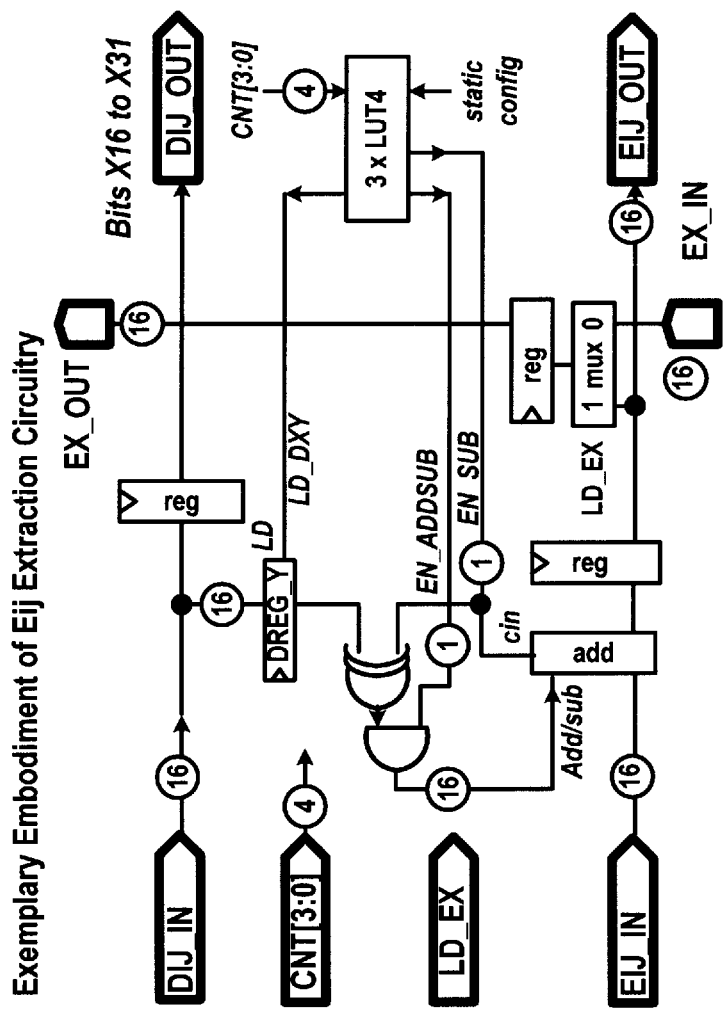
Figure 4F:
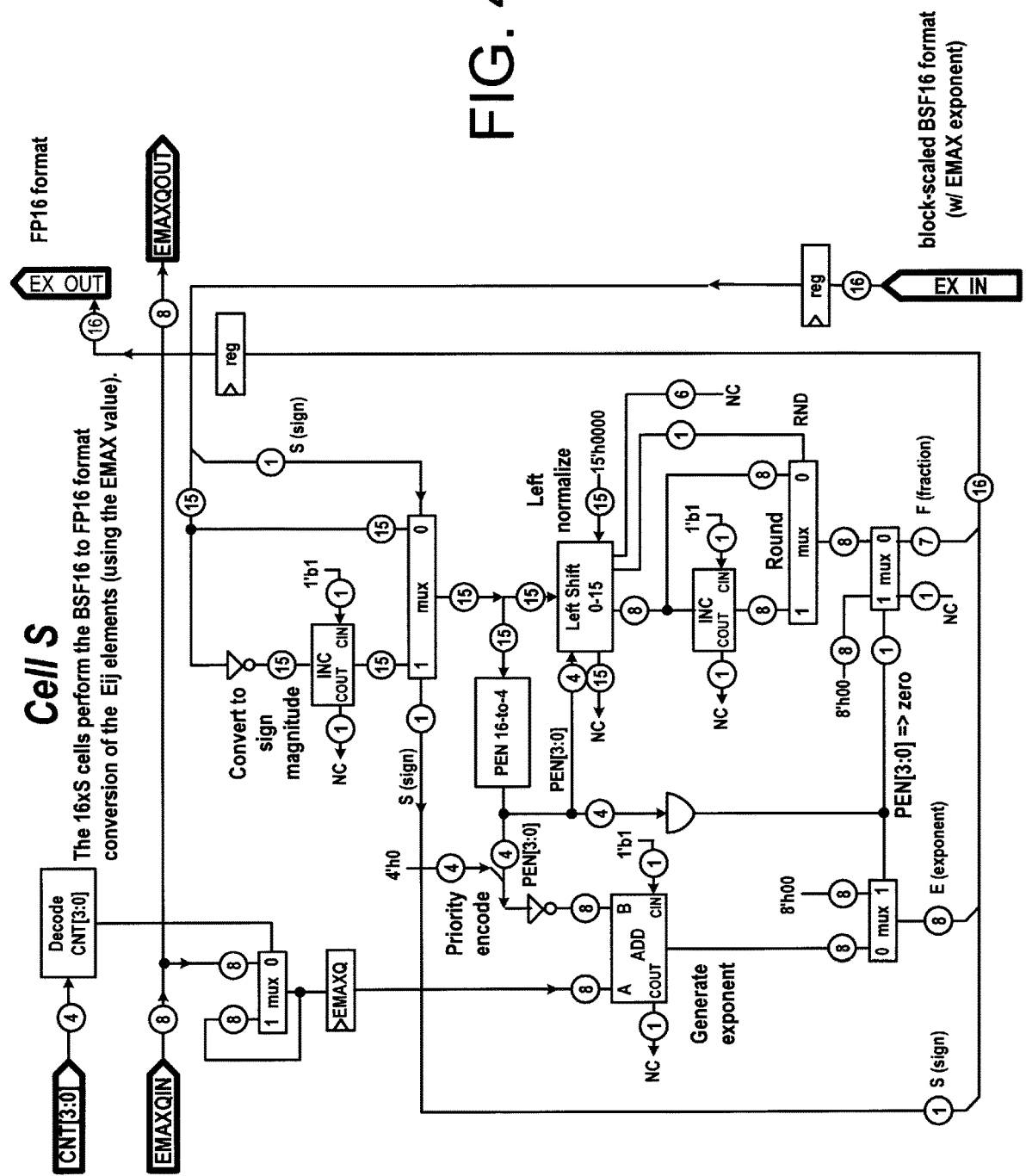
Figure 5A:
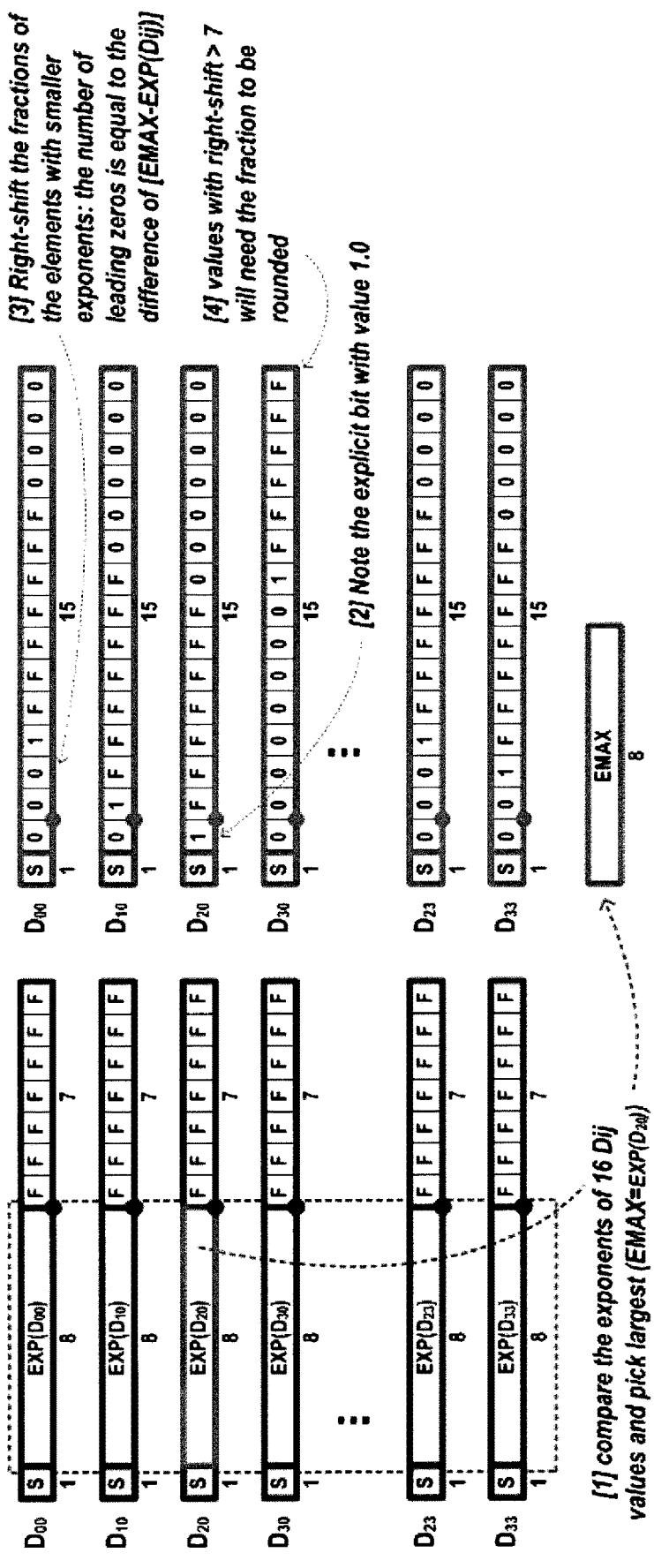
Figure 5B:
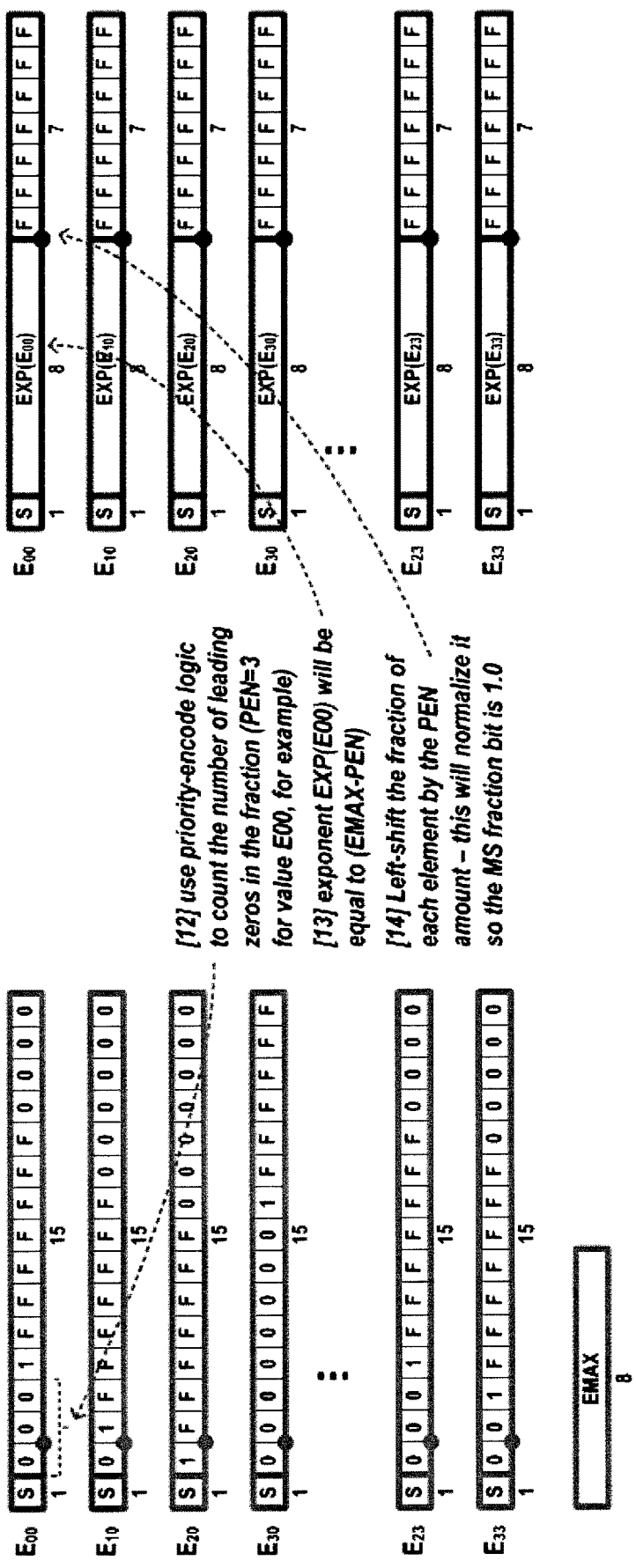
Figure 6A:
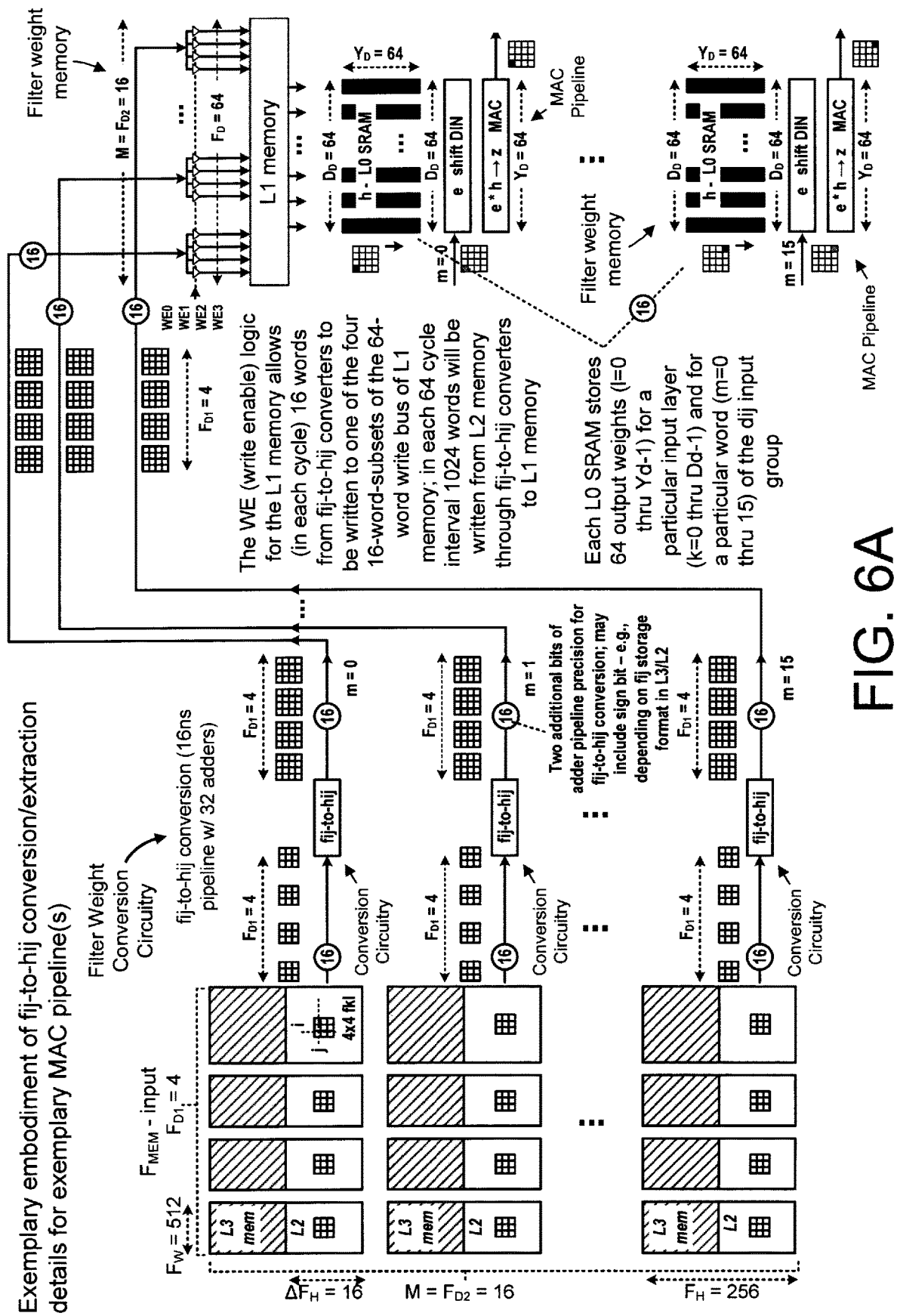
Figure 6C:
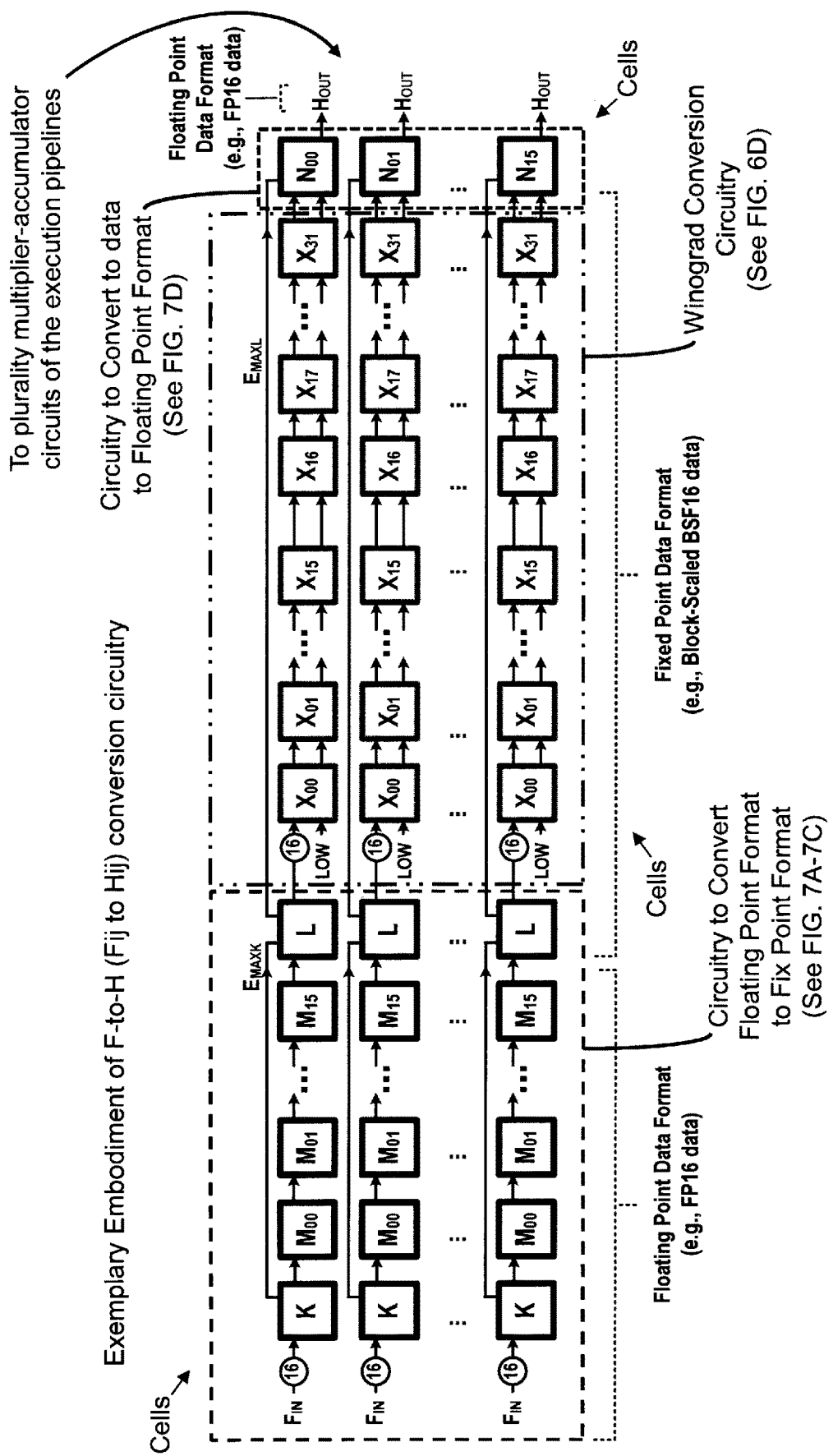

FIG. 1 illustrates a schematic block diagram of a logical overview of an exemplary embodiment of multiplier-accumulator circuitry (including a plurality of multiplier-accumulator circuits (not individually illustrated) of a plurality of multiplier-accumulator processing or execution pipelines ("MAC pipelines" or "MAC processing pipelines" or "MAC execution pipelines"), which are illustrated in block diagram form, in conjunction with memory to store input data, filter weights or coefficients, and output data; in one embodiment, each MAC pipeline includes a plurality of serially connected the multiplier-accumulator circuits (although the individual multiplier-accumulator circuits are not specifically illustrated here); notably, FIG. 1 also illustrates an exemplary pseudo-code of the schematic block diagram of a logical overview of an exemplary embodiment of MAC processing pipelines;

FIG. 2A illustrates a schematic block diagram of a logical overview of an exemplary embodiment of multiplier-accumulator circuitry (including a plurality of multiplier-accumulator circuits (not individually illustrated) of a plurality of multiplier-accumulator processing or execution pipelines ("MAC pipelines" or "MAC processing pipelines" or "MAC execution pipelines"), implementing a Winograd data processing technique, in conjunction with memory to store input data, filter weights or coefficients, and output data, according to certain aspects of the present inventions; in one embodiment, each MAC pipeline includes a plurality of serially connected the multiplier-accumulator circuits (although the individual multiplier-accumulator circuits are not specifically illustrated here); notably, FIG. 2A also illustrates an exemplary pseudo-code of the schematic block diagram of a logical overview of an exemplary embodiment of MAC processing pipelines, implementing a Winograd data processing technique, according to certain aspects of the present inventions; in one embodiment, Eijkm*Hklm multiplication is performed element-by-element wherein the 4×4 elements are not added together until the zij-to-yij conversion; in addition, in one exemplary embodiment, a loop step size of "2" is used for the "I" and "J" loop indexes because 2×2 input pixels are transformed into 2×2 output pixels for each iteration of the "I/J" loops;

FIG. 2B illustrates a schematic block diagram of a physical overview of an exemplary embodiment of a plurality of MAC processing pipelines, wherein the plurality of multiplier-accumulator execution pipelines are configured to implement a Winograd technique of data processing, according to certain aspects of the present inventions; notably, each MAC pipeline includes multiplier-accumulator circuitry (illustrated in block diagram form) wherein each multiplier-accumulator circuitry includes a plurality of multiplier-accumulator circuits (not individually illustrated); in this illustrative exemplary embodiment, the 64×(4×4) input pixels/data at dij, which determine the associated 64×(2×2) output pixels at yij, are processed by a plurality (here, sixteen) of multiplier-accumulator execution pipelines;

FIG. 2C is an exemplary timing overview diagram of the physical overview of the exemplary embodiment illustrated in FIG. 2B, according to certain aspects of the present inventions;

FIG. 3A illustrates a schematic block diagram of exemplary input data (e.g., image data) conversion circuitry and extraction circuitry of the multiplier-accumulator circuitry execution or processing pipelines, implementing a Winograd technique of processing (as illustrated in the logical and physical overviews in FIGS. 2A and 2B, respectively), according to certain aspects of the present inventions, including certain physical and logical overview of an exemplary D-to-E (dij-to-eij) conversion and extraction circuitry and operation of MAC execution pipelines, implementing a Winograd technique of processing; briefly, the L3/L2 memory is read to obtain 4×4 pixel blocks of input data (Dij values); the 4×4 pixel blocks of input data are converted to 4×4 blocks of Eij values, via conversion circuitry, in the dij-to-eij pipelines (in the illustrative embodiment, sixteen dij-to-eij pipelines) wherein each pipeline of the conversion and extraction circuitry correlates to or is associated with a MAC processing pipeline; thereafter, the 4×4 Eij blocks are extracted and shifted into the 16×64 MAC processing pipelines wherein the Eij values are multiplied by the filter coefficients (Hij values) stored in L1 memory and accumulated as Zij values; in this embodiment, each Eij value is used many times (typically 64 or greater) inside the 16×64 MAC pipelines;

FIG. 3B is an exemplary pseudo-code of the exemplary D-to-E conversion circuitry and E extraction circuitry (dij-to-eij conversion and eij extraction embodiment) illustrated in FIG. 3A, according to certain aspects of the present inventions, wherein the D-to-E conversion and extraction is specifically identified therein;

FIG. 3C illustrates a data flow diagram of exemplary input data (e.g., image data) conversion and extraction circuitry (D-to-E conversion circuitry and E extraction circuitry) of a plurality of pipelines (in the illustrative embodiment, sixteen pipelines), implementing a Winograd technique of processing, according to certain aspects of the present inventions, wherein each pipeline of the conversion and extraction circuitry correlates to or is associated with a MAC processing pipeline (see FIG. 3A); briefly, data (DIN) is input into sixteen D/E conversion pipelines of the circuitry to convert such data from a floating point data format to a fixed point data format (e.g., block-scaled data format); here, the input data/values (Dij data/values), each in a floating point data format, are processed and converted to a fixed point data format (e.g., integer format (INT16) or block-scaled format (BSF16)); the conversion circuitry includes "P" cells or circuits (hereinafter cells or circuits are collectively referred to herein as "cells") to receive the Dij data/values in floating point data format and determine the largest exponent (EMAX) of such input data; the "R" cells perform a temporal delay function/operation for the exponent search; the "Q" cells perform the floating point data format to fixed point data format conversion (specifically, FP16 to BSF16 format conversion of the Dij data/values using the EMAX value); thereafter the data, in a fixed point data format, is input into Winograd conversion circuitry (via the "X" cells); here, the "X00-X31" cells perform the D/E conversion of the Winograd technique of processing using the fixed point data format (e.g., BSF16) representation of the input data/values (Dij data/values); thereafter the data/values are input into additional conversion circuitry to generate data/values in a floating point data format, using the data/values, in the fixed point data format, which is output by the Winograd conversion circuitry; here, the "S" cells, using the EMAX value, convert the input data from a fixed point data format to a floating point data format (in this illustrative embodiment, BSF16 to FP16 format conversion of the Eij data/values using the EMAX value); notably, in the drawings, a particular "Cell" is, at times, labeled or identified as "Cell x" where x is P, R, Q, S or X (e.g., Cell P in FIG. 4A);

FIG. 3D is an exemplary timing diagram for the exemplary overview and data flow diagram of the exemplary D-to-E conversion circuitry and E extraction circuitry embodiments of a plurality of pipelines illustrated in FIGS. 3A and 3C, according to certain aspects of the present inventions;

FIGS. 3E and 3F each illustrate selected portions, as identified in FIG. 3D, of the exemplary timing diagram for the overview and data flow diagram of the exemplary D-to-E conversion circuitry and E extraction circuitry embodiments of a plurality of pipelines illustrated in FIGS. 3A and 3C, in accordance with an embodiment of certain aspects of the present inventions;

FIG. 4A illustrates a schematic block diagram of an exemplary P cell/circuit (hereinafter cell/circuit (i.e., cell or circuit) is collectively referred to herein as "cell" or "Cell") of exemplary D-to-E conversion circuitry and E extraction circuitry of FIG. 3C, according to certain aspects of the present inventions, wherein in this exemplary embodiment, the P cell (in this illustrative embodiment, 16 P cell) includes circuitry to identify and/or determine the largest exponent (EMAX) of the input data/values (Dij data/values) in floating point data format (in this illustrative embodiment, FP16 format); in this embodiment, the EMAX register is loaded with exponent of first Dij value, and the exponent of each of the remaining Dij data/values is compared with EMAXP, replacing EMAXP if larger;

FIG. 4B illustrates a schematic block diagram of an exemplary R cell of exemplary D-to-E conversion circuitry and E extraction circuitry of FIG. 3C, according to certain aspects of the present inventions, wherein in this exemplary embodiment, R cells include circuitry to temporally delay the input data/values (Dij data/values) a predetermined amount of time to identify and/or determine largest exponent (EMAX) of the input data/values (Dij data/values) before being input into or provided to the floating point to fixed point conversion circuitry (in this illustrative embodiment, accomplished via the Q cells);

FIG. 4C illustrates a schematic block diagram of an exemplary Q cell of exemplary D-to-E conversion circuitry and E extraction circuitry of FIG. 3C, according to certain aspects of the present inventions, wherein in this exemplary embodiment, Q cells (sixteen cells in this illustrative embodiment) convert the input data/values (Dij data/values) from a floating point data format to fixed point data format using the EMAX value; in this illustrative embodiment, the Q cells convert the Dij data/values from a FP16 data format to a BSF16 data format; [1] compare the exponents of 16 Dij values and pick largest (EMAXP); [2] note—if overflow margin is needed, the EMAXQ value can be incremented by +1 for each binade of overflow range that is needed; [3] right-shift the fractions of the elements with smaller exponents: the number of leading zeros is equal to the difference of [EMAX−EXP(Dij)]; [4] values with right-shift >7 will need the fraction to be rounded; 151 negative values (S=1) will need to be converted to two's complement (invert the 16 bits and increment)—this is illustrated in this exemplary embodiment; [6] the Dij BSF16 values can now be added and subtracted (as if they were simple twos complement integers) to form the Eij values;

FIGS. 4D and 4E illustrate schematic block diagrams of exemplary X cells (X00-X31 cells) of the exemplary D-to-E conversion circuitry and E extraction circuitry, respectively, of FIG. 3C (dij-to-eij conversion and extraction circuitry) wherein the D-to-E conversion circuitry employs Winograd techniques of processing to generate input data/values (Eij) using the fixed point data format representation of the input data/values (Dij), according to certain aspects of the present inventions; NOTE [1]—the conversion logic is included in cell positions X00 through X31, while the extraction logic is only in cell positions X16 through X31; NOTE [2] —a 4b counter CNT[3:0] is shared by the 32 conversion/extraction cells. Alternatively, a local 4b counter could be included in each cell to save the cost of the 4 wires (with each counter set to "1111"); NOTE [3]—the EN_ADDSUB, EN_SUB, and LD DXY control signals are a function of the 4b counter state and the static configuration bits (which encode the bit position of the conversion cell). 3 LUT4 cells can generate these 3 signals;

FIG. 4F illustrates a schematic diagram of an exemplary S cell of exemplary D-to-E conversion circuitry and E extraction circuitry of FIG. 3C, according to certain aspects of the present inventions, wherein in this exemplary embodiment, the S cell (in this illustrative embodiment, sixteen cells in total), using the EMAX value, performs data format conversion, after Winograd processing, from a fixed point data format to a floating point data format (in this illustrative embodiment, BSF16 to FP16 format conversion of the input data/values using the EMAX value) to generate input data/values (Eij), in a floating point data format, for processing by the MAC execution pipelines (see, e.g., FIGS. 2B and 3A);

[11] Negative values (S=1) will need to be converted to sign magnitude (invert the 16 bits and increment)—this is not illustrated in this example; [12] use priority-encode logic to count the number of leading zeros in the fraction (PEN=3 for value E00, for example); [13] exponent EXP(E00) will be equal to (EMAX-PEN); [14] Left-shift the fraction of each element by the PEN amount—this will normalize it so the MS fraction bit is 1.0; [15] Round the fraction to 7 bits (plus hidden/implicit "1") amount—if the fraction overflows, increment the exponent;

FIG. 5A illustrates processes or operations of certain conversion circuitry (e.g., the Q cells of the D-to-E conversion circuitry—see FIG. 3C) to convert input values/data (Dij values/data) from a floating point data format (a FP16 format in the illustrative embodiment) to a fixed point data format (a BSF16 format in the illustrative embodiment), according to an embodiment of the present inventions; here, a BSF16 format allows each group of sixteen Dij values to employ a common exponent (EMAX), thereby reducing and/or eliminating concerns regarding alignment and normalization operations (which may be an issue in connection with addition of values using FP16 formats); each Dij value may employ additional bits available for the fraction portion of the data—thereby increasing the precision of the BSF16 values; notably, the two formats use the same or substantially the same amount of memory capacity and memory bandwidth; however, data in a fixed point data format, such as block-scale format (e.g., BSF16), may be added via two's complement integers; notably, the processes or operations of conversion circuitry to convert values/data from a floating point data format (a FP16 format in the illustrative embodiment) to a fixed point data format (a BSF16 format in the illustrative embodiment) described and illustrated in FIG. 5A may be employed in connection with the floating point data format to fixed point data format conversion circuitry in the filter weight (F-to-H) conversion circuitry and the output data (Z-to-Y) conversion circuitry—albeit the bit width may differ; the processes or operations illustrated in FIG. 5A are exemplary and not limiting in that other techniques may be employed to convert values/data from a floating point data format to a fixed point data format (here, BSF) than is described herein; note—if overflow margin is needed, the EMAX value can be incremented by +1 for each binade of overflow range that is needed; [5] Negative values (S=1) will need to be converted to two's complement (invert the 16 bits and increment)—this is not illustrated in this example; [6] The Dij BSF16 values can now be added and subtracted (as if they were simple twos complement integers) to form the Eij values;

FIG. 5B illustrates processes or operations of certain conversion circuitry (e.g., the S cells of the D-to-E conversion circuitry—see FIG. 3C) to convert the input values/data (Eij values/data), in a fixed point data format (a BSF16 format in the illustrative embodiment) to input values/data in a floating point data format (an FP16 format in the illustrative embodiment), according to an embodiment of the present inventions; in this way, the input values/data (Eij values/data) are in a predetermined data format for processing by the MAC execution pipelines (e.g., the embodiments illustrated in FIGS. 2B and 3A); as noted above, the two formats use the same or substantially the same amount of memory capacity and memory bandwidth; notably, the processes or operations of conversion circuitry to convert values/data from a fixed point data format (a BSF16 format in the illustrative embodiment) to a floating point data format (a FP16 format in the illustrative embodiment) described and illustrated in FIG. 5B may be employed in connection with the fixed point data format to floating point data format conversion circuitry in the filter weight (F-to-H) conversion circuitry and the output data (Z-to-Y) conversion circuitry—albeit the bit width may differ; the processes or operations illustrated in FIG. 5B are exemplary and not limiting in that other techniques may be employed to convert values/data from a fixed point data format (here, BSF) to a floating point data format than is described herein; [11] Negative values (S=1) will need to be converted to sign magnitude (invert the 16 bits and increment)—this is not illustrated in this example; [15] Round the fraction to 7 bits (plus hidden/implicit "1") amount—if the fraction overflows, increment the exponent;

FIG. 6A illustrates a schematic block diagram of a physical and logical overview of an exemplary filter weight data/values (F-to-H) conversion and extraction circuitry and operation embodiment of a plurality of multiplier-accumulator execution pipelines, implementing a Winograd technique of processing (as illustrated in the logical and physical overviews in FIGS. 2A and 2B, respectively), according to certain aspects of the present inventions, wherein each pipeline of the conversion and extraction circuitry correlates to or is associated with a MAC processing pipeline (see FIG. 3A);

FIG. 6B is an exemplary pseudo-code of exemplary F-to-H (fij-to-hij) conversion and extraction embodiment of the multiplier-accumulator execution pipelines of FIG. 6A, according to certain aspects of the present inventions;

FIG. 6C illustrates a data flow diagram of exemplary F-to-H conversion circuitry and of a plurality of filter weight conversion pipelines (sixteen in the illustrative embodiment), implementing a Winograd technique of processing, according to certain aspects of the present inventions; briefly, filter weight data/values (FIN) are input into F-to-H conversion circuitry pipelines (in the illustrative embodiment, sixteen pipelines) to convert filter weight data from a floating point data format to a fixed point data format (e.g., block-scaled data format); here, the filter weight or coefficient data/values (Fij data/values), each in a floating point data format, are processed and converted to a fixed point data format (e.g., block-scaled format (BSF16)); the conversion circuitry includes "K" cells/circuits to receive the Fij data/values in floating point data format and determine or identify the largest exponent (EMAX) of the filter weight or coefficient data/values; the "M" cells perform a temporal delay function/operation for the exponent search; the "L" cells perform the floating point data format to fixed point data format conversion (specifically, FP16 to BSF16 format conversion of the Fij data/values using the EMAXK value); thereafter the data, in a fixed point data format, is input into Winograd processing/conversion circuitry (via the "X" cells); here, the "X00-X31" cells perform the F-to-H conversion of the Winograd technique of processing using the fixed point data format (e.g., BSF16) representation of the filter weight data/values (Fij filter weight data/values); thereafter the filter weight data/values are input into additional conversion circuitry to convert the filter weights or coefficients (which are output by the Winograd processing circuitry) from a fixed point data format to a floating point data format; here, the "N" cells, using the EMAXL value of the filter weights/coefficients, convert the data from a fixed point data format to a floating point data format (in this illustrative embodiment, BSF16 to FP16 format conversion of the Hij data/values using the EMAXL value) and output the filter weights/coefficients to memory local to or associated with particular MAC processing pipelines (see, e.g., FIG. 6A), for example, L1 memory and L0 memory (e.g., SRAM); cell/ circuit is collectively referred to herein as "cell" or "Cell", and, in the drawings, a specific "Cell" is, at times, labeled or identified as "Cell x" where x is K, L, M, N or X (e.g., Cell K in FIG. 7A); notably, FIGS. 7A-7D illustrate, in exemplary circuit block diagram form, the cells of the logical block diagram of the exemplary F-to-H conversion circuitry illustrated in FIG. 6C.

Figure 6D:
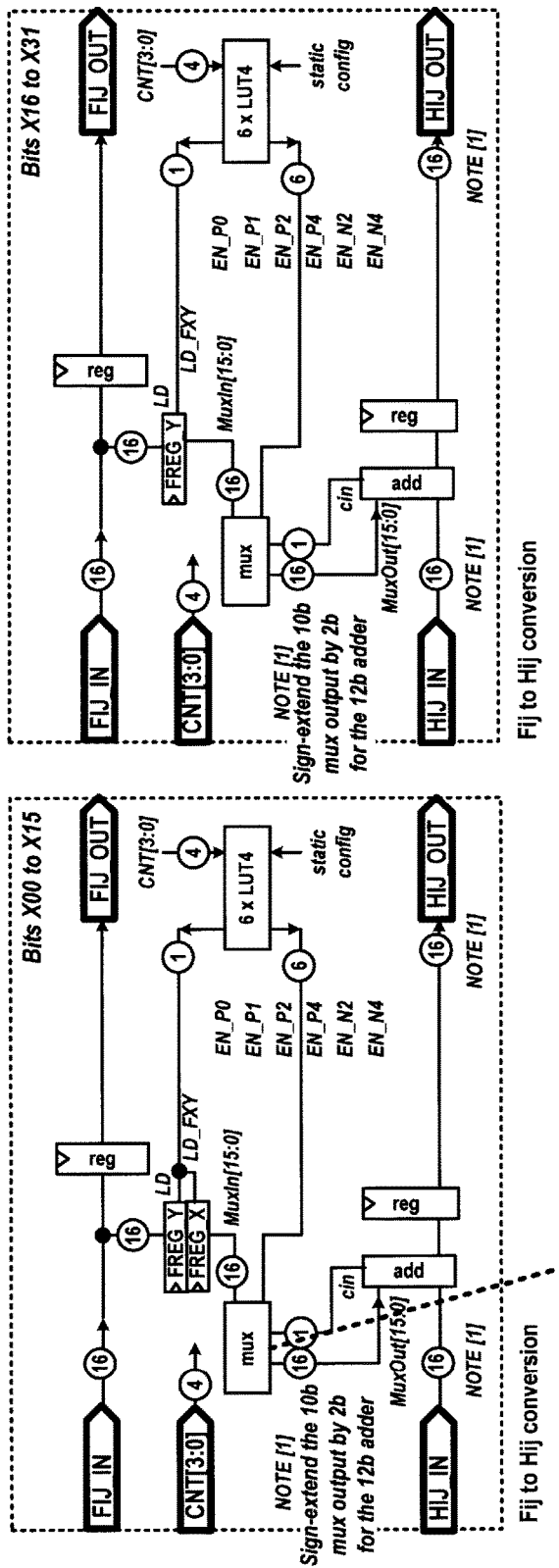
Figure 6D:
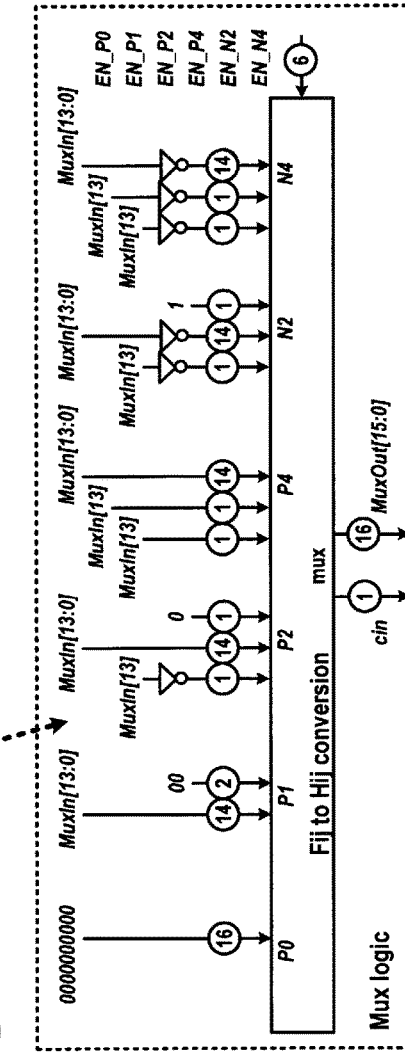
Figure 7A:
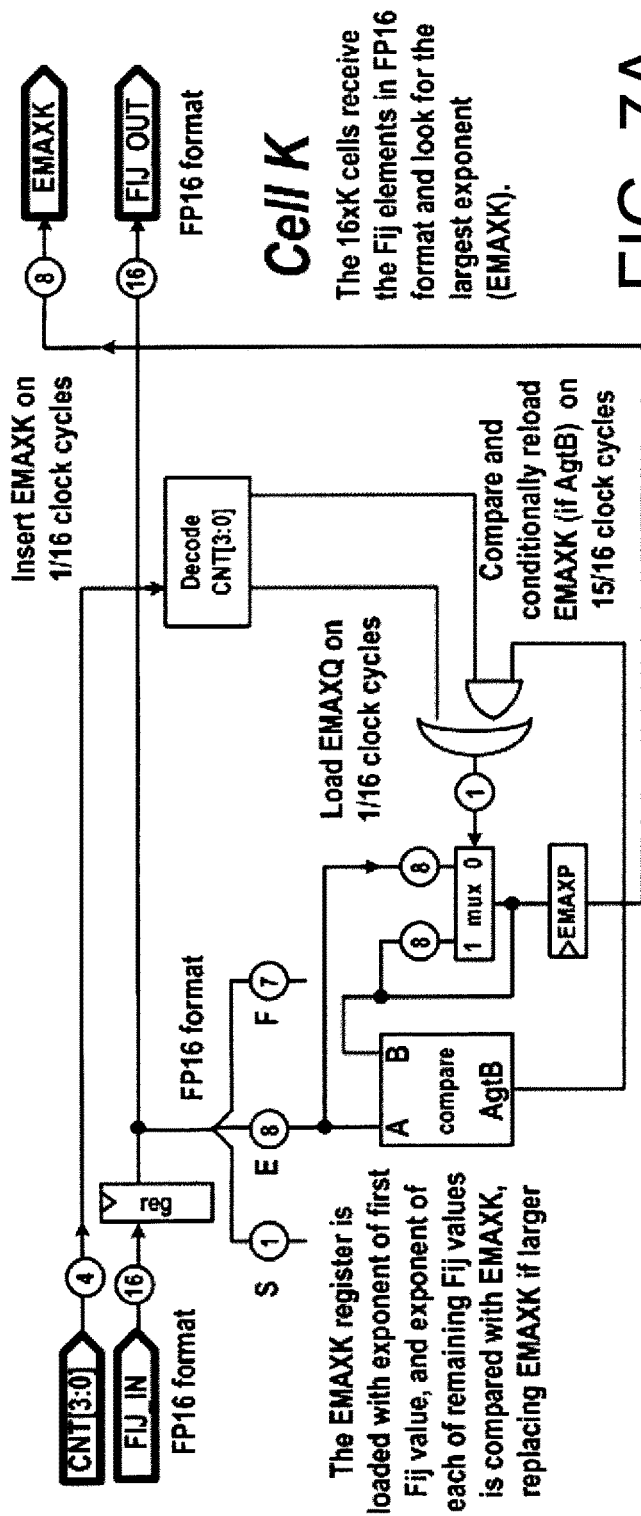
Figure 7B:
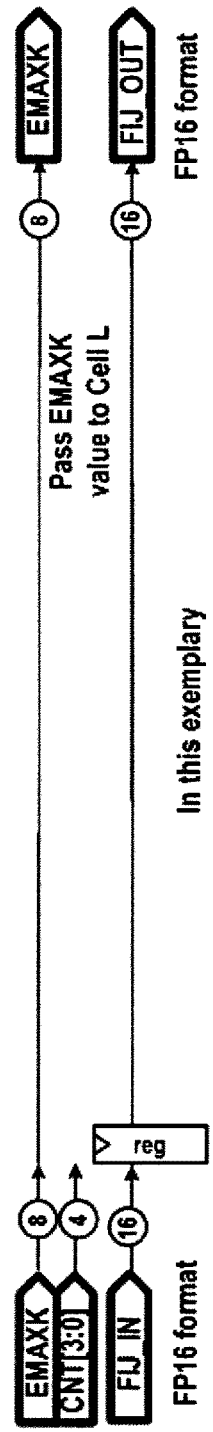
Figure 7C:
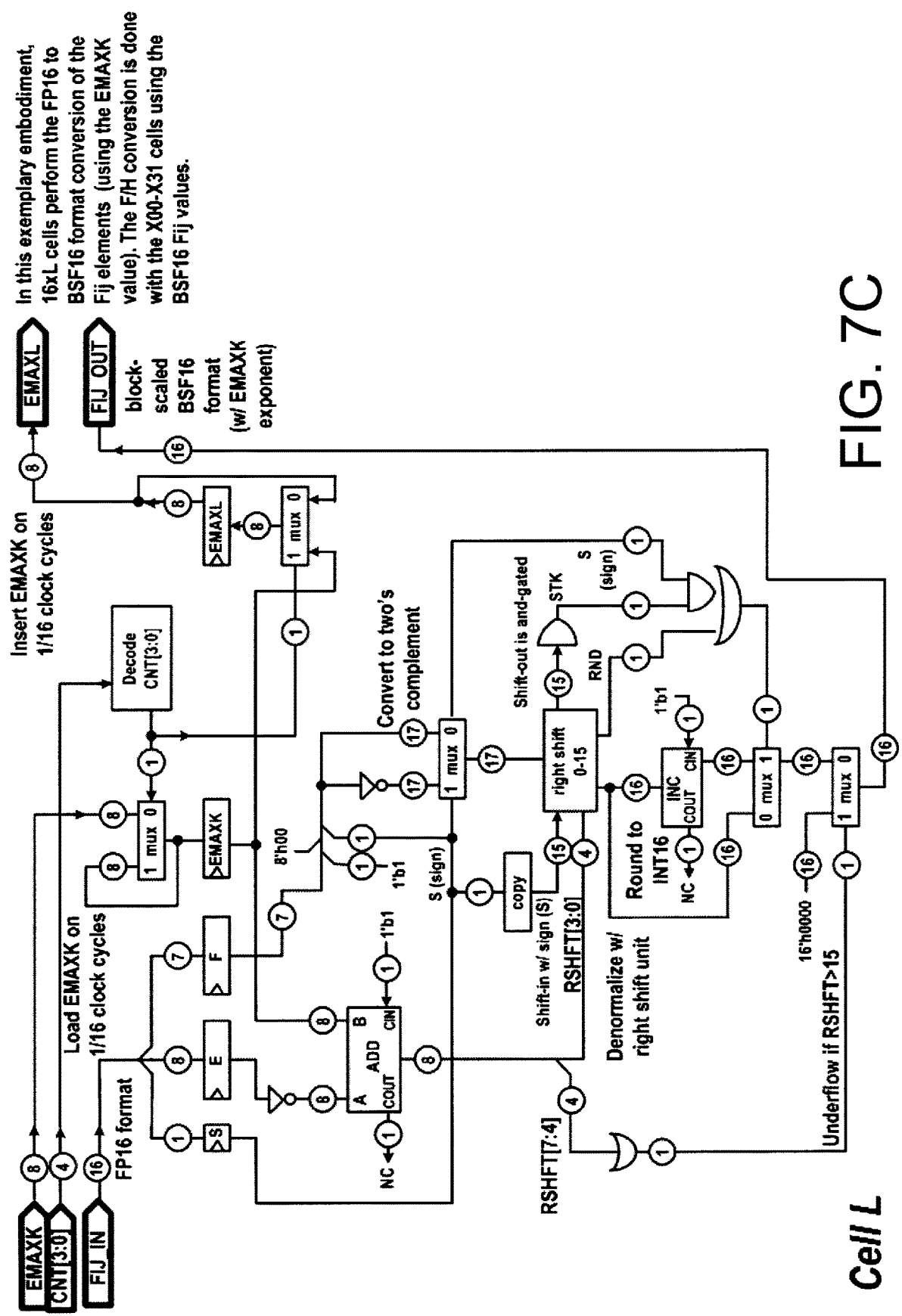
Figure 7D:
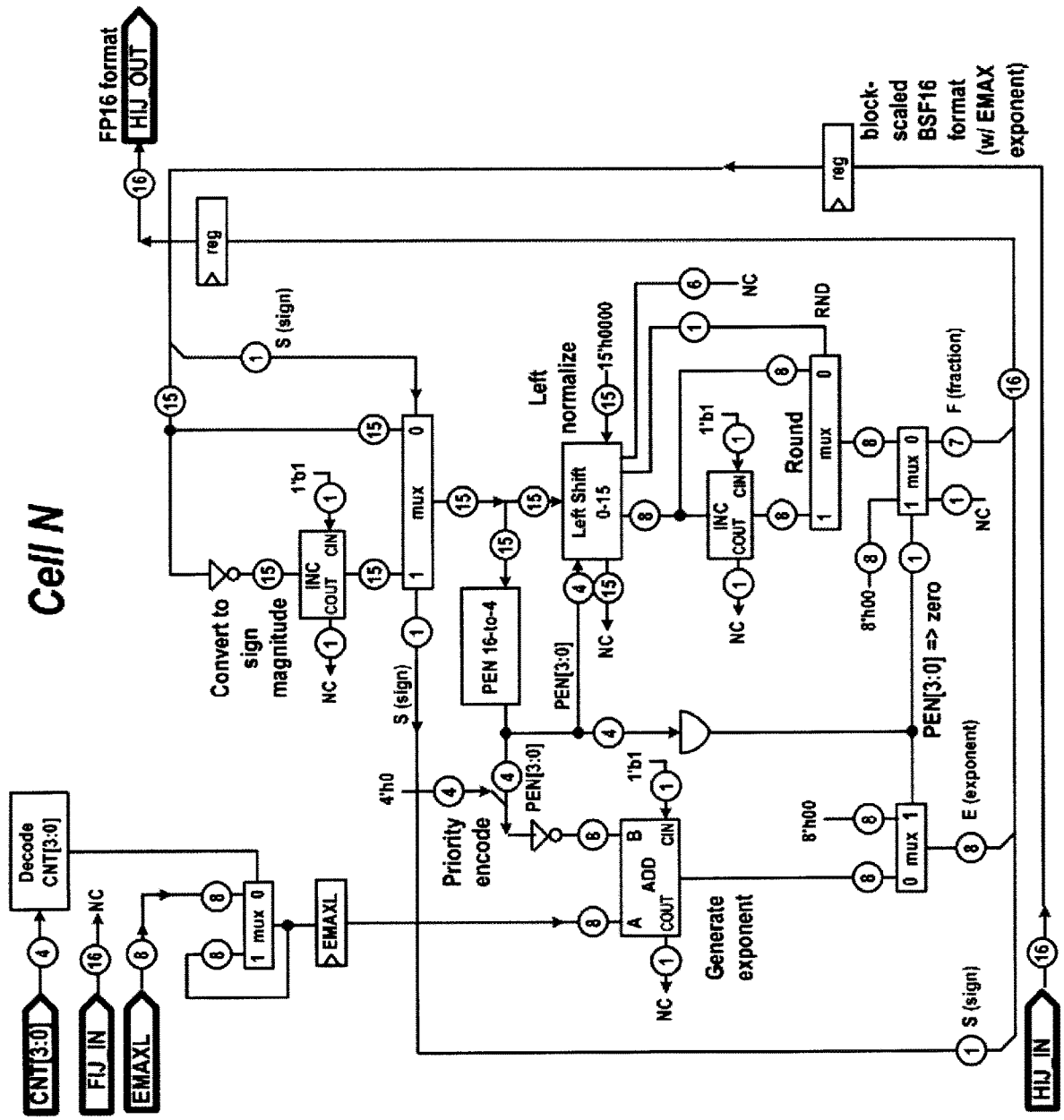
Figure 8A:
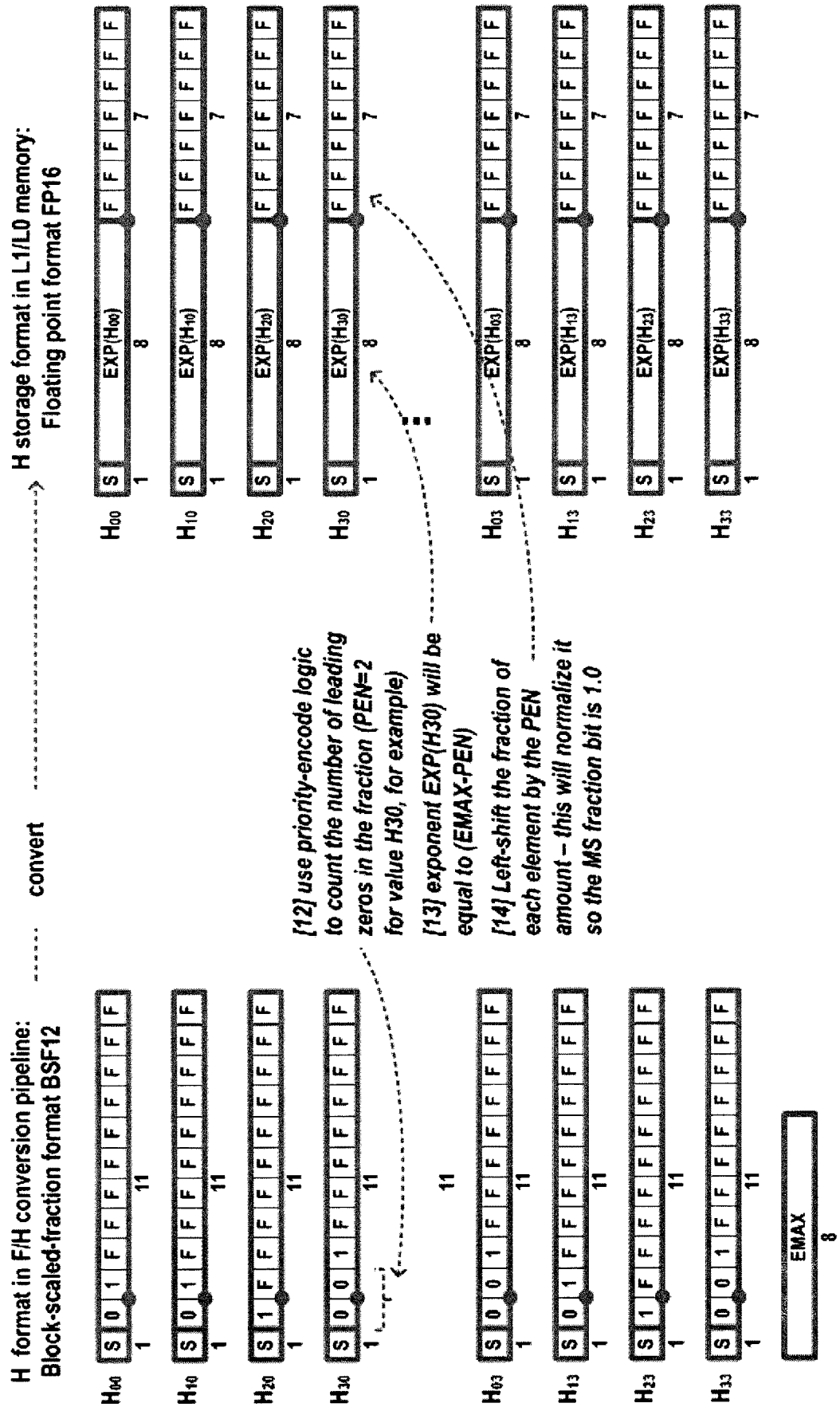
Figure 8B:
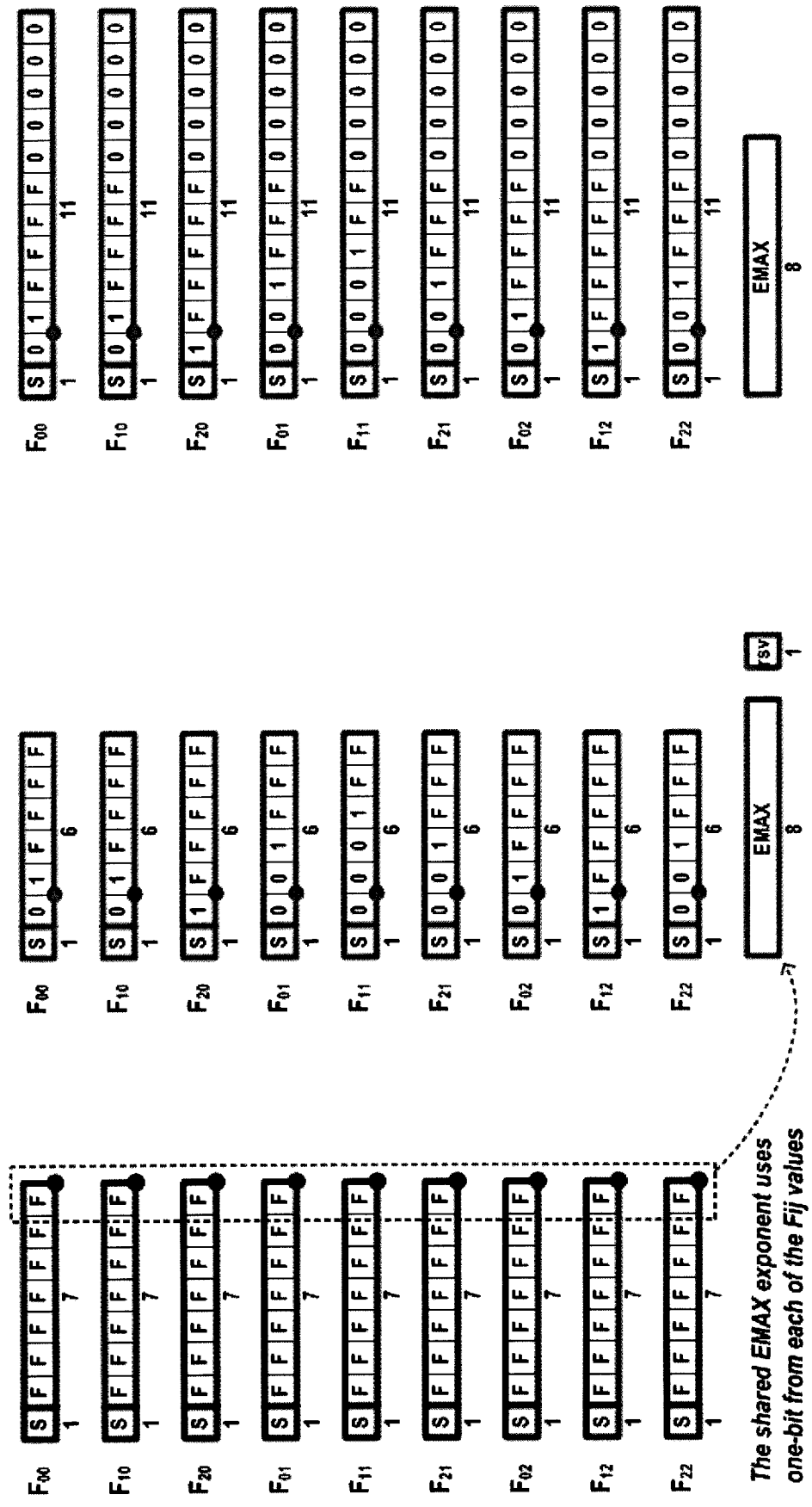
Figure 9A:
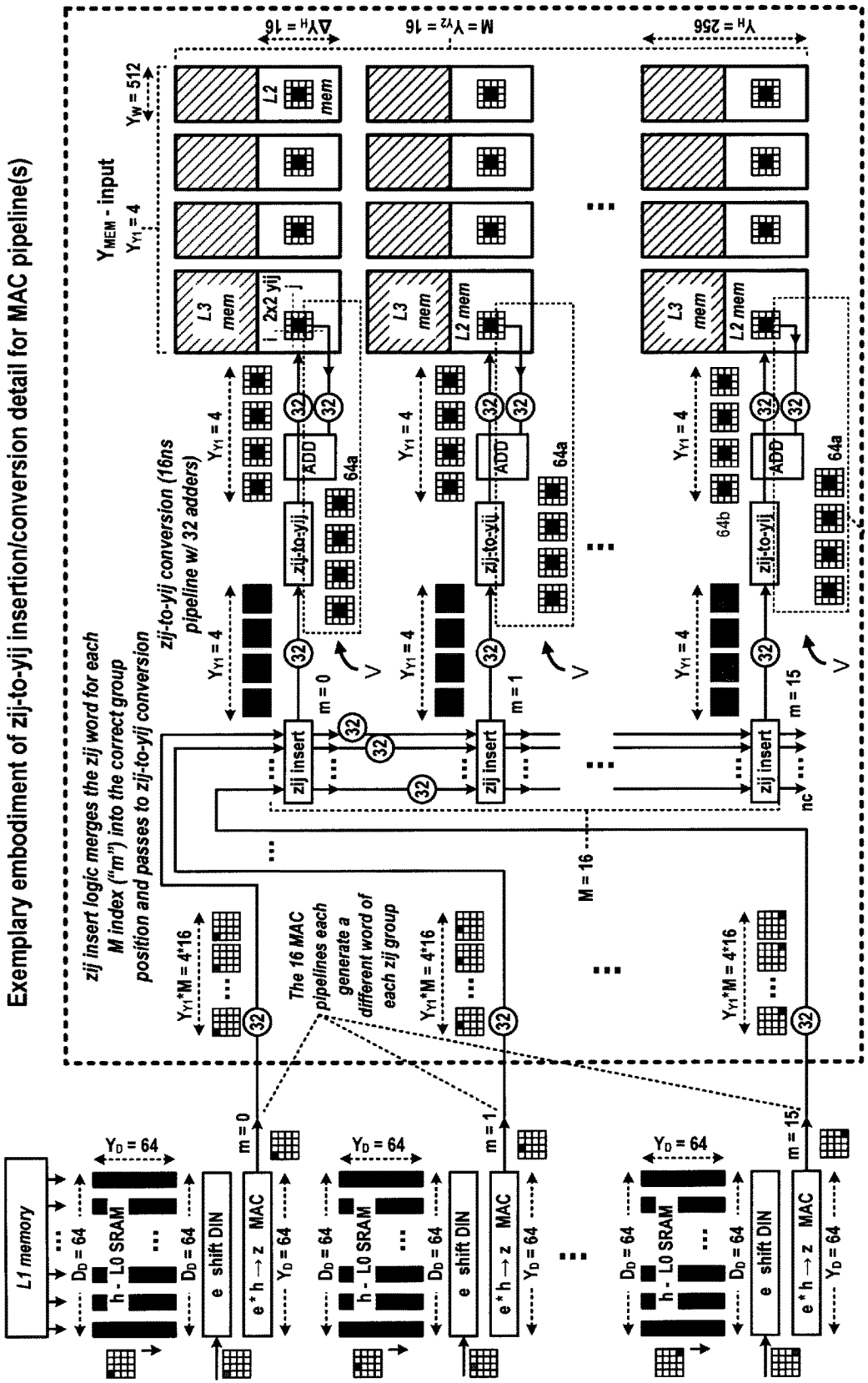
Figure 9C:
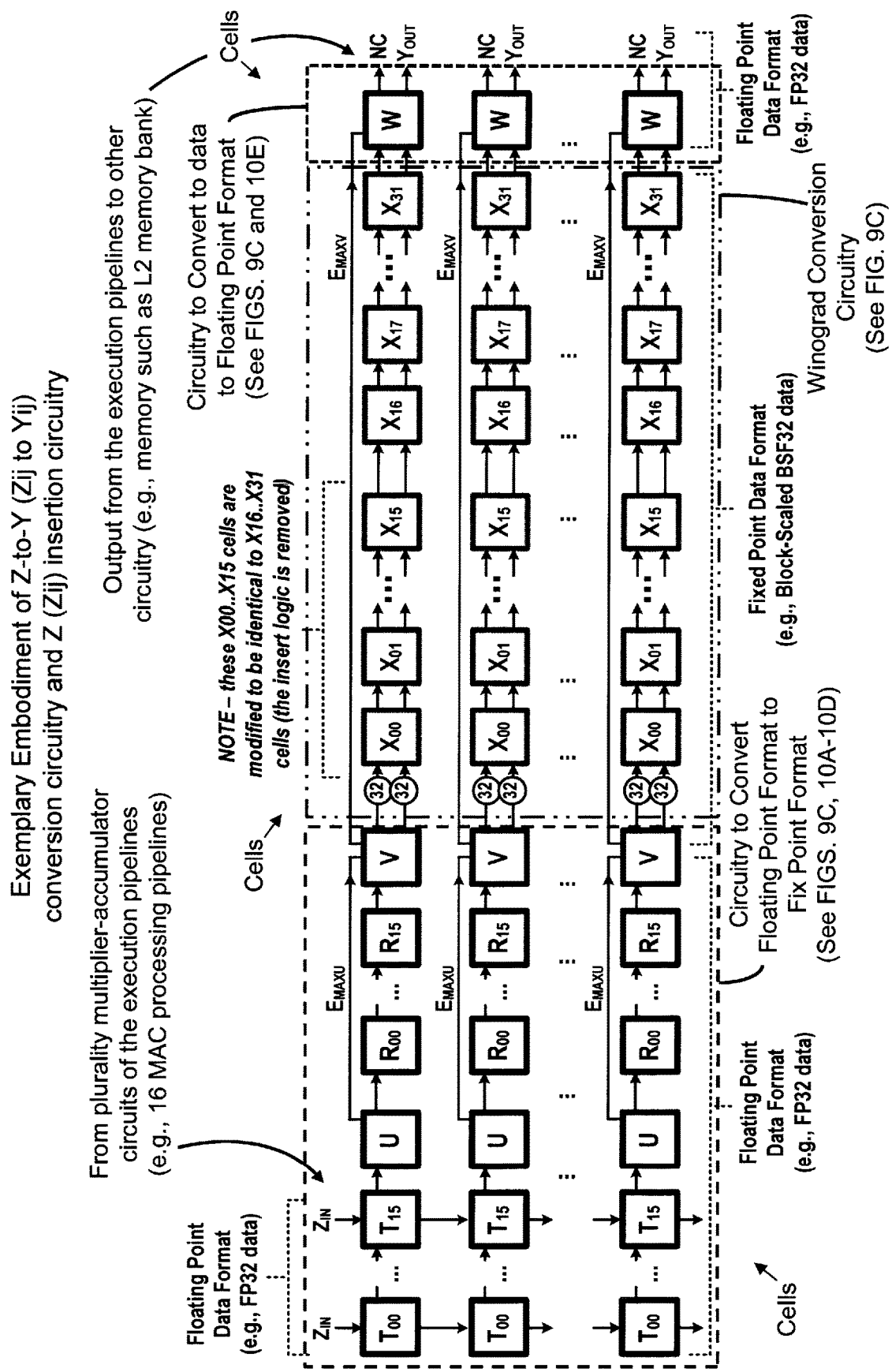
Figure 9D:
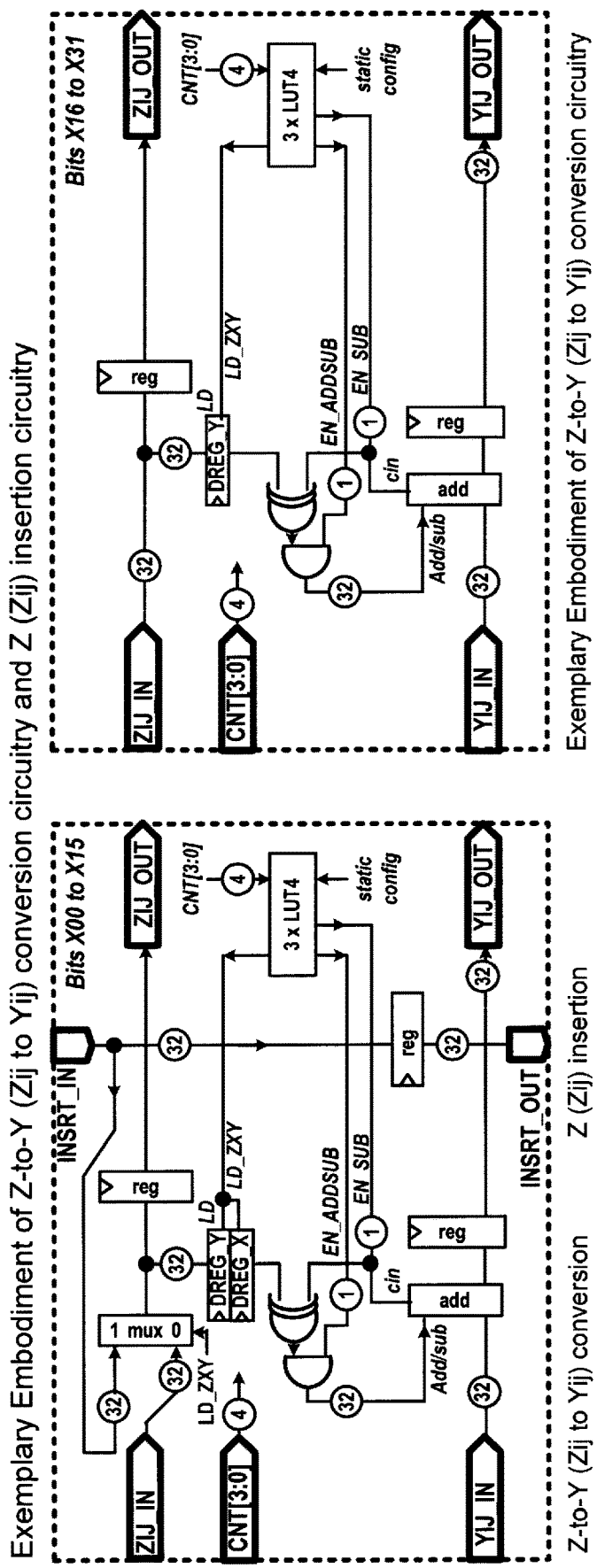
Figure 10B:
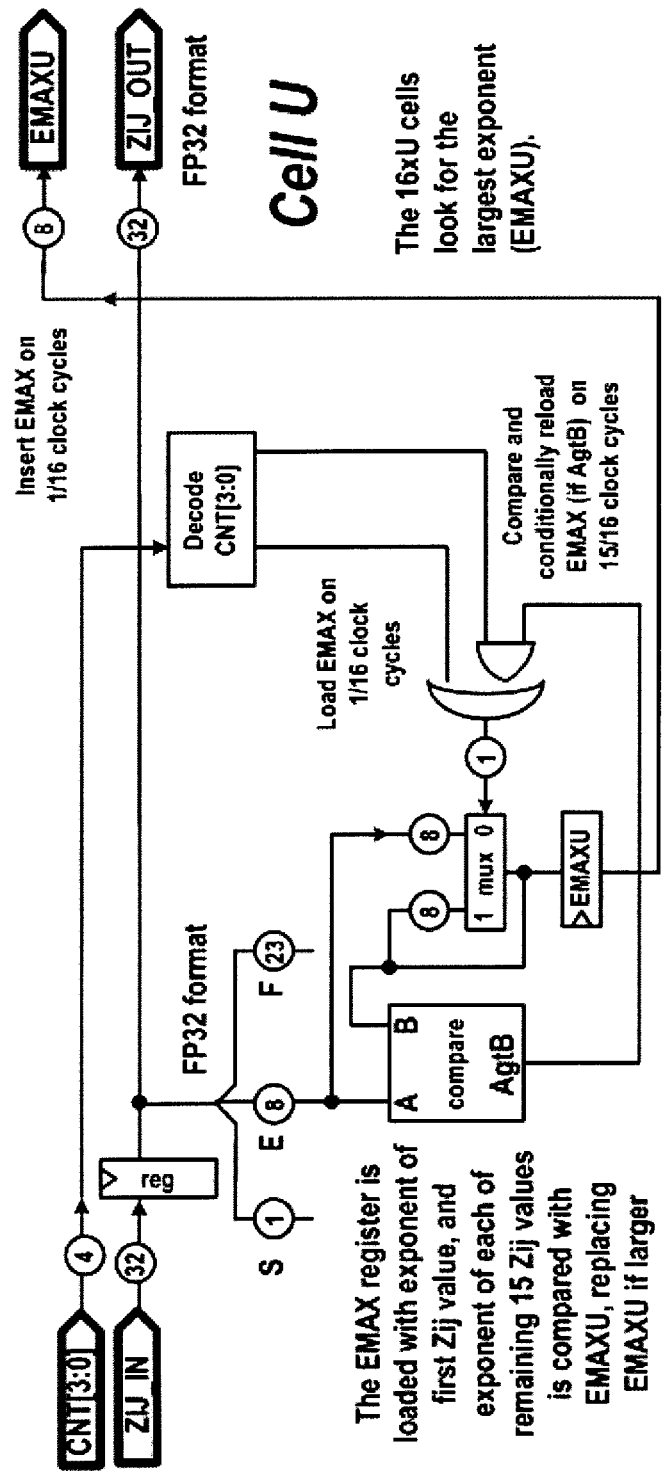
Figure 10D:
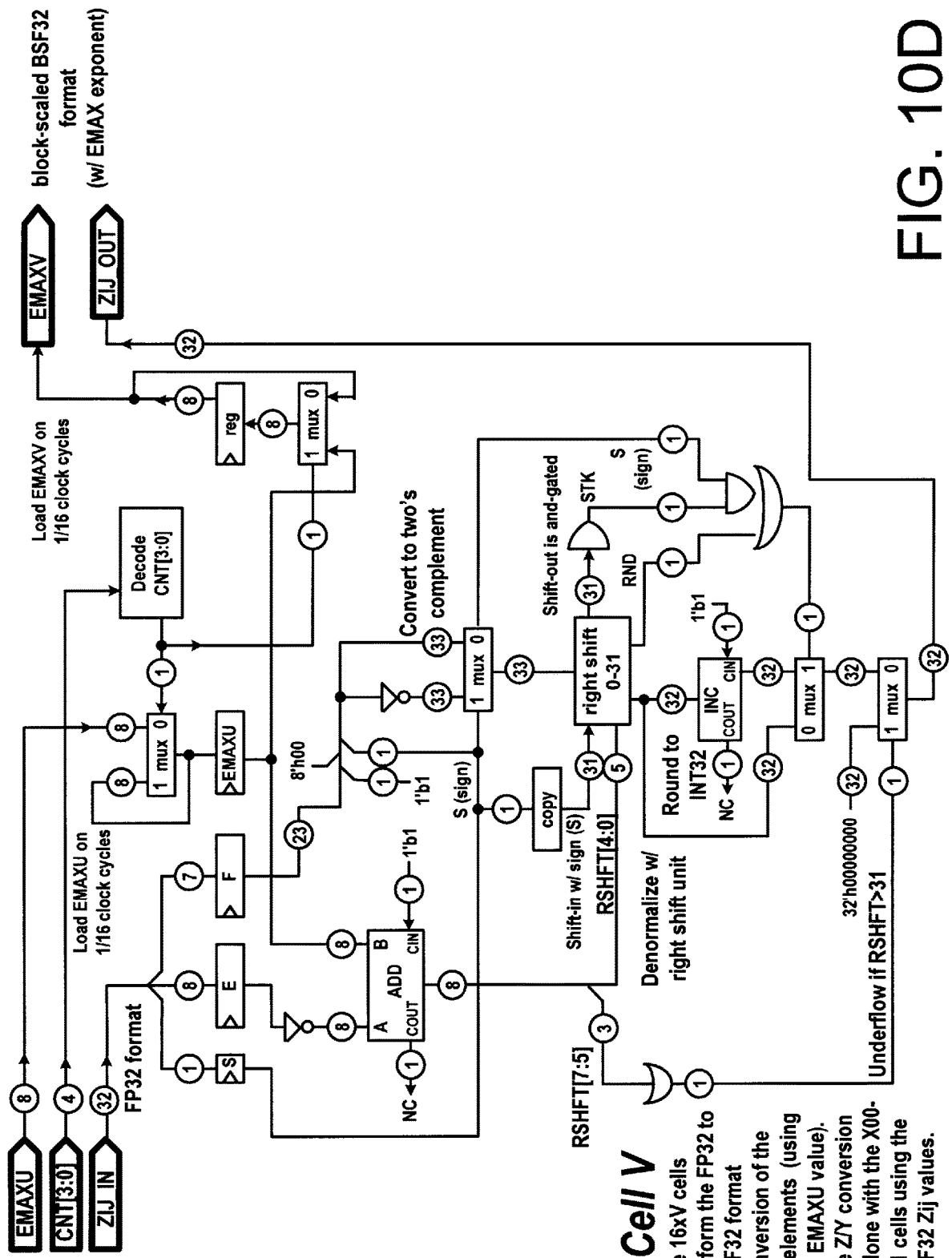
Figure 10E:
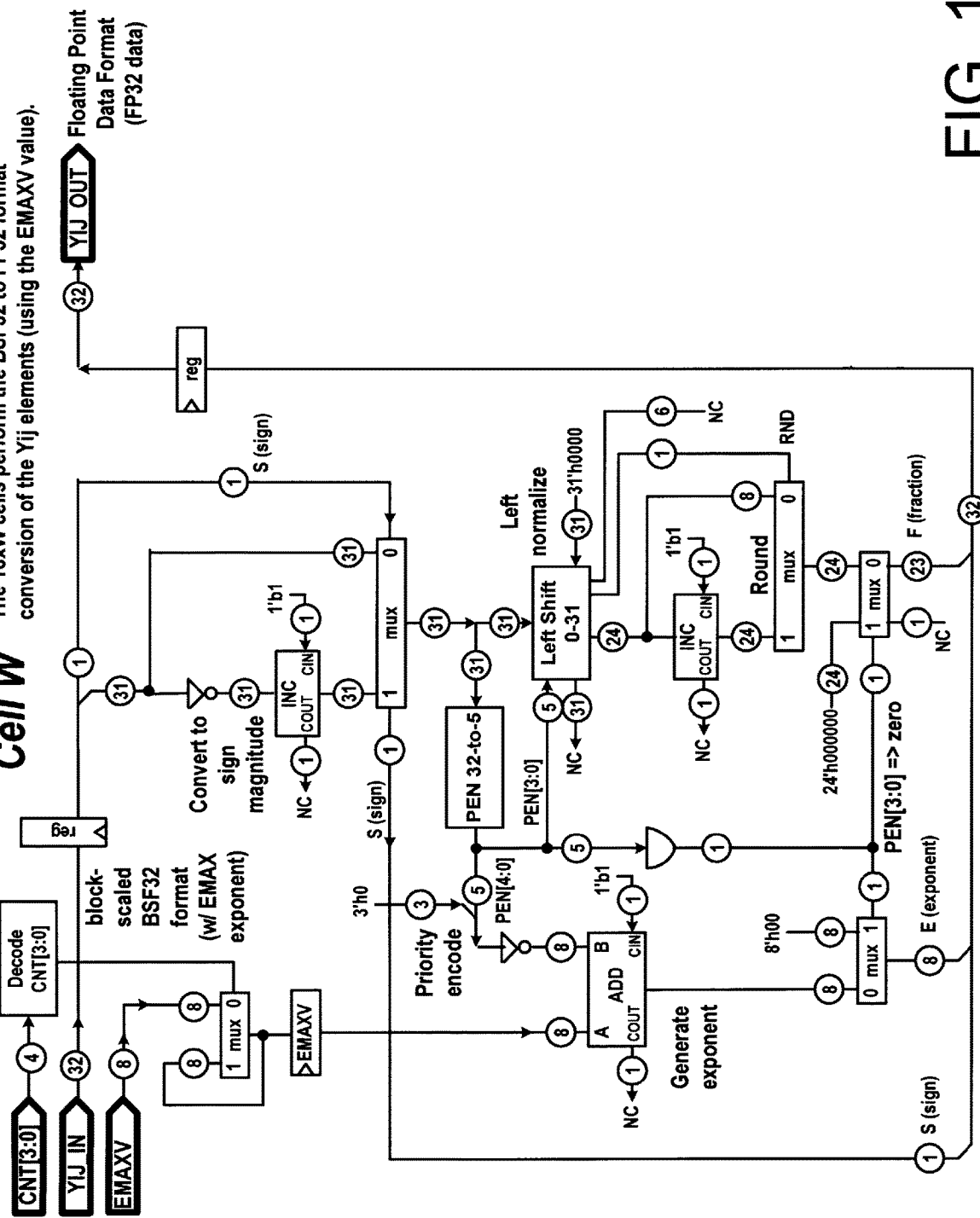

FIG. 6D illustrates a schematic diagram of two exemplary cells of exemplary F-to-H (fij-to-hij) conversion circuitry of the execution pipeline of FIG. 6A, according to certain aspects of the present inventions; notably, fij-to-hij conversion circuitry in this exemplary embodiment includes sixteen of the left cell and sixteen of the right cell wherein the fij-to-hij conversion circuitry includes (i) data registers for the fij and hij weight values, (ii) control logic for sequencing, and (iii) adder logic for the conversion; in addition, FIG. 6D further illustrates a schematic block diagram of an exemplary embodiment of a multiplexer (mux) circuitry and adder circuitry of the exemplary fij-to-hij conversion circuitry, according to certain aspects of the present inventions; NOTE [2]—a 4b counter CNT[3:01 is shared by the 32 conversion/extraction cells; Alternatively, a local 4b counter could be included in each cell to save the cost of the 4 wires; NOTE 13]—the LD FXY, EN P1, EN P2, EN P4, EN N2, and EN N4 control signals are a function of the 4b counter state and the static configuration bits (which encode the bit position of the conversion cell). 6 LUT4 cells can generate these 6 signals; Background—The figure shows the elements of the F/H conversion pipeline. The 16 Fij elements are shifted into the X00-X31 cells, and held in the FREG_X and FREG_Y registers. The 16 Hij elements are shifted past these 32 positions, and the appropriate Fij values are accumulated into the Hij elements. The 16 Hij values are then shifted out of the F/H conversion pipeline and shifted into the L1 SRAM memory;

FIG. 7A illustrates a schematic block diagram of an exemplary K cell of exemplary F-to-H conversion circuitry of FIG. 6C, according to certain aspects of the present inventions, wherein in this exemplary embodiment, the K cell (sixteen in this illustrative embodiment) includes circuitry to identify and/or determine the largest exponent (EMAX) of the filter weight data/values (Fij data/values) in floating point data format (in this illustrative embodiment, FP16 format); in this embodiment, the EMAXK register is loaded with exponent of first Fij value, and the exponent of each of the remaining Fij values is compared with EMAXK, replacing EMAXK if larger;

FIG. 7B illustrates a schematic block diagram of an exemplary M cell of exemplary F-to-H conversion circuitry of FIG. 6C, according to certain aspects of the present inventions, wherein in this exemplary embodiment, M cells include circuitry to temporally delay the filter weight data/values (Fij data/values) a predetermined amount of time to identify and/or determine largest or largest exponent (EMAX) of the filter weight data/values (Fij data/values) before being input into or provided to the floating point data format to fixed point data format conversion circuitry (in this illustrative embodiment, data format conversion implemented via the L cells);

FIG. 7C illustrates a schematic block diagram of an exemplary L cell of exemplary F-to-H conversion circuitry of FIG. 6C, according to certain aspects of the present inventions, wherein in this exemplary embodiment, L cells (sixteen cells in this illustrative embodiment) convert the filter weight data/values (Fij data/values) from a floating point data format to fixed point data format (in this illustrative embodiment, FP16 data format to BSF16 data format) using the EMAXK value; thereafter the filter weight data/values, in a fixed point data format, are applied to Winograd processing circuitry (e.g., FIGS. 6D), to generate Winograd processed filter weight data/values (Hij data/values) of FIG. 6C, according to certain aspects of the present inventions; [1] compare the exponents of 16 Fij values and pick largest (EMAXP); [2] note—if overflow margin is needed, the EMAXQ value can be incremented by +1 for each binade of overflow range that is needed; [3] Right-shift the fractions of the elements with smaller exponents: the number of leading zeros is equal to the difference of [EMAX−EXP(Fij)]; [4] values with right-shift >7 will need the fraction to be rounded; [5] Negative values (S=1) will need to be converted to two's complement (invert the 16 bits and increment)—this is illustrated in this example; [6] The Fij BSF16 values can now be added and subtracted (as if they were simple twos complement integers) to form the Hij values;

FIG. 7D illustrates a schematic diagram of an exemplary N cell of exemplary F-to-H conversion circuitry of FIG. 6C, according to certain aspects of the present inventions, wherein in this exemplary embodiment, the N cell (in this illustrative embodiment, sixteen cells in total), using the EMAXL value, perform data format conversion, after Winograd processing, of the filter weight data/values from a fixed point data format to a floating point data format (in this illustrative embodiment, BSF16 to FP16 format conversion of the filter weight data/values using the EMAXL value) to generate filter weight data/values (Hij) in a floating point data format, which are thereafter applied to the MAC processing pipelines (e.g., stored in SRAM memory and used by the multiplier circuits of the MAC processing pipelines); [11] Negative values (S=1) will need to be converted to sign magnitude (invert the 16 bits and increment)—this is not illustrated in this example; [12] use priority-encode logic to count the number of leading zeros in the fraction; [13] exponent EXP will be equal to (EMAX-PEN); [14] Left-shift the fraction of each element by the PEN amount—this will normalize it so the MS fraction bit is 1.0; [15] Round the fraction to 7 bits (plus hidden/implicit "1") amount—if the fraction overflows, increment the exponent;

FIG. 8A illustrates processes or operations of certain conversion circuitry (e.g., the N cells of the F/H conversion circuitry—see FIG. 6C) to convert the filter weight values/data (Hij values/data) from a fixed point data format (a BSF12 format in the illustrative embodiment) to a floating point data format (a FP16 format in the illustrative embodiment), according to an embodiment of the present inventions; in this way, the filter weight values/data (Hij values/data) are in a predetermined data format for processing by the MAC execution pipelines (e.g., the embodiments illustrated in FIGS. 2B and 6A); notably, the processes or operations of conversion circuitry to convert values/data from a fixed point data format (a BSF16 format in the illustrative embodiment) to a floating point data format (a FP16 format in the illustrative embodiment) described and illustrated in FIG. 8A may be employed in connection with the fixed point data format to floating point data format conversion circuitry in the input data/values (D-to-E) conversion circuitry and the output data (Z-to-Y) conversion circuitry—albeit the bit width may differ; Exemplary method A—examples (for F-to-H conversion); [11] Negative values (S=1) will need to be converted to sign magnitude (invert the 11 bits and increment)—this is not illustrated in this example; [15] Round the fraction to 7 bits (plus hidden/implicit "1") amount—if the fraction overflows, increment the exponent;

FIG. 8B illustrates a process or operation of conversion circuitry to convert the filter weight values/data from a first fixed point data format (e.g., an INT8 format) to a second fixed point data format (e.g., BSF12 format) before implementation into the circuitry and data flow of FIGS. 6A-6D and 7A-7D, according to an embodiment of the present inventions; briefly, the Fij values may be stored in memory (e.g., L3 DRAM memory and/or L2 SRAM memory) in first fixed point data format that requires less memory capacity and memory bandwidth than other fixed point data formats (e.g., INT 8 requires less memory capacity and memory bandwidth than BSF12); the format size of the filter weight data/values (Fij values) may be less important/significant after the filter weight data/values are written to and stored in memory which is "local" to the MAC processing pipelines (e.g., L1 or L0 memory—SRAM memory that is local to associated pipelines); with that in mind, a 3×3 block of 8 bit filter weight (Fij) values are converted or modified to provide a larger or better dynamic range without increasing the memory capacity footprint or memory bandwidth requirements by allocating 72 bits to nine BSF7 values (block-scaled-fraction format), with 9 bits available for a shared exponent EMAX; the BSF7 values are input into or provided to conversion circuitry to convert the filter weights in a BSF7 data format to BSF12 data format; thereafter, the filter weight values/data may be processed as indicated in FIG. 8A, via conversion circuitry (e.g., the N cells of the F/H conversion circuitry—see FIG. 6C), to convert the filter weight values/data (Hij values/data) from a fixed point data format (e.g., a BSF12 format) to a floating point data format (e.g., an FP16 format) for use by the multiplier circuits of the MAC processing pipelines, according to an embodiment of the present inventions; in this way, the filter weight values/data (Hij values/data) are in a predetermined data format for processing by the MAC execution pipelines (e.g., the embodiments illustrated in FIGS. 1, 2A and 2B);

FIG. 9A illustrates a schematic block diagram of a physical and logical overview of an exemplary processed output data (Z-to-Y or zij-to-yij) insertion and conversion circuitry and operation embodiment of a plurality of multiplier-accumulator execution pipelines, implementing a Winograd technique of processing (as illustrated in the logical and physical overviews in FIGS. 2A and 2B, respectively), according to certain aspects of the present inventions, wherein each pipeline of the conversion and extraction circuitry correlates to or is associated with a MAC processing pipeline; a read-modify-write (RMW) option may be employed when, for example, the input layer depth DD is larger than the pipeline depth. For this option the previously-written Yij group (four words labeled "64a") is read and passed to an ADD block to be added to the four words for the "64b" operation; alternatively, this may be timeshared with the yij groups being written since only eight L2 memory cycles are needed out of each 16 (four yij write and four yij read);

FIG. 9B is an exemplary pseudo-code of exemplary Z-to-Y or zij-to-yij insertion and conversion embodiment of the execution pipeline of FIG. 9A, according to certain aspects of the present inventions;

FIG. 9C illustrates a data flow diagram of exemplary Z-to-Y conversion circuitry and Z insertion circuitry of a plurality of pipelines (sixteen in the illustrative embodiment), implementing a Winograd technique of processing, according to certain aspects of the present inventions;

briefly, data ($Z_{IN}$) from the MAC processing pipelines is input into circuitry of the 16×16 Z-to-Y conversion pipelines to convert such data from a floating point data format (e.g., FP32) to a fixed point data format (e.g., block-scaled data format); here, the data/values (Zij data/values), each in a floating point data format, are processed and converted to a fixed point data format (e.g., block-scaled format (BSF 32)) by inputting the Zij data/values ("$Z_{IN}$") into a 16×16 array of "T" cells wherein the inserted Zij data/values are thereafter input into or provided to sixteen Z-to-Y conversion pipelines including "U" cells to receive the data/values in floating point data format and determine the largest exponent (EMAXU) of such input data; the "R" cells perform a temporal delay function/operation for the exponent search; the "V" cells perform the floating point data format to fixed point data format conversion (specifically, FP32 to BSF32 format conversion of the Zij data/values using the EMAXU value); thereafter the Zij output data, in a fixed point data format, is input into Winograd conversion circuitry (in one embodiment, the "X" cells (i.e., X00-X31)); here, the "X00-X31" cells perform the Z-to-Y conversion via a Winograd technique of processing using the fixed point data format (e.g., BSF32) representation of the data/values (Zij data/values) to generate Yij output data/values; thereafter the output data/values (Yij) are input into additional conversion circuitry to generate output data/values in a floating point data format (e.g., FP32), using the (Yij) data/values, in the fixed point data format, from the Winograd conversion circuitry; here, the "W" cells, using the EMAXV value, convert the data from a fixed point data format to a floating point data format (in this illustrative embodiment, BSF32 to FP32 format conversion of the Yij data/values using the EMAXV value); notably, cell/circuit is collectively referred to herein as "cell" or "Cell", and, in the drawings, a particular "Cell" is, at times, labeled or identified as "Cell x" where x is R, T, U, V, W or X (e.g., Cell T in FIG. 10A);

FIG. 9D illustrates a schematic diagram of an exemplary embodiment of the Z (zij) insertion circuitry and the Z-to-Y (zij-to-yij) conversion circuitry including one cell of the zij insertion logic circuitry (left portion of the figure) and one cell the zij-to-yij conversion circuitry (right portion of the figure) of the exemplary Z-to-Y (zij-to-yij) insertion/conversion circuitry of the FIG. 9A, according to certain aspects of the present inventions; NOTE [1]—the conversion logic is included in cell positions X00 through X31, while the insertion logic is only in cell positions X00 through X15; NOTE [2]—a 4b counter CNT[3:0] is shared by the 32 conversion/extraction cells; alternatively, a local 4b counter could be included in each cell to save the cost of the 4 wires; NOTE [3]—the EN_ADDSUB, EN_SUB, and LD_ZXY control signals are a function of the 4b counter state and the static configuration bits (which encode the bit position of the conversion cell). 3 LUT4 cells can generate these 3 signals;

FIG. 10A illustrates a schematic block diagram of an exemplary T cell of exemplary Z-to-Y conversion circuitry and Z insertion circuitry of FIGS. 9A and 9C, according to certain aspects of the present inventions, wherein in this exemplary embodiment, the T cells (in this embodiment, 16×16 array) receive data ($Z_{IN}$) from the MAC processing pipelines for insertion into the exemplary Z-to-Y conversion circuitry;

FIG. 10B illustrates a schematic block diagram of an exemplary U cell of exemplary Z-to-Y conversion circuitry and Z insertion circuitry of FIGS. 9A and 9C, according to certain aspects of the present inventions, wherein in this exemplary embodiment, the U cell (in this illustrative embodiment, sixteen) includes circuitry to receive the output of the T cells and identify and/or determine the largest exponent (EMAX) of the output data/values (Zij data/values) in floating point data format (in this illustrative embodiment, FP32 format); here, the EMAX register, in one embodiment, is loaded with exponent of first Zij value (EMAXU), and the exponent of each of the remaining Zij values is compared with EMAXU, replacing EMAXU if larger;

FIG. 10C illustrates a schematic block diagram of an exemplary R cell of exemplary Z-to-Y conversion circuitry and Z insertion circuitry of FIGS. 9A and 9C, according to certain aspects of the present inventions, wherein in this exemplary embodiment, M cells include circuitry to temporally delay the data/values (Zij data/values) a predetermined amount of time to identify and/or determine largest or largest exponent (EMAXU) of the output data/values (Zij data/values) of the MAC processing pipelines before being input into or provided to the floating point data format to fixed point data format conversion circuitry (in this illustrative embodiment, accomplished via the V cells);

FIG. 10D illustrates a schematic block diagram of an exemplary V cell of exemplary Z-to-Y conversion circuitry and Z insertion circuitry of FIGS. 9A and 9C, according to certain aspects of the present inventions, wherein in this exemplary embodiment, V cells (in this illustrative embodiment, sixteen) convert the data/values (Zij data/values) from a floating point data format to fixed point data format (in this illustrative embodiment, FP32 data format to BSF32 data format) using the EMAXU value; thereafter the data, in a fixed point data format, is applied to Winograd conversion circuitry (e.g., the X cells of FIGS. 6D) to generate Yij data/values, according to certain aspects of the present inventions; al compare the exponents of 16 Zij values and pick largest (EMAXU); [2] note—if overflow margin is needed, the EMAXU value can be incremented by +1 for each binade of overflow range that is needed; [3] Right-shift the fractions of the elements with smaller exponents: the number of leading zeros is equal to the difference of [EMAXU-EXP(Zij)]; [4] values with right-shift greater than 7 will need the fraction to be rounded; [5] Negative values (S=1) will need to be converted to two's complement (invert the 32 bits and increment)—this is illustrated in this example; [6] The Zij BSF16 values can now be added and subtracted (as if they were simple twos complement integers) to form the Yij values; and;

FIG. 10E illustrates a schematic diagram of an exemplary W cell of exemplary Z-to-Y conversion circuitry and Z insertion circuitry of FIGS. 9A and 9C, according to certain aspects of the present inventions, wherein in this exemplary embodiment, after Winograd processing, the W cell (in this illustrative embodiment, sixteen cells in total), using the EMAXV value, perform data format conversion of the data/values from a fixed point to a floating point (in this illustrative embodiment, BSF32 to FP32 format conversion of the processed output data/values using the EMAXV value) to generate output data (Yij) in a floating point data format; [11] negative values (S=1) will need to be converted to sign magnitude (invert the 16 bits and increment)—this is not illustrated in this example; use priority-encode logic to count the number of leading zeros in the fraction; [13] exponent EXP will be equal to (EMAX-PEN); [14] left-shift the fraction of each element by the PEN amount—this will normalize it so the MS fraction bit is 1.0; [15] round the fraction to 7 bits (plus hidden/implicit "1") amount—if the fraction overflows, increment the exponent.

Again, there are many inventions described and illustrated herein. The present inventions are not limited to illustrative exemplary embodiment including with respect to: (i) particular floating point format(s), particular fixed point format(s), block/data width or length, data path width, bandwidths, values, processes and/or algorithms illustrated, or (ii) the exemplary logical or physical overview configurations, exemplary circuitry configuration and/or exemplary Verilog code.

Moreover, the present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In a first aspect, the present inventions are directed to one or more integrated circuits having a plurality of multiplier-accumulator circuits connected or configured in one or more data processing pipeline (e.g., a linear pipeline) to process input data (e.g., image data) using Winograd type processing techniques. The one or more integrated circuits also includes (i) conversion circuitry to convert the data format of the input data and/or the filter coefficients or weights from a floating point data format to a fixed point data format and (ii) circuitry to implement Winograd type processes to, for example, increase data throughput of the multiplier-accumulator circuitry and processing. The one or more integrated circuits may also include conversion circuitry to convert the data format of the input data and/or the filter coefficients/weights data, after processing via Winograd processing circuitry, from a fixed point data format to a floating point data format. The output of the Winograd processing circuitry is applied to or input into conversion circuitry to convert or transform the input data and/or the filter coefficients/weights data, after Winograd processing, from a fixed point data format to a floating point data format before such data is input into the multiplier-accumulator circuitry. In this way, the data processing implemented by the multiplier circuit and the accumulate circuit of each of the one or more multiplier-accumulator pipelines are in a floating point format.

Notably, the input data and associated filter weights or coefficients may be stored in memory, in a floating point data format, wherein such data are provided to conversion circuitry to convert or transform the data from a floating point data format to a fixed point data format that facilitates implementation in or is consistent with use of Winograd type processes (e.g., block scaled fraction format).

In one embodiment, the one or more integrated circuits include conversion circuitry or conversion circuitry (referred to, at times, as D/E, D-E or D-to-E conversion logic or conversion circuitry) to convert or process the input data from a floating point data format to a fixed point data format. Thereafter, the input data, in a fixed point data format, are input into circuitry to implement Winograd type processes to, for example, increase data throughput of the multiplier-accumulator circuitry and processing. The output of the Winograd processing circuitry is applied to or input into conversion circuitry to convert or transform the input data from a fixed point data format to a floating point data format before such data is input into the multiplier-accumulator circuitry via extraction logic circuitry. The input data may be processed by the multiplier-accumulator circuits of the one or more multiplier-accumulator pipelines in a floating point format.

In another embodiment, the one or more integrated circuits include conversion circuitry (referred to, at times, as F/H, F-H or F-to-H conversion logic or circuitry) to convert filter weight or coefficient values/data to a fixed data format for processing via Winograd processing circuitry. Thereafter, the output of the Winograd processing circuitry is input into conversion circuitry to convert the filter weight data from a fixed point data format to a floating point data format before such data is input into the multiplier-accumulator circuitry via extraction logic circuitry. Such weight values or data, having a floating point data format, are employed, together with the input data (which is also in a floating point data format), by the multiplier circuits of the multiplier-accumulator circuitry of the multiplier-accumulator execution pipeline(s). In this way, the multiply operations of the multiplier-accumulate operations are performed in a floating point data format regime.

The multiplier-accumulator circuitry (and methods of operating such circuitry) of the execution or processing pipeline (e.g., for image filtering) may include floating point execution circuitry (e.g., floating point multiplier circuits and accumulate/adder circuits) implementing floating point multiplication and floating point addition based on inputs having one or more floating point data formats. The floating point data formats may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation of the integrated circuit or multiplier-accumulator circuitry of the processing pipeline). In one embodiment, the circuitry of the multiplier-accumulator execution pipelines include adjustable precision of the data format (e.g., the floating point data format). In addition thereto, or in lieu thereof, the circuitry of the execution pipelines may concurrently process data to increase throughput of the pipeline. For example, in one implementation, the present inventions may include a plurality of separate multiplier-accumulator circuits (referred to herein, at times, as "MAC") and a plurality of registers (including, in one embodiment, a plurality of shadow registers) that facilitate pipelining of the multiply and accumulate operations wherein the circuitry of the execution pipelines concurrently process data to increase throughput of the pipeline.

The present inventions may also include conversion circuitry incorporated in the MAC pipelines or coupled to the output of the MAC pipelines to convert the output data, in floating point data format, to a fixed point data format wherein the output data is input into Winograd processing circuitry. After the Winograd processing, the output data may be converted to a floating point data format and, in one embodiment, stored in memory. For example, the present inventions employ conversion circuitry (referred to, at times, as Z/Y, Z-Y or Z-to-Y conversion logic or circuitry), consistent with Winograd type processes, to generate processed output data (e.g., output image data). Before, however, the multiplier-accumulator circuitry of the multiplier-accumulator execution pipeline(s) output the processed data, such data are applied or input into data format conversion circuitry and processes which convert or transform the processed data, which is in a floating point data format, to processed data having a data format that facilitates implementation in or is consistent with use of Winograd type processes (e.g., a fixed point data format, such as, for example, BSF). Here, the processed data, in a fixed point data format, is processed by Z-Y conversion circuitry consistent with Winograd type processes. Notably, in one embodiment, the Z-Y conversion circuitry is incorporated or integrated into the multiplier-accumulator execution pipeline(s). That is, the operations of the Z-Y conversion of the processed data are performed in the MAC execution/processing pipeline.

Thereafter, the present inventions may employ circuitry and techniques to convert or transform the output data (in a fixed data point format), after Winograd processing, from a fixed point data format to a floating point data format. That is, in one embodiment, after the processed output data, having a data format that facilitates implementation in or is consistent with use of Winograd type processes (e.g., a fixed point data format, such as, for example, block scaled fraction format), the present inventions may employ conversion circuitry and techniques to convert or transform the data (e.g., pixel data) to a floating point data format before output to, for example, memory (e.g., L2 memory such as SRAM). In one embodiment, the output data (e.g., image data) is written and stored to memory in a floating point data format.

With reference to the logic overview illustrated in FIGS. 1 and 2A-2C, in one exemplary embodiment, input data (e.g., image data/pixel in floating point format) is stored in memory in layers consisting of two-dimensional arrays of input or image data/pixels (e.g., M×M where M=3). The input data/values (Dij) may be organized and/or stored in memory in "depth" planes or layers (e.g., K depth layers where, in one embodiment, K=64) and the output data/values (Yij), after processing, is organized and/or stored in memory in output "depth" planes or layers (e.g., L output depth planes where, in one embodiment, L=64). The memory which stores the input data/values and the output data/values (which may be the same physical memory or a different physical memory) also stores filter weight data/values (e.g., in floating point format) that are associated with the input data. In one embodiment, the filter weight or coefficient data/values (Fkl) are organized and/or stored in memory in M×M blocks or arrays, with K×L blocks or arrays covering combinations of input and output layers (e.g., all combinations).

One or more (or all) of the data may be stored, input into circuitry of the processing pipeline, and/or output from the circuitry of the pipeline in a floating point data format. That is, in one embodiment, the input data (e.g., image data/pixel) are stored in memory and/or input into circuitry of the processing in a floating point data format. In addition thereto, or in lieu thereof, the filter weight or coefficient data/values, used in the multiplier-accumulating processing, are stored in the memory and/or input into circuitry of the processing in a floating point data format. Further, the output data, processed as set forth herein, may be stored in memory and/or output in a floating point data format. All combinations of the data being stored in memory, input into circuitry of the processing pipeline, and/or output from the pipeline in a floating point data format are intended to fall within the scope of the present inventions. In the discussion below, however, the input data (e.g., image data/pixel), the filter weight data/values, and the processed output data are stored in a floating point data format, input into or accessed by multiplier-accumulator circuits of the processing pipeline in a floating point data format and output from the processing pipeline in a floating point data format.

Notably, the multiplier-accumulator circuitry of the execution pipelines includes a plurality of separate multiplier-accumulator circuits (referred to herein and/or in the drawings, at times, as "MAC" or "MAC circuits") that pipeline the multiply and accumulate operations. In the illustrative embodiments set forth herein (text and drawings), the pipeline of the multiplier-accumulator circuits is, at times, referred to or labeled as "MAC execution pipeline", "MAC processing pipeline" or "MAC pipeline".

In a first mode of operation of the multiplier-accumulator circuitry, a single execution pipeline is employed to accumulate a 1×1 pixel output value in a single output layer by aggregating the sum of K×M×M multiplications of input data values and associated filter weight values from K layers of input data. Briefly, in the first mode of operation, a 3×3 (M×M) multiply AND accumulation is performed by the NMAX execution pipeline of the multiplier-accumulator circuitry, resulting in the Vijkl value (see FIG. 1—"ΣM" notation). Here, the MAC execution pipelines further performs the accumulation of the input planes (see, index K), resulting in the Yijl value (see "ΣK" notation). The result of these accumulation operations is a single pixel value Yijl (1×1) that is written into the output plane (in parallel with other single pixels written into the other output planes with other output depth values (e.g., "L" index values).

In a second mode of operation of the multiplier-accumulator circuitry, N×N execution pipelines are employed wherein the two-dimensional arrays of input or image data/pixels are transformed from M×M arrays (e.g., M=3) to N×N arrays (e.g., N=4). (See, FIGS. 2A-2C). In this exemplary embodiment, a D-to-E conversion logic operation (via D-to-E conversion circuitry) generates, among other things, the N×N arrays of input or image data/pixels. (See, FIGS. 3A-3D). Similarly, the two-dimensional arrays of filter weights or weight values are transformed or converted from M×M arrays (e.g., M=3) to N×N arrays (e.g., N=4) via F-to-H conversion circuitry. The N×N arrays of filter coefficients or filter weights are properly correlated with the associated input data/values.

In one embodiment, the F-to-H conversion circuitry is disposed between the memory and the multiplier-accumulator execution pipeline. In another embodiment, the memory stores the N×N arrays of filter weights or weight values which were pre-computed (e.g., off chip) and stored in memory as N×N arrays of filter weights or filter weight values. In this way, the F-to-H conversion circuitry is not disposed between memory and the multiplier-accumulator execution pipelines and/or implement/perform the F-to-H conversion operation on the filter weights immediately before employing that data in the multiplier-accumulator execution pipelines. Storing the pre-computed N×N arrays of filter weight values/data in memory (rather than computing such values/data during operation, the multiplier-accumulator circuitry/pipeline (i.e., on the fly)), however, may increase the memory storage necessary for such filter weights or weight values which, in turn, may increase the capacity requirements of the memory employed in this alternative embodiment (e.g., an increase may be on the order of N×N/M×M, or about 16/9 in this exemplary embodiment).

With continued reference to FIGS. 2A and 2B, in the second mode of operation of the multiplier-accumulator circuitry, the MAC processing pipeline implements or performs the accumulation of values Uijklm (from the Eijk*Hklm multiplies) from the input planes (index K), into the Zijlm values, as shown by the ΣK notation—wherein the N×N (e.g., 4×4) multiplication substitutes or replaces the M×M (e.g., 3×3) multiplication of the multiplier-accumulator circuitry illustrated in FIG. 1. In the second mode of operation, each MAC processing or execution pipeline implements or performs the multiplications and the accumulations (sixteen in the illustrative embodiment) and thereafter, the processed data (Zij) is output to the zij-to-yij conversion circuitry wherein, after further processing, four data/pixels are output Yijl (2×2) and written to the output (memory) plane (e.g., in parallel with other Yijl 2×2 pixels written into the other output planes (other L index values)).

Briefly, with reference to FIG. 2C, the exemplary timing of the circuitry of the exemplary physical overview in FIG. 2B, according to aspects of the present inventions, illustrates the operation of the 16 parallel multiplier-accumulator execution pipelines of the multiplier-accumulator circuitry and the connection paths to memory. Here, each pair of waveforms illustrates the first and last of the 16 pipelines, with similar behavior from the middle 14 pipelines of the exemplary multiplier-accumulator execution pipelines of the multiplier-accumulator circuitry. Each operation group processes 16×64 input data words, corresponding to the 4×4 D block for each of the 64 layers—wherein each pipeline uses 64 clock cycles (e.g., each cycle may be 1 ns in this exemplary embodiment). The top waveforms illustrate the D blocks moving from memory (e.g., L2 SRAM memory) to the D-to-E conversion operation by the D-to-E conversion circuitry. This transport step has a pipeline latency of 16 ns; the conversion step can begin when ¼ of the data is available.

Notably, some of the stages have a 16 ns pipeline latency, and a 64 ns pipeline cycle rate; in other words, each stage can accept a new 16×64 word operation in each 64 ns interval, but can overlap 48 ns of its processing with the next stage. The D-to-E conversion operation produces the 4×4 E blocks. The extraction logic circuitry separates the 16 Eij data/values from each 4×4 block, passing each to one of the 16 execution pipelines. The 64 ns of 4×4 E blocks requires 64 ns to shift in—this stage (and the following two stages) have a pipeline latency and a pipeline cycle time are the same.

With continued reference to FIG. 2C, when the E blocks have been shifted into the execution pipeline of the multiplier-accumulator circuitry, the pipelines perform 16×64×64 MAC operations (labeled "MAC operations"); the 64 multipliers and 64 adders in each of 16 pipelines each perform one operation per nanosecond over a 64 ns interval. This is the accumulation over the "K" and "L" indexes for the input planes and output planes. The 64 ns of 4×4 Z blocks requires 64 ns to shift out—this stage is able to overlap the Z-to-Y insertion stage by 48 ns. Likewise, the Z-to-Y conversion stage is able to overlap the L2 write stage by 48 ns. Each 2×2 pixel block consumes a pipeline cycle time of 64 ns—in the timing waveform, the next 2×2 block is shown in dark gray. Thus, the processing of all 128 k pixels in this example will require 1 ms (~one million ns). In this exemplary embodiment, the entire 16×64 word operation has a pipeline latency of 18×16 ns, or 288 ns. The pipeline latency of 288 ns, in this exemplary illustration, is about 3,472 times smaller than the total operational latency of 1 ms, and thus has a relatively small impact on the overall throughput of the system.

With reference to FIGS. 2A, 2B and 3A, in one embodiment, the input data conversion circuitry (referred to, at times, as D/E, D-E or D-to-E conversion logic or conversion circuitry) is employed to (i) convert or process the input data/values from a floating point data format to a fixed point data format, (ii) thereafter, the input data, in a fixed point data format, are input into circuitry to implement Winograd type processes, and (iii) convert or transform the input data, output by the Winograd processing circuitry, from a fixed point data format to a floating point data format before the input data (e.g., pixel/image data) is input into the multiplier-accumulator circuitry via extraction logic circuitry. Here, the input data/values are processed by the multiplier-accumulator circuits of the one or more multiplier-accumulator pipelines in a floating point format.

With reference to FIG. 3A, in this embodiment, 4×4 pixel/data blocks of input data/values (Dij) are read from L3/L2 memory and input to D-to-E conversion circuitry (in the illustrated embodiment, sixteen dij-to-eij pipelines) to generate 4×4 pixel/data blocks of input data data/vales (Eij). The D-to-E conversion circuitry, via the extraction circuitry, extracts the 4×4 Eij blocks of data and shifts/inputs the input data/values into the MAC processing pipelines (in the illustrated exemplary embodiment, a 16×64 array of MAC pipelines). As discussed in more detail below, the Eij data/values are multiplied, via multiplier circuits of the MAC processing pipelines, by the Hij values (input from the L1/L0 memory) and accumulated, via accumulator circuits of the MAC processing pipelines, as Zij data/values. Notably, in operation, each Eij value/data is used many times (typically 64 or greater) inside the 16×64 of the multiplier-accumulator execution pipelines of the array of MAC pipelines.

FIG. 3C is a schematic block diagram of a logic overview of the D-to-E conversion logic/circuitry, according to certain aspects of the present inventions, wherein input data (e.g., image or pixel data) are first converted from a floating point format to a fixed point format (in the illustrative example, a block-scaled fraction format), via the Q cells, which is a data format that facilitates implementation in or is consistent with use of Winograd type processes (e.g., a fixed point format, such as, for example, block scaled fraction format). The input data is then processed, via Winograd conversion circuitry (X cells), to implement Winograd type processes. Thereafter, the data is converted from the fixed point data format to a floating point format for implementation in the multiplier-accumulate processes of the MAC processing pipelines, according to the present inventions. Notably, FIG. 3D is an exemplary timing diagram overview of the overview illustrated in FIG. 3C, according to certain aspects of the present inventions.

With reference to FIGS. 3C and 3D-3F, in one exemplary embodiment, D-to-E conversion logic receives input data from memory (e.g., L2 SRAM memory) storing 4×4 D blocks of data, in floating point data format. In one embodiment, the memory is segmented or divided into sixteen physical blocks, so that sixteen sets of image data (i.e., 4×4 D blocks of data) may be accessed in parallel for use by the sixteen multiplier-accumulator execution pipelines of the multiplier-accumulator circuitry. Each set of data consists of four 4×4 D blocks of data which may be read or accessed in 64 words from each physical block of memory. The D-to-E conversion logic includes conversion circuitry which converts or transforms the data (in this illustrative embodiment, read from memory) from a floating point data format to a data format that facilitates implementation in or is consistent with use of Winograd type processes (e.g., a fixed point data format, such as, for example, block scaled fraction format). (See, FIGS. 3C, 4A, 4B and 4C). The data is then processed, via the Winograd processing circuitry of the D-to-E (dij-to-eij) conversion circuitry. (See, FIGS. 4D and 4E).

With reference to FIGS. 3C, 4A-4C, data (DIN) is input into sixteen D/E conversion pipelines of the circuitry to convert such data from a floating point data format to a fixed point data format (e.g., block-scaled data format). In this exemplary embodiment, the input data/values (Dij data/values), each in a floating point data format, are processed and converted to a fixed point data format (e.g., integer format (INT16) or block-scaled format (BSF16)). The P cells/circuits (hereinafter collectively, cells) of the input data conversion circuitry receive the Dij data/values, in floating point data format, and determine the largest exponent (EMAX) of such input data. The 16×16 array of R cells implement or perform a temporal delay function/operation to accommodate the exponent search (i.e., the largest exponent—EMAX). The Q cells convert the input data/values (Dij), using the EMAX value, from a floating point data format (FP16) to a fixed point data format (BSF16).

Thereafter the input data (Dij), in a fixed point data format, is input into Winograd conversion circuitry (via the "X" cells). With reference to FIGS. 3C, 4D and 4E, the X00-X31 cells of the input data conversion circuitry perform or implement the Winograd processing, using the fixed point data format (e.g., BSF16) representation of the input data/values (Dij data/values). The Winograd processing circuitry of the input data conversion circuitry (D-to-E conversion circuitry), in this exemplary embodiment, includes (i) sixteen of the left cell (i.e., X00 through X15 cells), (ii) data registers for the dij and eij data words, (iii) control logic for sequencing the operations of the process, and (iv) adder logic for the conversion. The eij extraction logic circuitry further includes, in this exemplary embodiment, (i) sixteen of the right cell (i.e., X16 through X31 cells), (ii) data registers for the dij and eij data words, (iii) control logic for sequencing the operations, and (iv) adder logic for the conversion.

With reference to FIGS. 3C and 4F, after Winograd processing, but before data is input into multiplier-accumulator circuits of the MAC processing pipelines, the input data (Eij) is converted from a fixed point data format to a floating point data format via the S cells. Here, the S cells, using the EMAX value, convert the input data from a fixed point data format to a floating point data format (in this illustrative embodiment, BSF16 to FP16 format conversion of the Eij data/values using the EMAX value). Moreover, extraction logic circuitry outputs the input data (Eij), in floating point data format, to the multiplier-accumulator circuits of the MAC execution pipelines. In this way, the data being processed by multiplier and accumulator circuits of the MAC pipelines is in a floating point format.

Thus, in this exemplary embodiment, conversion circuitry converts 4×4 D blocks of data to a fixed point format (FIGS. 3C and 4A-4C), which is thereafter converted to 4×4 E blocks of data, via Winograd processing circuitry (FIGS. 3C, 4D and 4E). The 4×4E blocks of data, in this illustrative embodiment, are then converted to floating point data format from fixed point data format wherein the 4×4E blocks are separated into sixteen streams that are sorted by the individual Eij data/data of the 4×4 E blocks of data. (See, FIGS. 3C, 4E and 4F). The separation is implemented by the eij extraction logic circuitry (sixteen eij extraction logic circuits in this illustrative embodiment—see FIG. 4E). Each of the sixteen eij streams may be directed to the "e-shift DIN" circuit block of one of the MAC execution pipelines (sixteen MAC execution pipelines in this illustrative embodiment) of the multiplier-accumulator circuitry.

Notably, with reference to FIG. 3C of the instant application, D-to-E (dij-to-eij) conversion circuitry also includes the vertical "$E_{OUT}$" outputs (EX_OUT in FIG. 4F) which carry the extracted data inputs (eij), in floating point data format, to the associated or appropriate MAC execution pipelines of the multiplier-accumulator circuitry. Here, the circuitry of the Cell S (see FIG. 4F) converts the data to a floating point format. In one alternative embodiment, certain of the dij-to-eij conversion process may be implemented or performed in the eij extraction cells of FIG. 4E.

As noted above, FIGS. 4A-4F illustrate, in circuit block diagram form, details of the cells/circuits of the logical block diagram illustrated in FIG. 3C employed to convert the input data (which may be stored in memory (e.g., layers consisting of two-dimensional arrays of image data/pixels)) from floating point data format to a fixed point data format (e.g., block scaled fraction (BSF) format). FIG. 4F illustrates, in circuit block diagram form, details of the cells of the logical block diagram illustrated in FIG. 3C employed to convert the Winograd converted data, which is in fixed point data format (e.g., block scaled fraction (BSF) format), to floating point data format. In this way, the input data that is input into the multiplier-accumulator execution pipelines for processing by the multiplier-accumulator circuitry are in a floating point data format and, as such, the multiply operations and the accumulate operations, are performed, in a floating point data regime, by the multiplier-accumulator circuitry.

FIG. 5A illustrates exemplary processes or steps employed to convert or change the input data/values (Dij) from a floating point data format to a block scaled fraction data format. In the exemplary embodiment, the data width is 16—as such, FP16 to BSF16 conversion. With reference to FIGS. 3C, 4A-4F and 5A, in one embodiment, the input data is converted from a floating point data format to a fixed point data format (in this illustrative embodiment, BSF) and, in that way, each group of input data/values (16 Dij values) may use a common exponent (EMAX) thereby eliminating and/or reducing alignment and normalization operations necessary for addition of values using FP16 formats. Further, each input data/value (Dij) may then have additional bits available for the fraction field of the data/value—thereby potentially increasing the precision of the BSF16 values.

With continued reference to FIG. 5A, the processes or operations of conversion circuitry to convert data/values from a floating point data format (a FP16 format in the illustrative embodiment) to a fixed point data format (a BSF16 format in the illustrative embodiment) includes determining a largest exponent of the data/values (e.g., by comparing the exponents of each data/value (e.g., on a rolling basis). In addition, a right shift of the fraction filed for each data/value with a smaller exponent. The fraction field of each data/value is rounded to comply with the BSF precision of the fraction field (which may be predetermined). Finally, the process may include a two's complement operation (invert the bits and increment) where the data/values are negative.

As noted above, the processes or operations described and illustrated in FIG. 5A may be employed to convert the filter weight data/values and the output data/values to the floating point data format to fixed point data format in the conversion circuitry of the filter weight (F-to-H) conversion circuitry and the output data (Z-to-Y) conversion circuitry, respectively—albeit the bit width may differ. Moreover, the processes or operations illustrated in FIG. 5A are exemplary and not limiting in that other techniques may be employed to convert values/data from a floating point data format to a fixed point data format (here, BSF) than is described herein.

With reference to FIGS. 3C, 4F and 5B, in one embodiment, after the pipeline of the D/E conversion circuitry has generated the sixteen Eij data/values, the format of the Winograd processed input data/values (Eij) are converted to a floating point format before input into multiplier-accumulator execution pipelines of the multiplier-accumulator circuitry. Here, the multiplier-accumulator execution pipelines of the multiplier-accumulator circuitry perform the multiply operations of the multiplier-accumulate operations.

In short, FIG. 5B illustrates the processes or steps employed to change or convert the input data/values (Eij) from a block scaled fraction (BSF) format to an floating point (FP) format (in the illustrative embodiment, BSF16 format to a FP16 format). Again, although the two formats may use the same amount of memory capacity and memory bandwidth, in this embodiment, the D/E conversion pipeline is modified with circuitry to convert the data from a fixed point to floating point format (e.g., BSF16 to FP16 change/conversion). In this way, the input data (e.g., image/pixel data) being processed by circuitry of the multiplier-accumulator pipelines are in a floating point format.

With continued reference to FIG. 5B, the processes or operations of conversion circuitry to convert data/values from a fixed point data format (a BSF16 format in the illustrative embodiment) to a floating point data format (a FP16 format in the illustrative embodiment) includes determining whether the data/value is negative, and if so, performing a two's complement operation (invert the bits and increment) with respect to the fraction field. In addition, the process may include performing a priority encode operation on the fraction field of the BSF data/value and a left shift operation on the fraction field of negative values/data. The fraction field of each data/value may be rounded with respect to fraction fields that are shifted. Finally, the process employs the largest exponent of the data/values to generate an exponent field—for example, from the left shift amount.

As noted above, the processes or operations described and illustrated in FIG. 5B may be employed to convert the filter weight data/values and the output data/values from a fixed point data format to a floating point data format in the conversion circuitry of the filter weight (F-to-H) conversion circuitry and the output data (Z-to-Y) conversion circuitry, respectively—albeit the bit width may differ. Moreover, the processes or operations illustrated in FIG. 5B are exemplary and not limiting in that other techniques may be employed to convert values/data from a fixed point data format (here, BSF) to a floating point data format than is described herein.

With reference to FIGS. 6A and 6C, in another embodiment, the present inventions include filter weight conversion circuitry (referred to, at times, as F/H, F-H or F-to-H conversion logic or circuitry). The filter weight conversion circuitry, in one embodiment, (i) converts the filter weight values/data from a floating point data format to a fixed point data format, (ii) thereafter, the filter weight values/data, in a fixed point data format, are input into circuitry to implement Winograd type processes, and (iii) converts or transforms the filter weight values/data, which is output of the Winograd processing circuitry, from a fixed point data format to a floating point data format. After converting the filter weight values/data from a fixed point data format to floating point data format, filter weight values/data, in the floating point data format, are input into the multiplier-accumulator circuitry. Such weight values/data are employed, along with the input data (which is also in a floating point data format), by the multiplier circuits of the multiplier-accumulator circuitry of the multiplier-accumulator execution pipeline(s). In this way, the multiply operations of the multiplier-accumulate operations are performed in a floating point data format regime.

With reference to FIG. 6A, in one embodiment, memory (e.g., L2 SRAM memory) stores the 3×3 F blocks of data of filter weight data/values (e.g., FIR filter weight). The memory, in this illustrative exemplary embodiment, is segmented or divided into sixteen physical blocks, so that sixteen sets of data can be read or accessed in parallel by/for the sixteen multiplier-accumulator execution pipelines of the multiplier-accumulator circuitry. Each set of data consists of four 3×3 F blocks of data which, in this illustrative exemplary embodiment, require 36 accesses from each physical L2 block, with each access requiring 1 ns. The 3×3 F blocks of data are converted to 4×4 H blocks of data by the F-to-H (fkl-to-hkl) conversion circuitry (sixteen pipelines in this illustrative embodiment). The 4×4 H blocks of filter weight data may be written to memory (e.g., L1 SRAM memory) that is shared by an associated multiplier-accumulator execution pipelines (sixteen pipelines in this illustrative embodiment) of the multiplier-accumulator circuitry. In one embodiment, each of the sixteen filter weight data/values (hkl) of a 4×4 H block of data are written to and stored in a memory (e.g., L0 SRAM memory) that is local to and associated with one of the sixteen multiplier-accumulator execution pipelines for use by the multiplier circuits thereof.

In one embodiment, this sorting and organization is implemented and performed by the memory addressing sequence when reading filter weight data/values (hkl) in the L1 memory and writing to filter weight data/values (hkl) into the local and associated memory (e.g., L0 memory associated with a particular multiplier-accumulator execution pipeline). Alternatively, however, the sorting and organization may be implemented and performed via an extraction logic circuitry (in the of the filter weight data/values (hkl), similar to the circuitry and operation of the exemplary extraction circuitry of the D-to-E (dij-to-eij) conversion circuitry illustrated in FIGS. 3A and 4E). The weight values or data may be read from memory once and transferred to the MAC processing pipelines of the multiplier-accumulator circuitry, and then used repeatedly for processing each of blocks (e.g., thousands) of 2×2 input/image data or pixels.

FIG. 6C is a logic overview of the F-to-H conversion circuitry, according to certain aspects of the present inventions, wherein filter weight data/values are first converted from a floating point format to a fixed point format (in the illustrative example, a block-scaled fraction format or integer format) which is a data format that facilitates implementation in or is consistent with use of Winograd type processes. The filter weight (F-to-H) conversion circuitry may employ the processes or operations described in FIG. 5A to convert the filter weight data from a floating point data format to a fixed point data format.

With continued reference to FIG. 6C, the filter weight data/values are then processed, via Winograd conversion circuitry, to implement Winograd type processes. Thereafter, the data is converted from the fixed point data format to a floating point data format for implementation in the multiplier-accumulate processes of the MAC processing pipelines. As discussed herein, the filter weight (F-to-H) conversion circuitry may employ the processes or operations described in FIGS. 5B and/or 8A to convert the filter weight data from a fixed point data format to a floating point data format.

With continued reference to FIG. 6C, filter weight data/values (FIN) are input into F-to-H conversion circuitry of the pipelines (in the illustrative embodiment, sixteen F-to-H conversion pipelines) to convert filter weight data from a floating point data format to a fixed point data format (e.g., block-scaled data format). The filter weight or coefficient data/values (Fij data/values), each in a floating point data format, are processed and converted (via the K cells/circuits, M cells/circuits and L cells/circuits) to a fixed point data format (e.g., block-scaled format (BSF16)). The K cells/circuits to receive the Fij data/values in floating point data format and determine or identify the largest exponent (EMAX) of the filter weight or coefficient data/values. The M cells/circuits perform a temporal delay function/operation to correlate to the time employed to perform or implement aforementioned exponent search. The L cells perform the floating point data format to fixed point data format conversion (in this illustrative embodiment, FP16 to BSF16 format conversion of the Fij data/values using the EMAXK value).

Thereafter the data, in a fixed point data format, is input into Winograd processing/conversion circuitry. Here, the "X00-X31" cells perform the F-to-H conversion of the Winograd technique of processing using the fixed point data format (e.g., BSF16) representation of the filter weight data/values (Fij filter weight data/values). After the filter weight data/values are processed by the Winograd conversion circuitry, the filter weight data/values (Hij) are input into conversion circuitry to convert the filter weights or coefficients from a fixed point data format (e.g., BSF16 or INT16) to a floating point data format (FP16). In this regard, the N cells, using the largest exponent (EMAXL value) of the filter weights/coefficients, convert the filter weight data/values (Hij) from a fixed point data format to a floating point data format (in this illustrative embodiment, BSF16 to FP16 format conversion of the Hij data/values using the EMAXL value). In one embodiment, the filter weight data/values (Hij), in a floating point data format, are output to memory that is local to or associated with one or more particular MAC processing pipelines (see, e.g., FIG. 6A), for example, L1 memory and L0 memory (e.g., SRAM).

FIG. 6D illustrates details of cells of an exemplary F/H conversion pipeline for the weight data or values pertaining to the Winograd conversion circuitry. In particular, FIG. 6D illustrates details for the two cells of the fkl-to-hkl conversion circuitry, according to certain aspects of the present inventions. Notably, there is no extraction logic circuitry implemented in this illustrative embodiment like the logic circuitry implemented in FIG. 4E. The F-to-H (fkl-to-hkl) conversion circuitry in this exemplary embodiment includes sixteen of the left cell and sixteen of the right cell. In addition, the F-to-H (fkl-to-hkl) conversion circuitry includes (i) data registers for the fkl and hkl weight values, (ii) control logic for sequencing, and (iii) adder logic for the conversion.

With continued reference to FIG. 6D, after the weight data or values are converted from a floating point data format to a fixed point data format, the filter weight data/values (Fij) are shifted into the X00-X31 cells for processing by the Winograd conversion circuitry, and held or temporarily stored in the FREG_X and FREG_Y registers. The sixteen filter weight data/values (Hij) are shifted past these 32 positions, and the appropriate Fij data/values are accumulated into the Winograd representation of the filter weight data/values (Hij). In this illustrative embodiment, the sixteen Hij data/values are then shifted to conversion circuitry (N cells) where data format of the filter weight data/values (Hij) are converted from a fixed point data format to a floating point data format using the largest exponent (EMAXL value) of the filter weights/coefficients (in this illustrative embodiment, BSF16 to FP16 format conversion of the Hij data/values using the EMAXL value). (See FIG. 6C).

Thereafter, the F-to-H conversion circuitry shifts or outputs the filter weight data/values (Hij), in a floating point data format, to the L1 SRAM memory—which, in one embodiment, is shared by a plurality of multiplier-accumulator execution pipelines of the multiplier-accumulator circuitry. With reference to FIG. 6A, the filter weight data/ values (Hij), in a floating point data format, may then be output to and written in memory that is local to or associated with one or more particular MAC processing pipelines, for example, L0 memory (e.g., SRAM). In one embodiment, each MAC processing pipeline is associated with one L0 memory wherein that local memory is dedicated to the circuitry/operations of the associated MAC processing pipeline.

Notably, the embodiment illustrated in FIG. 6D includes an accumulation path of the filter weight data/values (hkl), after processing by the Winograd processing circuitry, of ten bits of precision and utilizes a saturating adder to handle overflow. An alternative embodiment may employ an accumulation path of the filter weight data/values (hkl) having twelve bits of precision and does not employ a saturating adder to handle overflow; here, the twelve bit accumulation path has enough numerical range to avoid overflow.

With reference to FIG. 6C, the F-to-H conversion circuitry for the filter weight data/values is similar to that which was described in connection with the D-to-E conversion circuitry (and conversion pipeline). Briefly, the K cells receive the filter weight data/values (Fij) in a floating point data format (FP16) assess the data/vales to determine or identify the largest exponent (EMAXK) of the filter weight or coefficient. The array of M cells (16×16 in the illustrated embodiment) implement or perform a temporal delay function/operation to accommodate or correlate with the exponent search (i.e., the largest exponent—EMAXK). The L cells convert the filter weight data/values (Fij), using the EMAXK value received from the K cells, from a floating point data format (FP16) to a fixed point data format (BSF16). The Winograd conversion circuitry of the F-to-H conversion circuitry is implemented by the X00-X31 cells using the filter weight data/values (Fij) in fixed point data format (BSF16). The N cells receive the output of the Winograd conversion circuitry (i.e., filter weight data/values (Hij)) and convert the data/values from a fixed point data format to a floating point data format (e.g., BSF16 to FP16 format conversion of the Hij data/values) using the EMAXL value. In this way, the filter weight data or values provided to or input into the multiplier-accumulator execution pipelines of the multiplier-accumulator circuitry is in a floating point format and, as such the multiply operations performed by the multiplier-accumulator circuitry are in a floating point regime.

Notably, in the context of the filter weight data/values, the data format conversion from floating point format to fixed point format may be similar to that described above in connection with the D-to-E conversion circuitry and pipeline in the context of data format conversion of the input data (e.g., image data/pixels). In one embodiment, however, after the F-to-H conversion pipeline generates the sixteen Hij values, the format fixed point to floating point (e.g., BSF12 format to a FP16 format) may be implemented as illustrated in the exemplary process illustrated FIG. 8A. Here, FIG. 8A illustrates additional processes employed to change the Hij values from a BSF12 format to a FP16 format. The F-to-H conversion circuitry includes additional circuitry to perform this BSF12 to FP16 data format conversion (e.g., the N cells—see FIGS. 6C and 7D).

With continued reference to FIG. 8A, the processes or operations of conversion circuitry to convert data/values from a fixed point data format (a BSF16 format in the illustrative embodiment) to a floating point data format (a FP16 format in the illustrative embodiment) includes determining whether the data/value is negative, and if so, performing a two's complement operation (invert the bits and increment) with respect to the fraction field. In addition, the process may include performing a priority encode operation on the fraction field of the BSF data/value and a left shift operation on the fraction field of negative values/data. The fraction field of each data/value may be rounded with respect to fraction fields that are shifted. Finally, the process employs the largest exponent of the data/values to generate an exponent field—for example, from the left shift amount.

In another embodiment, the F-to-H conversion circuitry and operation may be modified, relative to certain portions of the discussion above. Here, because the memory capacity and memory bandwidth used by the filter weight data or values (Fij values) is significant, the Fij data/values are often stored in an INT8 format in the L3 DRAM memory and L2 SRAM memory. The data format size of the Fij data/values is less important once that data has been read from L1 SRAM memory to L0 SRAM memory, which may be in the multiplier-accumulator execution pipelines of the multiplier-accumulator circuitry (e.g., MAC pipeline array). With that in mind, the floating point data format to fixed point data format conversion circuitry and processing may implement an approach illustrated in FIG. 8B. Here, FIG. 8B illustrates modifying a 3×3 block of filter weight data of 8 bit filter weight data/values (Fij) to increase the dynamic range of the filter weight data/values without increasing the memory capacity footprint or memory bandwidth requirements. The 72 bits is allocated to nine BSF7 values (block-scaled-fraction format), with 9 bits available for a shared exponent EMAX. The BSF7 values are passed to the F-to-H conversion circuitry, where the filter weight data/values (Fij) are initially converted to BSF12 before output to the F-to-H conversion circuitry and operation.

After, the data is processed by the circuitry of the MAC execution or processing pipelines, the present inventions employ Z-Y conversion circuitry, consistent with Winograd type processes, to generate the image or pixel data. In one embodiment, output data conversion circuitry is incorporated in the MAC processing pipelines or coupled to the output of the MAC processing pipelines to convert the output data, in floating point data format, to a fixed point data format. Regardless, in one embodiment, after the data processing by the multiplier-accumulator execution or processing pipelines, output data conversion circuitry converts the output data (e.g., image/pixel data), which is in a floating point data format, to output data having a fixed point data format, such as, for example, BSF. Thereafter, the output data, in a fixed point data format, is applied to or input into Winograd conversion circuitry of the Z-Y conversion circuitry wherein the output data is processed consistent with Winograd type processes to convert the output data from a Winograd format to a non-Winograd format.

In one embodiment, after processing by the Winograd conversion circuitry, the output data is written to and stored in memory (e.g., L2 memory such as SRAM). In another embodiment, the output data, after processing by the Winograd conversion circuitry, are applied to or input into conversion circuitry to convert the output data from a fixed point data format to a floating point data format. That is, in one embodiment, the output data, after being processed by the Winograd conversion circuitry to a non-Winograd format having a fixed point data format (e.g., BSF) are applied to or input into conversion circuitry to convert or transform the data (e.g., image/pixel data) to a floating point data format before output to, for example, memory. Here, in one embodiment, the output data (e.g., image/pixel data) is written to and stored in memory in a floating point data format.

Notably, in one embodiment, the Z-to-Y conversion circuitry is incorporated or integrated into the multiplier-accumulator execution pipeline(s). That is, the operations of the Z-to-Y conversion of the processed data are performed in the MAC execution/processing pipeline wherein, among other things, the output data from the MAC processing pipelines have already been processed by Winograd conversion circuitry.

With reference to FIGS. 2A-2C, in one mode of operation, the N×N multiplier-accumulator execution pipelines of the multiplier-accumulator circuitry are employed to accumulate Q×Q pixel output data/values into a single output layer, in which each execution pipeline aggregates the sum of K multiplications of input data/values and the associated filter weights for the K input layers. In one embodiment, the aggregation of the N×N element data/values for the Q×Q output data/pixels is implemented/performed external to the N×N multiplier-accumulator execution pipelines. The N×N product data/values are accumulated with other N×N product data/values from other input layers—however, in this embodiment, the individual data/values are accumulated together into a final Q×Q output data/pixels after performing a Z-to-Y-conversion logic operation on the accumulated N×N product data/values. (See FIG. 9A).

With reference to FIGS. 2B and 9A, in one exemplary embodiment, the Z-to-Y conversion circuitry is connected to the output of each of the MAC processing pipelines, or incorporated or integrated therein, wherein each of the sixteen zij data/value streams are directed from the z-shift-out block of one of the sixteen MAC pipelines of the multiplier-accumulator circuitry. The 4×4 Z blocks of data/values may be assembled from 16 streams that are sorted by the individual zij data/values of the 4×4 Z blocks of data/values, which may be implemented by the zij insertion logic circuitry (16 in this illustrative embodiment). The 4×4 Z blocks of data/values are converted to 2×2 Y blocks by the Winograd conversion circuitry of the Z-to-Y (zij-to-yij) conversion circuitry. The memory (e.g., L2 SRAM memory) may store the 2×2 Y blocks of data/values in a segmented or divided form into sixteen physical blocks, so that sixteen sets of data may be written or stored in parallel for the sixteen MAC execution pipelines. Here, each set of data may consist of four 2×2 Y blocks, which would include sixteen accesses from each physical block of memory (e.g., L2 SRAM memory), with each access including, for example, 1 ns in this exemplary embodiment.

In one embodiment, the Z-to-Y conversion circuitry includes circuitry to convert the output of the Winograd conversion circuitry from data in a fixed point data format to a floating point data format. In this way, the output data, in a floating point data format, may be employed by circuitry external to the circuitry of the present invention. For example, the output data, in a floating point data format, may be stored in memory (e.g., internal and/or external memory) for use in additional processes (e.g., image generation).

Note that only ¼ of the available L2 SRAM memory is employed for writing the Y block data/values; the D block data and execution pipelines each employ a 64 ns pipeline cycle time to process the 16×64 4×4 D input blocks for each 2×2 pixel step. The lower Y access bandwidth for the L2 SRAM memory may facilitate the number of physical blocks of Y memory to be reduced from 16 to 4 in this exemplary embodiment.

Alternatively, however, the extra bandwidth may be used where there are more than 64 input planes being accumulated. For example, if there were 128 input planes (and 64 MAC data/values per multiplier-accumulator execution pipelines of the multiplier-accumulator circuitry in this exemplary implementation), the first 64 input planes may be accumulated into a particular region of the memory (e.g., the "Y" region of L2 SRAM memory). Then, as the second 64 input planes are accumulated in the pipeline of the multiplier-accumulator circuitry, the Y values for the first planes are read from Y2 and passed to an accumulation port on the Z-to-Y (zij-to-yij) conversion circuitry. The two sets of values may be added together and rewritten to or stored in the Y region of L2 SRAM memory. This is illustrated in the path outlined by the dotted line in FIG. 9A labeled "V". The accumulation values are stored in the Y region of the L2 memory. The second set of 64 input planes is accumulated in the right side of the figure. The 4×4 Z block values pass through the zij-to-yij conversion circuitry before being written to the Y region of L2 memory. As they pass through the conversion logic, the Y accumulation values from the first 64 input planes are read from L2 and loading into the accumulation input port of the Z-to-Y (zij-to-yij) conversion circuitry.

FIG. 9C is a logic overview of the Z-Y conversion circuitry, according to certain aspects of the present inventions, wherein the data output by the circuitry of the multiplier-accumulator execution pipelines are first converted from a floating point data format to a fixed point data format (in the illustrative example, a block-scaled fraction format) which is a data format that facilitates implementation in or is consistent with use of Winograd type processes (e.g., a fixed point data format, such as, for example, block scaled fraction format). The output data (Z-to-Y) conversion circuitry may employ the processes or operations described in FIG. 5A to convert the output data/values from a floating point data format to a fixed point data format. The output data (Zij) are then processed, via Winograd conversion circuitry, to convert the data from a Winograd environment to a non-Winograd environment wherein the data are in a fixed point data format. In one embodiment, that data are converted back to a floating point data format (from the fixed point data format), according to aspects of the present inventions. Notably, the output data (Z-to-Y) conversion circuitry may employ the processes or operations described in FIG. 5B to convert the output data/values from a fixed point data format to a floating point data format.

With reference to FIG. 9C, the Z-Y conversion circuitry includes circuitry to convert the data format of the output data (Zij) initially from floating point data format to fixed point data format. In one embodiment, that data format conversion is implemented by the T cells, U cells, R cells and V cells (using the using the EMAXU value). The Winograd processing is performed by the X00-X31 cells which output processed output data (Yij) in a fixed point data format. After processing by the Winograd conversion circuitry, the output data (Yij data/vales) are converted from a fixed data point format to a floating point data format via the W cells using the EMAXV value.

FIG. 9D illustrates, in circuit block diagram form, a cell of the zij insertion logic circuitry (left portion of the figure) and one cell the zij-to-yij conversion circuitry (right portion of the figure) of an embodiment of the Z-Y conversion circuitry. The zij insertion logic circuitry includes (i) 16 of the left cell, (ii) data registers for the zij and yij data words, (iii) control logic for sequencing, and adder logic for the conversion. It also includes the vertical "INSRT_IN" and "INSRT_OUT" ports which carry the inserted zij data/values from the appropriate execution pipeline of the multiplier-accumulator circuitry. The zij insertion logic circuitry may also include an accumulation port (lower left portion of the illustration)—for example, where there are more input planes than execution pipeline stages. The zij-to-yij conversion circuitry includes (i) 16 of the left cell, (ii) data registers for the dij and eij data words, (iii) control logic for sequencing, and (iv) adder logic for the conversion. Note that some of the zij-to-yij conversion process may be implemented or performed in the zij insertion cells; notably, in certain embodiments, they include some of the same circuitry as the zij-to-yij conversion cells.

With continued reference to FIG. 9D, after the output data are converted from a floating point to a fixed point data format, the sixteen Zij data/values are inserted into the X00-X15 cells. From there, they are shifted from left to right and (at two different times) loaded into the DREG_X and DREG_Y registers. The four Yij data/values are shifted past these 32 positions, and the appropriate Zij values are accumulated into the Yij data/values. The four Yij data/values are then shifted through an ADD block (adder circuitry—see FIG. 9A) and the result written to the L2 memory. The FPADD block (floating point adder circuitry) adds the result of previous accumulations for the case in which there are more than 64 input image planes.

FIG. 9C illustrates the output data conversion circuitry, wherein the Zij input values and Yij output values are floating point format (here, FP32 format). The output data conversion circuitry, in this illustrative embodiment, includes Winograd conversion circuitry, having sixteen conversion pipelines wherein the Zij input values in INT32 data format. With reference to FIG. 9C, data ($Z_{IN}$) from the MAC processing pipelines is input into circuitry of the 16×16 Z-to-Y conversion pipelines to convert such data from a floating point data format (e.g., FP32) to a fixed point data format (e.g., BSF32 or INT32). The output data/values (Zij data/values), each in a floating point data format, are processed and converted to a fixed point data format by inputting the Zij data/values ("$Z_{IN}$") into a 16×16 array of T cells wherein the inserted Zij data/values are thereafter input into or provided to sixteen pipelines including U cells to receive the data/values in floating point data format and determine the largest exponent (EMAXU) of such data. The R cells perform or implement a temporal delay function/operation to accommodate the time employed for the largest exponent search. Thereafter, the V cells perform the floating point data format to fixed point data format conversion (in one embodiment, FP32 to BSF32 format conversion of the Zij data/values using the EMAXU value).

With continued reference to FIG. 9C, the output data/values (Zij), in a fixed point data format, are input into Winograd conversion circuitry (in one embodiment, the "X" cells (i.e., X00-X31)); here, the "X00-X31" cells perform the Z-to-Y conversion via a Winograd technique of processing using the fixed point data format (e.g., BSF32) representation of the data/values (Zij data/values) to generate Yij output data/values. The data/values (Yij) output by the Winograd conversion circuitry are input into additional conversion circuitry to generate output data/values in a floating point data format (e.g., FP32), using the (Yij) data/values, in the fixed point data format, from the Winograd conversion circuitry. In this regard, the W cells, using the EMAXV value, convert the output data (Yij) from a fixed point data format to a floating point data format (in this illustrative embodiment, BSF32 to FP32 format conversion) using the EMAXV value.

Notably, as indicated above, cell/circuit is collectively referred to herein as "cell" or "Cell", and, in the drawings, a particular "Cell" is, at times, labeled or identified as "Cell x" where x is R, T, U, V, W or X (e.g., Cell T in FIG. 10A).

With reference to FIGS. 9C and 10A-10E, the array of T cells (16×16 in the illustrative embodiment) receive the inserted data/values (Zij) in FP32 format from the MAC processing pipelines. The U cells analyze the data/values data/values (Zij) to identify or determine the largest exponent (EMAXU). The array of R cells (16×16 in the illustrative embodiment) perform a delay function/operation to accommodate the search for the largest exponent by the U cells. The V cells convert the data format of the output data/values (Zij) from floating point (e.g., FP32) to fixed point (e.g., BSF32) using the largest exponent identified (EMAXU value) and output by the U cells. The Winograd conversion of the Z-to-Y conversion circuitry is implemented by the X00-X31 cells using output data/values (Zij) in fixed point data format. Finally, the W cells receive the output of the Winograd conversion circuitry (Yij) and convert the data/values from the fixed point data format (BSF32) to a floating point data format (FP32), using the EMAXV value. In this way, the output data (Yij) is in a floating point data format and, as such, the output of the multiply operations performed by the multiplier-accumulator circuitry are in a floating point regime. FIGS. 10A-10E illustrate, in circuit block diagram form, an exemplary T circuit/cell, U circuit/cell, R circuit/cell, V circuit/cell, and W circuit/cell, respectively, of the exemplary logical block diagram of the Z-to-Y conversion circuitry illustrated in FIG. 9. The Winograd processing, in one embodiment, is implemented by the X circuits/cells illustrated in FIG. 9D.

Notably, with reference to FIGS. 1, 2A and 2B, the output data/pixel groups are illustrated in the exemplary embodiment as 1×1 output pixel group (FIG. 1) and 2×2 output pixel groups (FIGS. 2A and 2B) rather than more generally as P×P and Q×Q arrays, respectively.

Notably, the memory employed to store the data may be, for example, a block or an array of dynamic and/or static random access memory cells such as DRAM, SRAM, Flash and/or MRAM; notably, all memory types, and combinations thereof, are intended to fall within the scope of the present inventions). In one embodiment, a third and/or fourth memory stores the input data, filter weight values and the output data values in SRAM (e.g., third memory, e.g., L2 SRAM memory) and/or DRAM (e.g., fourth memory, L3 DRAM memory). In addition, a third and/or fourth memory may store the transformed input data (after the input data undergoes transformation via the D-to-E conversion logic operation) of the N×N arrays of input or image data/pixels. In one embodiment, the "D" input data and "Y" output data may both be stored in the third (L2 SRAM) memory—each piece of data participates in different multiplier-accumulate (MAC) operations (e.g., 64 different MAC operations), so the more-limited L2 memory bandwidth is adequate for the much-higher bandwidth of the MAC pipeline. In contrast, the weight data bandwidth that is required by the MAC pipeline is much higher, and it is necessary to store such data in the first and/or second memory SRAM (e.g., L0 SRAM memory and L1 SRAM memory) which, in one embodiment, may be reserved for: (i) the "F" weight values for first mode of operation of the N×N multiplier-accumulator execution pipelines of the multiplier-accumulator circuitry or (ii) the "H" weight values for second mode of operation of the N×N multiplier-accumulator execution pipelines of the multiplier-accumulator circuitry.

Notably, in one embodiment, the D-E and Z-Y conversion operations may be performed separately (and not on-the-fly)—although such an implementation may require additional read/write operations (e.g., more 2× more read/write operations for the L2 operation), which may also increase the capacity requirements of memory (e.g., the third memory (L2 SRAM memory)).

Where the filter weight values are transformed on the fly, the first and second memory may also store the transformed filter weight values or data. In one embodiment, the third and/or fourth memory may also be, for example, a block or an array of dynamic and/or static random access memory cells such as DRAM, SRAM, Flash and/or MRAM; indeed, all memory types, and combinations thereof, are intended to fall within the scope of the present inventions). In a preferred embodiment, the first and/or second memory is SRAM (e.g., L0 SRAM memory and L1 SRAM memory).

Notably, in the illustrative embodiments set forth herein (text and drawings), the multiplier-accumulator circuitry is, at times, labeled "NMAX" or "NMAX pipeline" or "MAC pipeline".

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, the multiplier-accumulator circuitry (and methods of operating such circuitry) of the execution or processing pipeline (e.g., for image filtering) may include floating point execution circuitry (e.g., floating point multiplier circuits and accumulate/adder circuits) implementing floating point multiplication and floating point addition based on inputs having one or more floating point data formats. The floating point data formats may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation of the integrated circuit or multiplier-accumulator circuitry of the processing pipeline). In one embodiment, the circuitry of the multiplier-accumulator execution pipelines include adjustable precision of the data format (e.g., the floating point data format). In addition thereto, or in lieu thereof, the circuitry of the execution pipelines may concurrently process data to increase throughput of the pipeline. For example, in one implementation, the present inventions may include a plurality of separate multiplier-accumulator circuits (referred to herein, at times, as "MAC") and a plurality of registers (including, in one embodiment, a plurality of shadow registers) that facilitate pipelining of the multiply and accumulate operations wherein the circuitry of the execution pipelines concurrently process data to increase throughput of the pipeline.

Further, although the memory cells in certain embodiments are illustrated as static memory cells or storage elements, the present inventions may employ dynamic or static memory cells or storage elements. Indeed, as stated above, such memory cells may be latches, flip/flops or any other static/dynamic memory cell or memory cell circuit or storage element now known or later developed. Moreover, although the illustrative/exemplary embodiments include a plurality of memories (e.g., L3 memory, L2 memory, L1 memory, L0 memory) which are assigned, allocated and/or used to store certain data and/or in certain organizations, one or more of memories may be added, and/or one or more memories may be omitted and/or combined/consolidated—for example, the L3 memory or L2 memory, and/or the organizations may be changed, supplemented and/or modified. The inventions are not limited to the illustrative/exemplary embodiments of the memory organization and/or allocation set forth in the application. Again, the inventions are not limited to the illustrative/exemplary embodiments set forth herein.

Notably, in describing and illustrating certain aspects of the present inventions, certain drawings have been simplified for the purposes of clarity in order to describe, focus, highlight and/or illustrate certain aspects of the circuitry and the techniques of the present inventions.

The circuit and operational implementations of the input data conversion circuitry, filter weight conversion circuitry, and the output data conversion circuitry described and/or illustrated herein are example embodiments. Different circuit and/or operational implementations of such circuitry may be employed which are intended to fall within the scope of the present inventions. Indeed, the present inventions are not limited to the illustrative/exemplary embodiments of the input data conversion circuitry, filter weight conversion circuitry, and the output data conversion circuitry set forth in the application.

In addition, although the input data conversion circuitry, filter weight conversion circuitry, and the output data conversion circuitry, in the illustrative exemplary embodiments, describes a bit width of the floating point data format of the input data and filter weights as well as the fixed point data format, such bit width(s) is/are exemplary. Here, although several of the exemplary embodiments and features of the inventions are described and/or illustrated in the context of a conversion circuitry and/or processing pipeline (including multiplier circuitry) having a specified bit width and precision, the embodiments and inventions are applicable in other contexts as well as other precisions (e.g., FPxx where: xx is an integer and is greater than or equal to 8, 10, 12, 16, 24, etc.). For the sake of brevity, those other contexts and precisions will not be illustrated separately but are quite clear to one skilled in the art based on, for example, this application. Thus, the present inventions are not limited to (i) particular fixed point data format(s) (e.g., integer format (INTxx) and block-scaled fraction format (e.g., BSFxx), block/data width, data path width, bandwidths, values, processes and/or algorithms illustrated, nor (ii) the exemplary logical or physical overview configurations of the particular circuitry and/or overall pipeline, and/or exemplary module/circuitry configuration, overall pipeline and/or exemplary Verilog code.

Moreover, the present inventions may include additional conversion techniques to convert the data from a fixed point data format to a floating point data format before storage in memory. For example, where the filter weight data is stored in memory in an integer format (INTxx) or a block-scaled-fraction format ("BSFxx"), the conversion circuitry may include circuitry to convert the fixed point data to floating point data. Indeed, in one embodiment, where the input data and/or filter weight data are provided in a fixed point data format suitable for Winograd processing by the Winograd conversion circuitry of the input data conversion circuitry and/or filter weight conversion circuitry, such circuitry may not convert the input data and/or filter weight data from a floating point data format to a fixed point data format. As such, in this embodiment, the input data conversion circuitry and/or filter weight conversion circuitry may not include circuitry to convert the data from a floating point data format to a fixed point data format.

As noted above, the present inventions are not limited to (i) particular floating point format(s), particular fixed point format(s), operations (e.g., addition, subtraction, etc.), block/data width or length, data path width, bandwidths, values, processes and/or algorithms illustrated, nor (ii) the exemplary logical or physical overview configurations, exemplary module/circuitry configuration and/or exemplary Verilog code.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means any integrated circuit (e.g., processor, controller, state machine and SoC)—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

In the claims, the term "MAC circuit" means a multiplier-accumulator circuit having a multiplier circuit coupled to an accumulator circuit. For example, a multiplier-accumulator circuit is described and illustrated in the exemplary embodiment of FIGS. 1A-1C of U.S. patent application Ser. No. 16/545,345, and the text associated therewith. Notably, however, the term "MAC circuit" is not limited to the particular circuit, logical, block, functional and/or physical diagrams, block/data width, data path width, bandwidths, and processes illustrated and/or described in accordance with, for example, the exemplary embodiment of FIGS. 1A-1C of U.S. patent application Ser. No. 16/545,345, which, as indicated above, is incorporated by reference.

The term "in situ", in the context of this application, means during normal operation of the integrated circuit—and after power-up, start-up or completion of the initialization sequence/process thereof. The term data processing operation means any operation to process data (e.g., image and/or audio data) including, for example, digital signal processing, filtering, and/or other forms of data manipulation and/or transformation, whether now known or later developed.

Notably, the limitations of the claims are not written in means-plus-function format or step-plus-function format. It is applicant's intention that none of the limitations be interpreted pursuant to 35 USC § 112, ¶6 or § 112(f), unless such claim limitations expressly use the phrase "means for" or "step for" followed by a statement of function and void of any specific structure.

What is claimed is:

1. An integrated circuit comprising:
a multiplier-accumulator execution pipeline configured to receive (i) input data and (ii) filter weights, wherein the multiplier-accumulator execution pipeline includes a plurality of multiplier-accumulator circuits configured to process the input data, using filter weights, via a plurality of multiply and accumulate operations; and
conversion circuitry, coupled to an input of the multiplier-accumulator execution pipeline, wherein the conversion circuitry includes:
inputs configured to receive a plurality of sets of input data, wherein each set of input data includes a plurality of input data, wherein each input data of each set of input data of the plurality of sets of input data includes a floating point data format,
fixed point conversion circuitry, coupled to the inputs of the conversion circuitry and configured to convert the input data of each set of input data of the plurality of sets of input data to a fixed point data format,
Winograd conversion circuitry, coupled to the fixed point conversion circuitry and configured to (i) receive the input data of each set of input data of the plurality of sets of input data having the fixed point data format and (ii) convert each set of input data of the plurality of sets of input data to a corresponding Winograd set of input data, wherein:
each input data of each set of input data of the plurality of sets of input data converted to the corresponding Winograd set of input data, via the Winograd conversion circuitry, includes the fixed point data format, and
floating point format conversion circuitry, coupled to the Winograd conversion circuitry and configured to (i) receive the input data of each Winograd set of input data of the plurality of Winograd sets, (ii) convert each input data of each Winograd set of input data of the plurality of Winograd sets of input data to a floating point data format, and (iii) output the input data, having the floating point data format, of each Winograd set of input data of the plurality of Winograd sets of input data to the multiplier-accumulator execution pipeline;
wherein:
the fixed point conversion circuitry is configured to convert each input data, having a floating point data format, of each set of input data of the plurality of sets of input data to a block scaled fraction (BSF) data format including an exponent field and a fraction field, wherein the value of the exponent field of each input data of a particular set of input data is the same for each input data associated with the particular set of input data; and
the fixed point conversion circuitry further includes determination circuitry to determine a largest exponent of the input data of each set of input data of the plurality of sets of input data.

2. The integrated circuit of claim 1 wherein:
the fixed point conversion circuitry further includes circuitry configured to perform, for each input data of each set of input data of the plurality of sets of input data, a right shift of the fraction field of the input data having an exponent field that is smaller than the largest exponent of the input data associated with the set of input data.

3. The integrated circuit of claim 2 wherein:
the amount of the right shift of the fraction field of the input data having an exponent field that is smaller than the largest exponent of the input data associated with the set of input data is equal to a difference between (a) the exponent value of the largest exponent of the input data associated with the set of input data and (b) the value of the exponent of the input data that is smaller than the largest exponent of the input data associated with the set of input data.

4. The integrated circuit of claim 3 wherein:
the fixed point conversion circuitry further includes circuitry configured to perform, for each input data of each set of input data of the plurality of sets of input data, rounding of the fraction field of the input data to a block scale fraction (BSF) precision.

5. The integrated circuit of claim 3 wherein:
the fixed point conversion circuitry further includes circuitry configured to perform, for each input data of each set of input data of the plurality of sets of input data, a two's complement operation on the fraction field of the input data if the input data is a negative value.

6. The integrated circuit of claim 1 wherein:
the floating point format conversion circuitry is (i) coupled to the determination circuitry to receive data of the largest exponent of the input data of each set of input data and (ii) configured to convert each input data of each Winograd set of input data to the floating point data format wherein the largest exponent of the input data associated with a given set of input data is a common exponent value for each input data of the given set of input data.

7. The integrated circuit of claim 6 wherein:
the floating point format conversion circuitry includes circuitry to perform, for the input data of each Winograd set of input data of the plurality of Winograd sets of input data, a two's complement operation on a fraction field of the input data if the input data is a negative value, and rounding of the fraction field correlated to an amount of a left shift.

8. An integrated circuit comprising:
a multiplier-accumulator execution pipeline configured to receive (i) input data and (ii) filter weights, wherein the multiplier-accumulator execution pipeline includes a plurality of multiplier-accumulator circuits configured to process the input data, using filter weights, via a plurality of multiply and accumulate operations; and
conversion circuitry, coupled to an input of the multiplier-accumulator execution pipeline, wherein the conversion circuitry includes:
inputs configured to receive a plurality of sets of filter weights, wherein each set of filter weights includes a plurality of filter weights, wherein each filter weight of each set of filter weights of the plurality of sets of filter weight includes a floating point data format,
fixed point conversion circuitry, coupled to the inputs of the conversion circuitry and configured to convert the filter weights of each set of filter weight of the plurality of sets of filter weight to a fixed point data format,
Winograd conversion circuitry, coupled to the fixed point conversion circuitry and configured to (i) receive the filter weights of each set of filter weight of the plurality of sets of filter weight having the fixed point data format and (ii) convert each set of filter weights of the plurality of sets of filter weight to a corresponding Winograd set of filter weights, wherein:
each filter weight of each set of filter weight of the plurality of sets of filter weight converted to the corresponding Winograd set of filter weight, via the Winograd conversion circuitry, includes the fixed point data format, and
floating point format conversion circuitry, coupled to the Winograd conversion circuitry and configured to (i) receive the filter weights of each Winograd set of filter weight of the plurality of Winograd sets, (ii) convert each filter weight of each Winograd set of filter weight of the plurality of Winograd sets of filter weight to a floating point data format, and (iii) output the filter weight, having the floating point data format, of each Winograd set of filter weight of the plurality of Winograd sets of filter weight to the multiplier-accumulator execution pipeline;
wherein:
the fixed point conversion circuitry is configured to convert each filter weight, having a floating point data format, of each set of filter weights of the plurality of sets of filter weights to a block scaled fraction (BSF) data format including an exponent field and a fraction field, wherein the value of the exponent field of each filter weight of a particular set of filter weights is the same for each filter weight associated with the particular set of filter weights; and
the fixed point conversion circuitry further includes determination circuitry to determine a largest exponent of the filter weights of each set of input data of the plurality of sets of filter weights.

9. The integrated circuit of claim 8 wherein:
the fixed point conversion circuitry further includes circuitry configured to perform, for each filter weight of each set of filter weights of the plurality of sets of filter weights, a right shift of the fraction field of the filter weights having an exponent field that is smaller than the largest exponent of the filter weights associated with the set of filter weights.

10. The integrated circuit of claim 9 wherein:
the amount of the right shift of the fraction field of the filter weights having an exponent field that is smaller than the largest exponent of the filter weights associated with the set of filter weights is equal to a difference between (a) the exponent value of the largest exponent of the filter weights associated with the set of filter weights and (b) the value of the exponent of the filter weights that is smaller than the largest exponent of the filter weights associated with the set of filter weights.

11. The integrated circuit of claim 10 wherein:
the fixed point conversion circuitry further includes circuitry configured to perform, for each filter weight of each set of filter weights of the plurality of sets of filter weights, rounding of the fraction field of the filter weights to a block scale fraction (BSF) precision.

12. The integrated circuit of claim 10 wherein:
the fixed point conversion circuitry further includes circuitry configured to perform, for each filter weight of each set of filter weights of the plurality of sets of filter weights, a two's complement operation on the fraction field of the filter weights if the filter weights is a negative value.

13. The integrated circuit of claim 8 wherein:
the floating point format conversion circuitry is configured to convert each filter weight of each Winograd set of filter weights to the floating point data format wherein the largest exponent of the filter weight associated with a given set of filter weights is a common exponent value for each filter weight of the given set of filter weights.

14. The integrated circuit of claim 13 wherein:
the floating point format conversion circuitry includes circuitry to perform, for the filter weights of each Winograd set of filter weights of the plurality of Winograd sets of filter weights, a two's complement operation on a fraction field of the filter weight if the filter weight is a negative value, and rounding of the fraction field correlated to an amount of a left shift.

15. An integrated circuit comprising:
a multiplier-accumulator execution pipeline configured to receive (i) input data and (ii) filter weights, wherein the multiplier-accumulator execution pipeline includes a plurality of multiplier-accumulator circuits configured to process the input data, using filter weights, via a plurality of multiply and accumulate operations;
first conversion circuitry, coupled to an input of the multiplier-accumulator execution pipeline, wherein the first conversion circuitry includes:
inputs configured to receive a plurality of sets of input data, wherein each set of input data includes a plurality of input data, wherein each input data of each set of input data of the plurality of sets of input data includes a floating point data format, fixed point conversion circuitry, coupled to the inputs of the first conversion circuitry and configured to convert the input data of each set of input data of the plurality of sets of input data to a fixed point data format, Winograd conversion circuitry, coupled to the fixed point conversion circuitry of the first conversion circuitry and configured to (i) receive the input data of each set of input data of the plurality of sets of input data having the fixed point data format and (ii) convert each set of input data of the plurality of sets of input data to a corresponding Winograd set of input data, wherein:

the input data of each set of input data of the plurality of sets of input data converted to the corresponding Winograd set of input data via the Winograd conversion circuitry of the first conversion circuitry includes the fixed point data format, and floating point format conversion circuitry, coupled to the Winograd conversion circuitry of the first conversion circuitry and configured to (i) receive the input data of each Winograd set of input data of the plurality of Winograd sets, (ii) convert each input data of each Winograd set of input data of the plurality of Winograd sets of input data to a floating point data format, and (iii) output the input data, having the floating point data format, of each Winograd set of input data of the plurality of Winograd sets of input data to the multiplier-accumulator execution pipeline; and second conversion circuitry, coupled to an input of the multiplier-accumulator execution pipeline, wherein the conversion circuitry includes:

inputs configured to receive a plurality of sets of filter weights, wherein each set of filter weights includes a plurality of filter weights, wherein each filter weight of each set of filter weights of the plurality of sets of filter weight includes a floating point data format, fixed point conversion circuitry, coupled to the inputs of the second conversion circuitry and configured to convert the filter weights of each set of filter weight of the plurality of sets of filter weight to a fixed point data format, Winograd conversion circuitry, coupled to the fixed point conversion circuitry of the second conversion circuitry and configured to (i) receive the filter weights of each set of filter weight of the plurality of sets of filter weight having the fixed point data format and (ii) convert each set of filter weights of the plurality of sets of filter weight to a corresponding Winograd set of filter weights, wherein:

the filter weights of each set of filter weight of the plurality of sets of filter weight converted to the corresponding Winograd set of filter weight, via the Winograd conversion circuitry of the second conversion circuitry, includes the fixed point data format, and floating point format conversion circuitry, coupled to the Winograd conversion circuitry and configured to (i) receive the filter weights of each Winograd set of filter weight of the plurality of Winograd sets, (ii) convert each filter weight of each Winograd set of filter weight of the plurality of Winograd sets of filter weight to a floating point data format, and (iii) output the filter weight, having the floating point data format, of each Winograd set of filter weight of the plurality of Winograd sets of filter weight to the multiplier-accumulator execution pipeline;

wherein:

the fixed point conversion circuitry of the first conversion circuitry is configured to convert each input data, having a floating point data format, of each set of input data of the plurality of sets of input data to a block scaled fraction (BSF) data format including an exponent field and a fraction field, wherein the value of the exponent field of each input data of a particular set of input data is the same for each input data associated with the particular set of input data;

the fixed point conversion circuitry of the first conversion further includes determination circuitry to determine a largest exponent of the input data of each set of input data of the plurality of sets of input data;

the fixed point conversion circuitry of the second conversion circuitry is configured to convert each filter weight, having a floating point data format, of each set of filter weights of the plurality of sets of filter weights to a block scaled fraction (BSF) data format including an exponent field and a fraction field, wherein the value of the exponent field of each filter weight of a particular set of filter weights is the same for each filter weight associated with the particular set of filter weights; and the fixed point conversion circuitry of the second conversion circuitry further includes determination circuitry to determine a largest exponent of the filter weights of each set of input data of the plurality of sets of filter weights.

16. The integrated circuit of claim 15 wherein:

the fixed point conversion circuitry of the first conversion circuitry further includes circuitry configured to perform, for each input data of each set of input data of the plurality of sets of input data, a right shift of the fraction field of the input data having an exponent field that is smaller than the largest exponent of the input data associated with the set of input data; and the fixed point conversion circuitry of the second conversion circuitry further includes circuitry configured to perform, for each filter weight of each set of filter weights of the plurality of sets of filter weights, a right shift of the fraction field of the filter weights having an exponent field that is smaller than the largest exponent of the filter weights associated with the set of filter weights.

17. The integrated circuit of claim 16 wherein:

the amount of the right shift of the fraction field of the input data having an exponent field that is smaller than the largest exponent of the input data associated with the set of input data is equal to a difference between (a) the exponent value of the largest exponent of the input data associated with the set of input data and (b) the value of the exponent of the input data that is smaller than the largest exponent of the input data associated with the set of input data; and the amount of the right shift of the fraction field of the filter weights having an exponent field that is smaller than the largest exponent of the filter weights associated with the set of filter weights is equal to a difference between (a) the exponent value of the largest exponent of the filter weights associated with the set of filter weights and (b) the value of the exponent of the filter weights that is smaller than the largest exponent of the filter weights associated with the set of filter weights.

18. The integrated circuit of claim 17 wherein:

the fixed point conversion circuitry of the first conversion circuitry further includes circuitry configured to perform, for each input data of each set of input data of the plurality of sets of input data, rounding of the fraction field of the input data to a block scale fraction (BSF) precision; and the fixed point conversion circuitry of the second conversion circuitry further includes circuitry configured to perform, for each filter weight of each set of filter weights of the plurality of sets of filter weights, rounding of the fraction field of the filter weights to a block scale fraction (BSF) precision.

19. The integrated circuit of claim 18 wherein:

the fixed point conversion circuitry of the first conversion circuitry further includes circuitry configured to perform, for each input data of each set of input data of the plurality of sets of input data, a two's complement operation on the fraction field of the input data if the input data is a negative value; and the fixed point conversion circuitry of the second conversion circuitry further includes circuitry configured to perform, for each filter weight of each set of filter weights of the plurality of sets of filter weights, a two's complement operation on the fraction field of the filter weights if the filter weights is a negative value.

20. The integrated circuit of claim 15 wherein:

the floating point format conversion circuitry of the first conversion circuitry is configured to convert each input data of each Winograd set of input data to the floating point data format wherein the data of the largest exponent of the input data associated with a given set of input data is a common exponent value for each input data of the given set of input data; and the floating point format conversion circuitry of the second conversion circuitry is configured to convert each filter weight of each Winograd set of filter weights to the floating point data format wherein the largest exponent of the filter weight associated with a given set of filter weights is a common exponent value for each filter weight of the given set of filter weights.

21. The integrated circuit of claim 20 wherein:

the floating point format conversion circuitry of the first conversion circuitry includes circuitry to perform, for the input data of each Winograd set of input data of the plurality of Winograd sets of input data, a two's complement operation on a fraction field of the input data if the input data is a negative value, and rounding of the fraction field correlated to an amount of a left shift; and the floating point format conversion circuitry of the second conversion circuitry includes circuitry to perform, for the filter weights of each Winograd set of filter weights of the plurality of Winograd sets of filter weights, a two's complement operation on a fraction field of the filter weight if the filter weight is a negative value, and rounding of the fraction field correlated to an amount of a left shift.

* * * * *